Sept. 21, 1965 C. R. DOTY, SR., ETAL 3,208,049

SYNCHRONOUS TRANSMITTER-RECEIVER

Filed Aug. 25, 1960 30 Sheets-Sheet 1

RECEIVE CLOCK

INVENTORS
CHARLES R. DOTY SR.
VINCENT H. CACKOWSKI
GEORGE EVANICK
ROY J. SMITH
LAWRENCE A. TATE

BY Robert W. Berray
ATTORNEY

Sept. 21, 1965 C. R. DOTY, SR., ETAL 3,208,049

SYNCHRONOUS TRANSMITTER-RECEIVER

Filed Aug. 25, 1960 30 Sheets-Sheet 3

Sept. 21, 1965 C. R. DOTY, SR., ET AL 3,208,049

SYNCHRONOUS TRANSMITTER-RECEIVER

Filed Aug. 25, 1960 30 Sheets-Sheet 7

REGISTER

TRANSMIT TRANSLATOR

SYNCHRONOUS TRANSMITTER-RECEIVER

Filed Aug. 25, 1960 30 Sheets-Sheet 11

TRANSMIT DRIVERS

RECEIVE FROM LINE TRIGGER

RECEIVE DRIVERS

Sept. 21, 1965 C. R. DOTY, SR., ETAL 3,208,049
SYNCHRONOUS TRANSMITTER-RECEIVER
Filed Aug. 25, 1960 30 Sheets-Sheet 14
FIG. 16 SENSE AMPLIFIERS
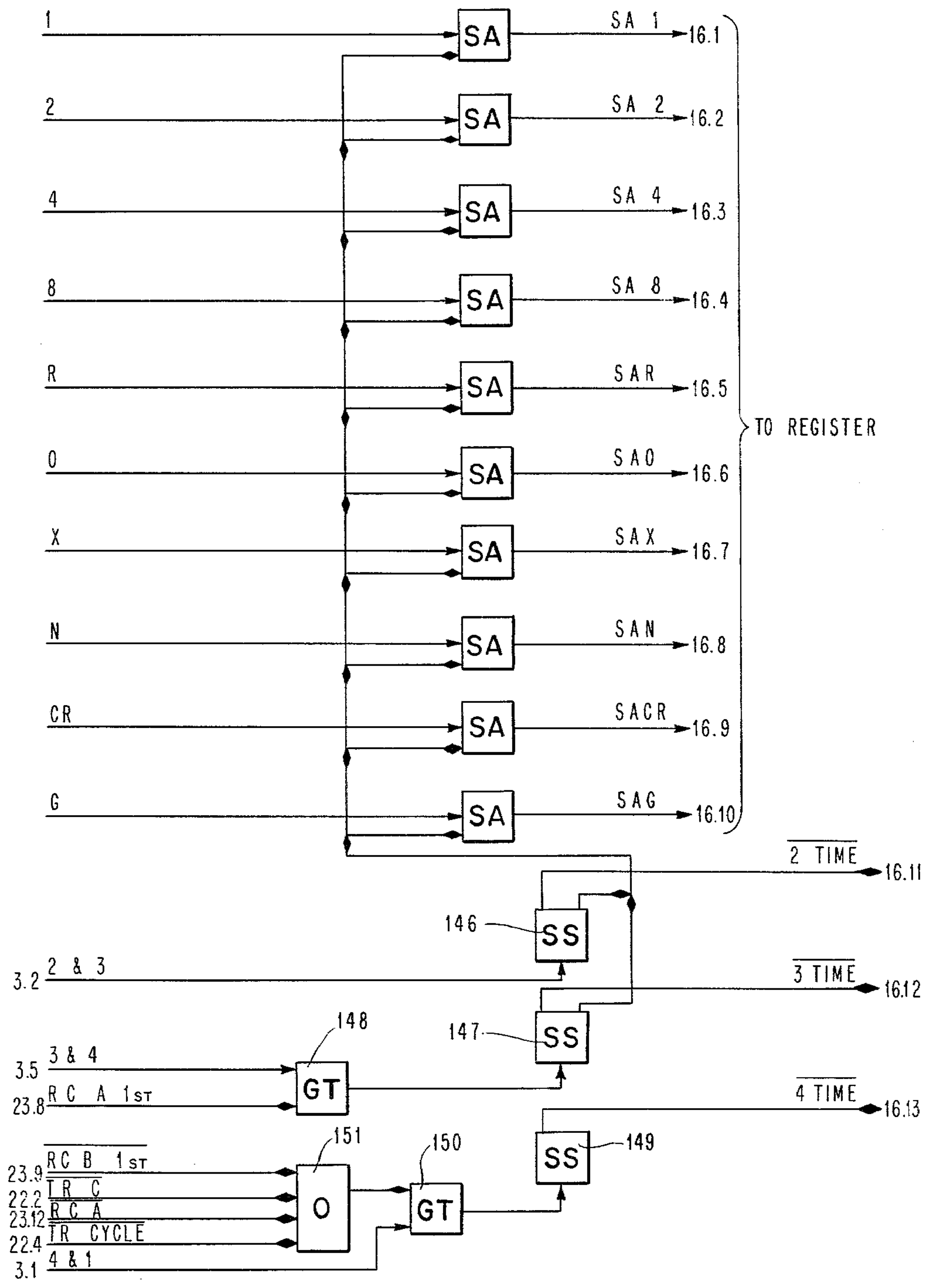

FIG. 19 TRANSMIT TAG LINE
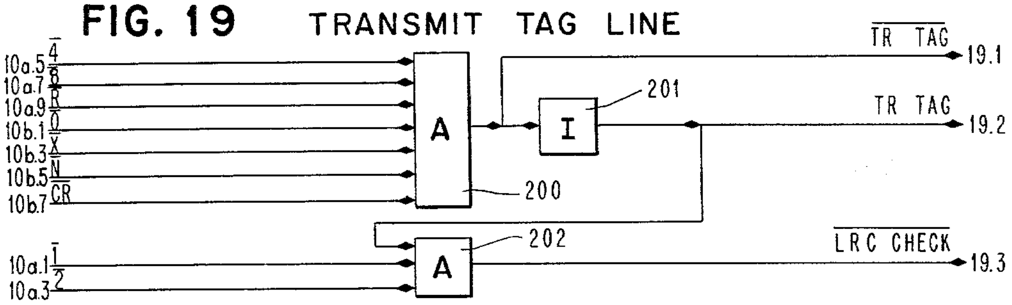
FIG. 20 CONTROL CODE RECOGNIZER
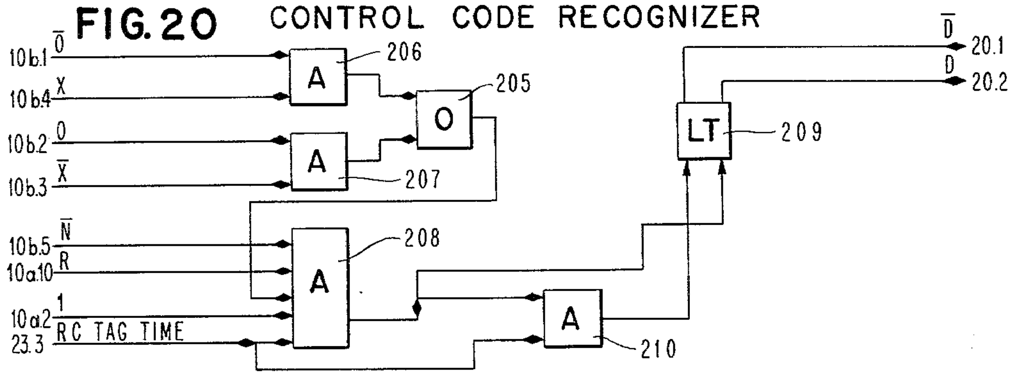
FIG. 21 SEND DATA TRIGGER
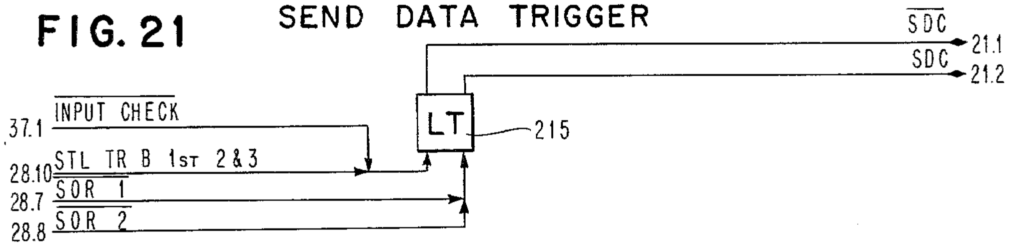
TRANSMIT TO LINE TRIGGER
FIG. 18
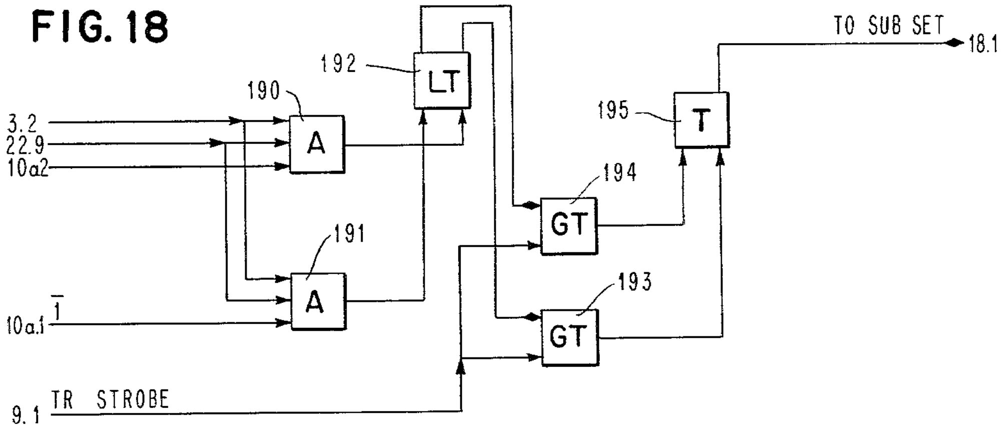

Sept. 21, 1965 C. R. DOTY, SR., ET AL 3,208,049

SYNCHRONOUS TRANSMITTER-RECEIVER

Filed Aug. 25, 1960 30 Sheets-Sheet 16

TR CYCLE CONTROL

RC CYCLE CONTROL

FIG. 25

| | | TRANSMIT FUNCTIONS | | | | | | | | | | | |
|---|---|---|---|---|---|---|---|---|---|---|---|---|---|
| | | A | | | | B | | | | C | | | |
| CLOCK STEPS → | | 1 | 2 | 3 | 4 | 1 | 2 | 3 | 4 | 1 | 2 | 3 | 4 |
| 1ST CYCLE | NOT DATA | REGISTER RESET | ENTER TRAILER | CLEAR | ENTER EMITTER | REGISTER RESET | ENTER LEADER OR READ EMITTER | FIRST POSITION OF REGISTER TO LINE LATCH | ENTER SHIFT | REGISTER RESET | — | CLEAR | — |
| | DATA | REGISTER RESET | INPUT CALL | CLEAR | ENTER TRANSLATOR | REGISTER RESET | READ TRANSLATOR | FIRST POSITION OF REGISTER TO LINE LATCH | ENTER SHIFT | NO RESET | READ LRC | CLEAR | ENTER LRC |
| | LRC | REGISTER RESET | — | CLEAR | — | REGISTER RESET | READ LRC | FIRST POSITION OF REGISTER TO LINE LATCH | ENTER SHIFT | REGISTER RESET | — | CLEAR | — |
| 2ND THROUGH 7TH CYCLES | | | | | | CLEAR AND REGISTER RESET | READ SHIFT | FIRST POSITION OF REGISTER TO LINE LATCH | ENTER SHIFT | REGISTER RESET | — | CLEAR | — |
| 8TH CYCLE * | TAG HAS SHIFTED TO "2" & REGISTER IS EMPTY FROM 3 DOWN | | | | | CLEAR AND REGISTER RESET | READ SHIFT | FIRST POSITION OF REGISTER TO LINE LATCH * TAG | — | REGISTER RESET | — | CLEAR | — |

FIG. 26

| | | RECEIVE FUNCTIONS | | | | | | | |
|---|---|---|---|---|---|---|---|---|---|
| | | A | | | | B | | | |
| CLOCK STEPS → | | 1 | 2 | 3 | 4 | 1 | 2 | 3 | 4 |
| 1ST CYCLE | NOT IN DATA CONDITION | REGISTER RESET | READ SHIFT | READ LRC | — | REGISTER RESET | ENTER 1ST BIT & TAG | CLEAR | ENTER SHIFT |
| 1ST CYCLE | DATA CONDITION NOT AFTER DATA CHARACTER | REGISTER RESET | READ SHIFT | — | — | REGISTER RESET | ENTER 1ST BIT & TAG | CLEAR | ENTER SHIFT |
| 1ST CYCLE | DATA CONDITION AFTER DATA CHARACTER | REGISTER RESET | READ SHIFT | READ LRC | ENTER LRC | REGISTER RESET | ENTER 1ST BIT & TAG | CLEAR | ENTER SHIFT |
| 1ST CYCLE | LRC | REGISTER RESET | READ SHIFT | READ LRC | CHECK LRC | REGISTER RESET | ENTER 1ST BIT & TAG | CLEAR | ENTER SHIFT |
| 2ND THROUGH 7TH CYCLES | | REGISTER RESET | READ SHIFT & ENTER 2-7 BITS | CLEAR | ENTER SHIFT | REGISTER RESET | — | CLEAR | — |
| 8TH CYCLE | * (TAG HAS SHIFTED INTO "CR" POSITION OF REGISTER) | REGISTER RESET | READ SHIFT & ENTER 8TH BIT | CLEAR | ENTER SHIFT & TRANSLATOR & ANALYZER | REGISTER RESET | RD ANALYZER OR TRANSLATOR & MAKE OUTPUT CALL ON DATA | CLEAR & MAKE OUTPUT CALL ON DATA | — |
| 8TH CYCLE | LRC | REGISTER RESET | READ SHIFT & ENTER 8TH BIT | CLEAR | ENTER SHIFT | REGISTER RESET | — | CLEAR | — |

Sept. 21, 1965 C. R. DOTY, SR., ETAL 3,208,049

SYNCHRONOUS TRANSMITTER-RECEIVER

Filed Aug. 25, 1960 30 Sheets-Sheet 21

SEND LEADER CONTROL

FIG. 32 REPLY & RECEIVE CONTROL
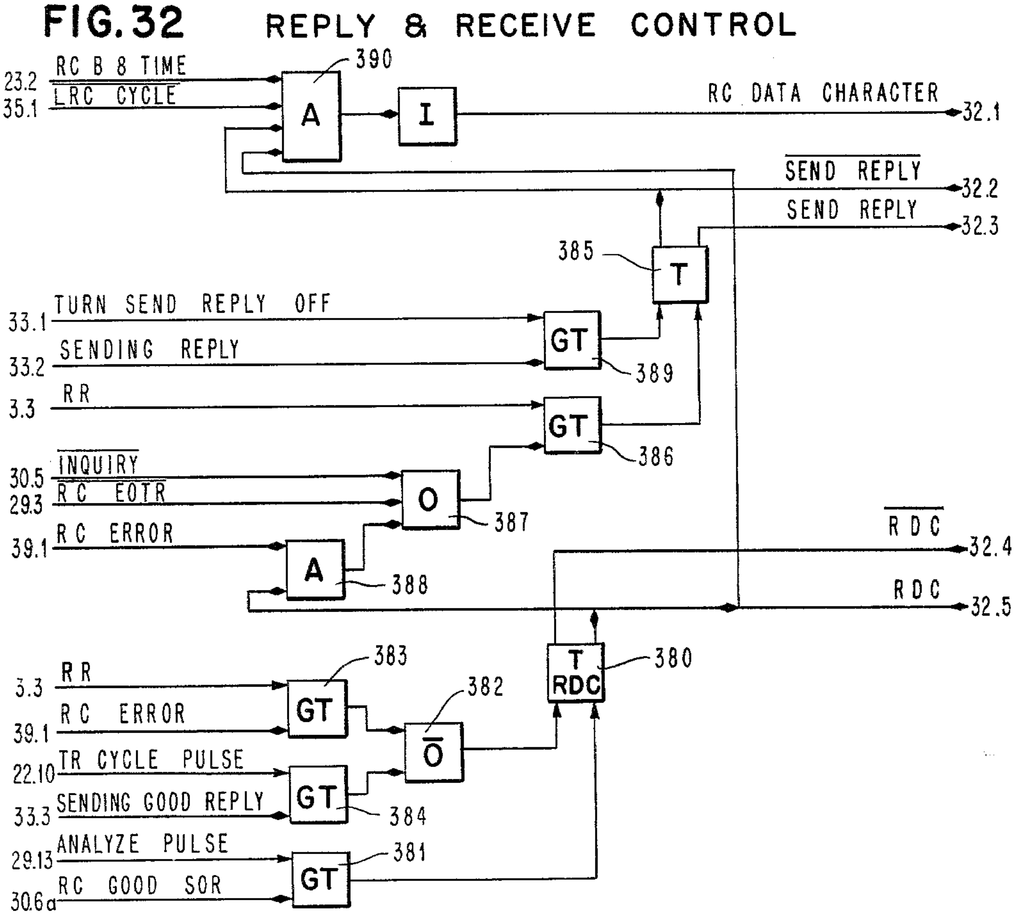
FIG. 33 REPLY INDICATOR
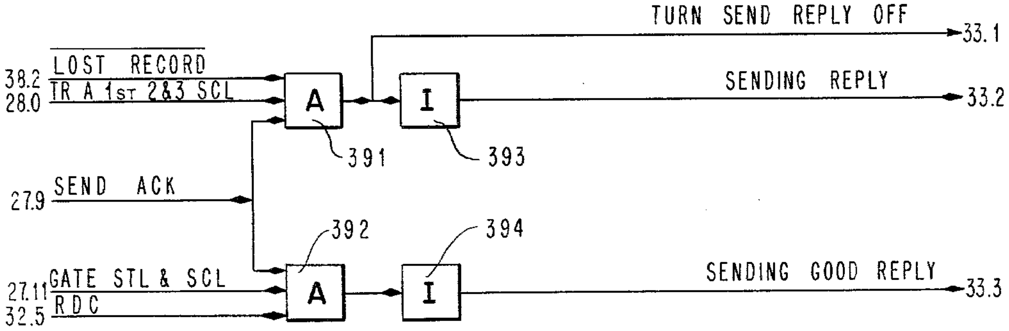

REPLY ANALYZER

LRC CYCLE CONTROL

FIG. 36 CHECK CONTROLS
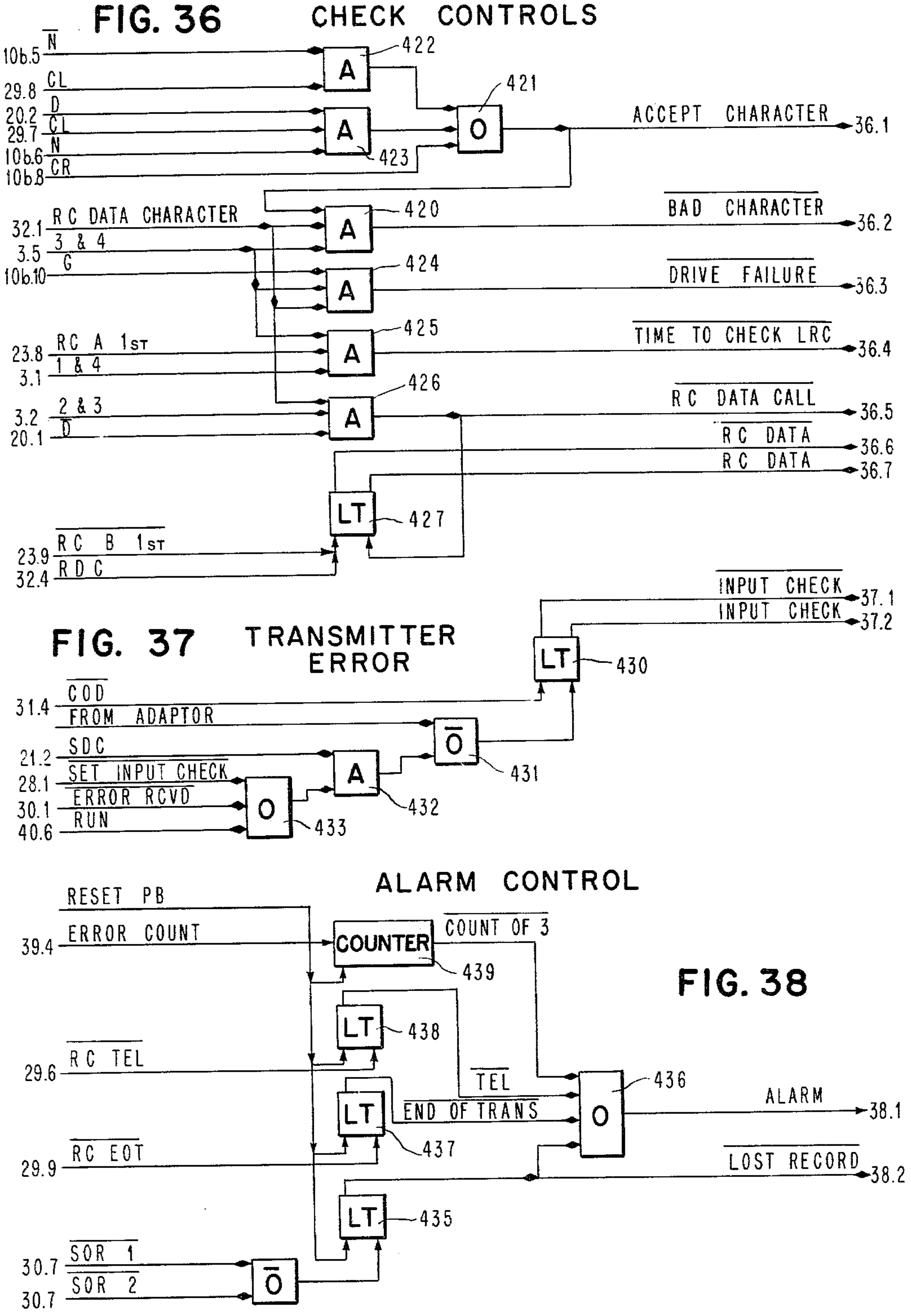
FIG. 36, FIG. 37 TRANSMITTER ERROR, FIG. 38 ALARM CONTROL Sept. 21, 1965 C. R. DOTY, SR., ET AL 3,208,049

SYNCHRONOUS TRANSMITTER-RECEIVER

Filed Aug. 25, 1960 30 Sheets-Sheet 29

ERROR ANALYZER

Sept. 21, 1965 C. R. DOTY, SR., ETAL 3,208,049

SYNCHRONOUS TRANSMITTER-RECEIVER

Filed Aug. 25, 1960 30 Sheets-Sheet 30

RUN CONTROL

United States Patent Office 3,208,049
Patented Sept. 21, 1965

3,208,049
SYNCHRONOUS TRANSMITTER-RECEIVER

Charles R. Doty, Sr., Vincent H. Cackowski, and George Evanick, Poughkeepsie, Roy J. Smith, Wappingers Falls, and Lawrence A. Tate, Poughkeepsie, N.Y., assignors to International Business Machines Corporation, New York, N.Y., a corporation of New York Filed Aug. 25, 1960, Ser. No. 51,956
14 Claims. (Cl. 340—172.5)

This invention relates to transmission of data and particularly to high speed transmission of encoded digital data over telephone, high speed telegraph or radio circuits.

Expanding industries are finding a greater need for computer systems in the transaction of business at geographically separated locations. The computer field is presenting these industries with more efficient means for conducting their business. The need often arises for the transmission of stored recorded data from one location to another. This data, in the form of records or computer outputs, is presented in digital form giving rise to a compatibility with existing transmission facilities.

It is a general object of this invention to enable rapid and accurate transfer of records consisting of digital data from a storage device at one location to a storage device at another location by employing transmission facilities.

It is another object of this invention to provide rapid and accurate transfer of stored binary data either on a half-duplex mode or full-duplex mode of operation.

It is an additional object of this invention to provide synchronization between a transmitter and receiver without the need for synchronization bits in addition to data bits transmitted over transmission facilities.

Another object of this invention is to provide means for selectively lengthening, shortening or maintaining the period between generated pulses used for sampling received signals from a transmission medium.

It is also an object of this invention to enable the rapid and accurate transmission of data records from one location to another over transmission facilities wherein the complete loss or duplication of records is prevented.

It is also an object of this invention to provide means for transmitting control characters for distinguishing the start of adjacent records to be transmitted.

It is an additional object of this invention to provide means for transmitting control characters for distinguishing receipt of adjacent records correctly received.

These and other objects are attained with the invention which is capable of full-duplex or half-duplex operation. By way of introduction as to the various functions which may be performed by the invention, a half-duplex arrangement will be discussed.

The invention, hereinafter referred to as the Synchronous Transmitter-Receiver, accepts record data in the form of multibit binary characters from an input device. After translation to a transmittal code, the Transmitter-Receiver places the transmittal code a bit at a time on a transmission medium through suitable modulation equipment. At a receiving station, the serially received bits are demodulated and presented to the Transmitter-Receiver a bit at a time for forming a complete multi-bit character. When a complete character is received, the character is suitably translated to an output code for presentation to an output device which is to receive the record being transmitted.

Synchronization of the receiving Synchronous Transmitter-Receiver (STR) is maintained without the use of separate synchronizing pulses from the transmitter. Synchronization must be maintained, in that each character transmitted has meaning only because of the time position arrangement of the individual bits within the character. The invention discloses a synchronizing means whereby synchronization is maintained at the receiving STR by utilizing only the data bits transmitted by the transmitting STR. The receiving STR generates a sampling strobe pulse which must be generated and maintained as near as possible at the center of received bits. Means are provided at the receiving STR for indicating the position of the strobe pulse with respect to the center of received data bits. A count of the time between the start of a received bit and the occurrence of the sample strobe pulse is added to a count of the time between the fall of the received signal and the next following sample strobe pulse. This count is compared with a standard, and after three successive indications of a deviation from the standard, the sample strobe pulse is caused to be retarded or advanced from its normal occurrence thereby maintaining the pulse as near as possible at the center of received signals.

In addition to being able to translate and transmit data characters, each STR is capable of internally generating and analyzing a group of control characters for controlling various functions within each STR. When the transmitting STR is ready to transmit data and the input device is ready, the transmitting STR will generate a control character and transmit it to the receiving STR inquiring of the receiving STR and output device as to whether they are ready to accept data. The receiving STR, when ready, will generate a control character indicating its ready condition, and when this reply is received by the transmitting STR, a call will be made to the input device for the first character of the first record. The transmitting STR will precede the first record with a control character identifying the first record, and will then proceed to transmit the record which may be of a variable length.

After each translation by the transmitting STR, a character will be formed indicating whether there has been an odd or even number of bits generated for a particular bit position in each character of a record. The receiving STR will also form a character indicating an odd or even number of bits received for each bit position of each character.

An end-of-record indication from the input device to the transmitting STR will cause transmission of the odd-even character accumulated throughout the record. The odd-even character will be received by the receiving STR and compared to the odd-even character it has accumulated. There are several actions the receiving STR may take depending on the accuracy of the transmission. The receiving STR may reply with an acknowledgment indicating correct receipt of the entire record. A comparison of the odd-even characters may indicate a lost bit during transmission and the receiving STR may reply with an error signal. Under certain conditions, the receiving STR may block any type of reply signal.

The transmitting STR upon receipt of the reply characters from the receiving STR may take several actions. When the transmitting STR receives a correct acknowledgement, the next record will be called forth from the input device. If the error signal is received, the transmitting STR will cause the input device to go back and retransmit the entire record again. When the record transmitting STR receives no reply from the record receiving STR, it will wait a predetermined time for a reply and when it is not received, will send an inquiry signal requesting a reply from the record receiving STR.

Memory means are provided in each STR for identifying adjacent records to be transmitted and to be received. The record transmitting STR generates a first control character indicating the start of the first record and every other odd record transmitted. A second start-of-record control character is generated for the second record transmitted and every even record transmitted thereafter. The receiving STR replies with a first acknowledgment character for the first record received and every other odd record received and replies with a second control character acknowledging receipt of the second record and every other even numbered record. The transmitting memory means conditions certain logic for recognizing whether the acknowledgment received from the receiving STR was for an odd or even record. The transmitting memory means is also effective to cause the transmission of the proper start-of-record character for the next record.

The receiving STR has memory means effective to remember whether the last record correctly acknowledged for was an odd or even record. The receiving memory means is also effective to generate the proper acknowledging character.

Assuming a reply has been received from the receiving STR acknowledging receipt for an odd record, the transmitting STR will recognize the correct acknowledgment and shift the transmitting memory means to the even record indication. When the receiving STR transmits the correct acknowledgment, its memory means is shifted to the odd record indication. The transmitting memory means will cause the even start-of-record character to be transmitted and when the correct start-of-record character is received by the receiving STR, the receiving STR will go into a received data condition. Upon correct and complete receipt of the record, the receiving memory means will be shifted to the even record indication and will cause acknowledgment for the even record to be generated. The receiving memory means now indicates that it has acknowledged for an even record. Receipt of the even record acknowledgment by the transmitting STR will shift the memory means to the odd indication. The correct reply from the receiving STR will cause the next record to be preceded by the odd record control character. When the memory means of the receiving STR indicates it should receive an odd start-of-record but receives an even start-of-record, the receiving STR will not go into a receive data condition and will sound an alarm indicating a lost record. This condition will also block the sending of any reply by the receiving STR. The memory means of the transmitting STR will not be shifted in the absence of a good reply. The receiving memory means will not be shifted in the absence of sending a good reply. Through the use of the transmitting and receiving memory means, lost or duplicate records will be indicated.

Full-duplex operation or half-duplex operation is possible with the Synchronous Transmitter-Receiver of the present invention. The STR is capable of both types of operation without the need of duplicating equipment. Alternate transmit and receive cycles are generated through suitable control means. A single register is used to accumulate a received character and also to transmit a character. Suitable means are provided under control of the control means for temporarily storing a character to be transmitted and means are provided for temporarily storing a character being received. A character to be transmitted will be placed in the register, and the first position of the register will send the first bit to the modulation equipment for transmission to the line. The control means will then place the remaining bits of character to be transmitted in the transmitting temporary storage means. The register is cleared and a received bit is placed in the register. The received bits are then placed in the receiving temporary storage means. The character to be transmitted is then read out of the temporary transmit storage means. The temporary transmit storage means is effective to shift each bit of the character to be transmitted to the next preceding position in the register, and again, the first position of the register presents the bit to be transmitted. After transmission, the balance of the transmittal character is again placed in its temporary storage means and the bits of the received character are placed in the register means. The receiving temporary storage means is effective to shift the bits received to the next position in the register, and then to receive the next incoming bit. The received bits of the received character are again placed in temporary storage.

Means are provided in both transmit and receive cycles for inserting tag bits in proper positions in the register to be shifted along with the character being transmitted or received. A sampling of these tag bits in predetermined positions of the register gives an indication to the STR that a complete character has been transmitted or that a complete character has been received, at which time a new character will be called for from the input device for transmission and a received character will be translated to an output code and presented to the output device.

The synchronization means mentioned previously also includes a means controlling the rate at which bits are transmitted. In full-duplex operation, each STR controls its own transmitted bit rate, and thus controls the synchronization of the other STR receiving unit. In half-duplex operation, the record transmitting STR will control the transmitting bit rate of data characters and of reply characters from the record receiving STR. The receiving STR will be synchronized in accordance with the means previously discussed. The record receiving STR in half-duplex operation will be called upon to send certain reply information in the form of transmitted control characters. Means must be provided insuring that the reply characters will be received by the record transmitting STR in synchronism so they will be recognized in their proper time position relationship. In half-duplex operation, the transmitting bit rate of the receiving STR will be adjusted by the receiver bit sampling strobe pulse generating means. In this manner, the oscillator of the record transmitting STR will control the record transmitting bit rate, will provide the synchronization of the record receiving STR bit sampling strobe, and will in turn control the transmitting bit rate of the record receiving STR when it is called upon to send a reply. The bit sampling strobe pulse of the receiving section of the record transmitting STR will be tied to the oscillator controlling the transmitting bit rate. A single oscillator, therefore, in the record transmitting STR controls the transmitting bit rate, the record receiving STR bit sample strobe, the record receiving STR reply bit rate and the record transmitting STR receiver sampling strobe pulse.

The foregoing and other objects, features and advantages of the invention will be apparent from the following more particular description of a preferred embodiment of the invention, as illustrated in the accompanying drawings.

Figures 2, 4:
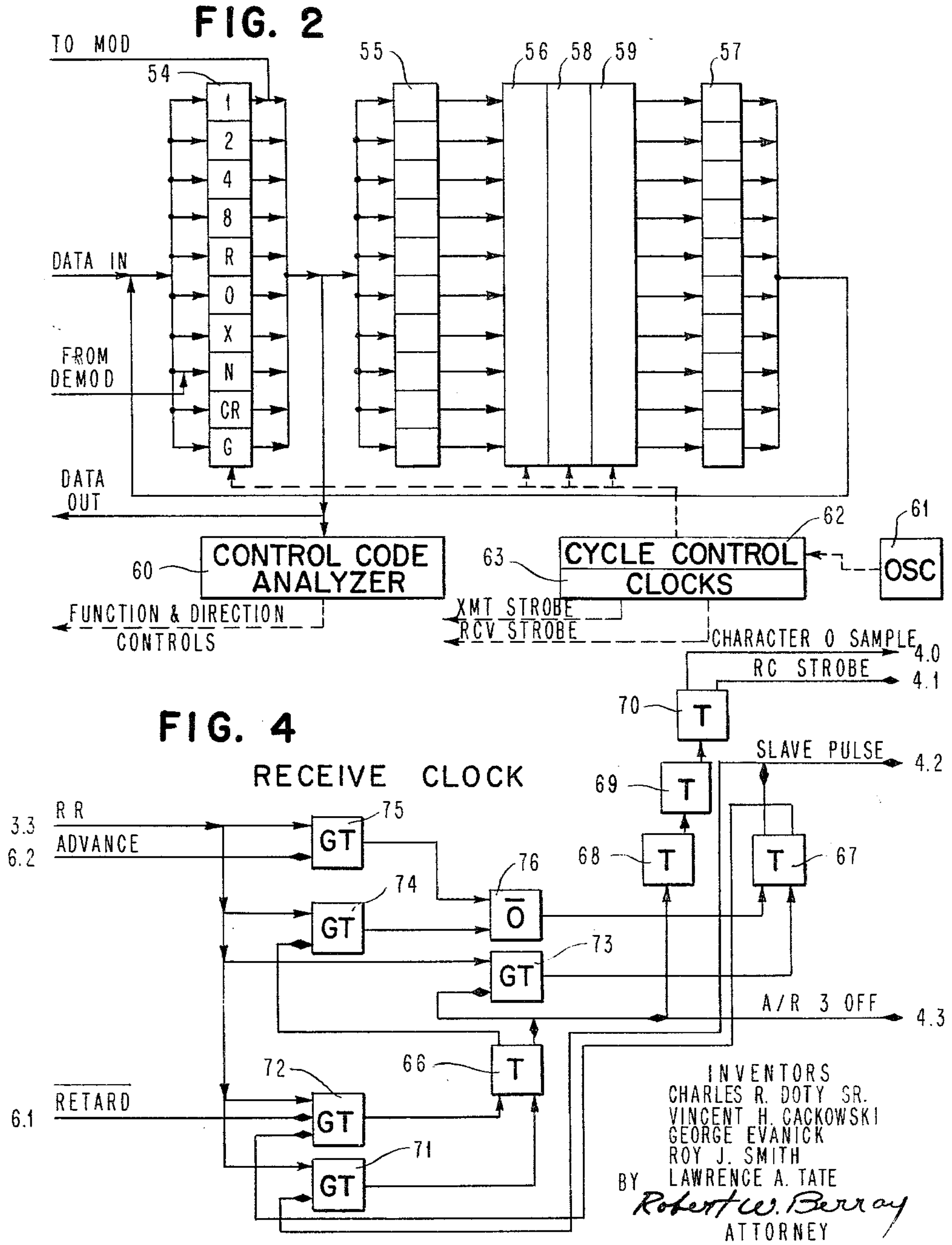
FIG. 2 is a block diagram showing information flow and control between major parts of the STR.
FIG. 4 is a logical block diagram of the receiver clock in the STR for generating a receiver strobe pulse.
Figure 6:
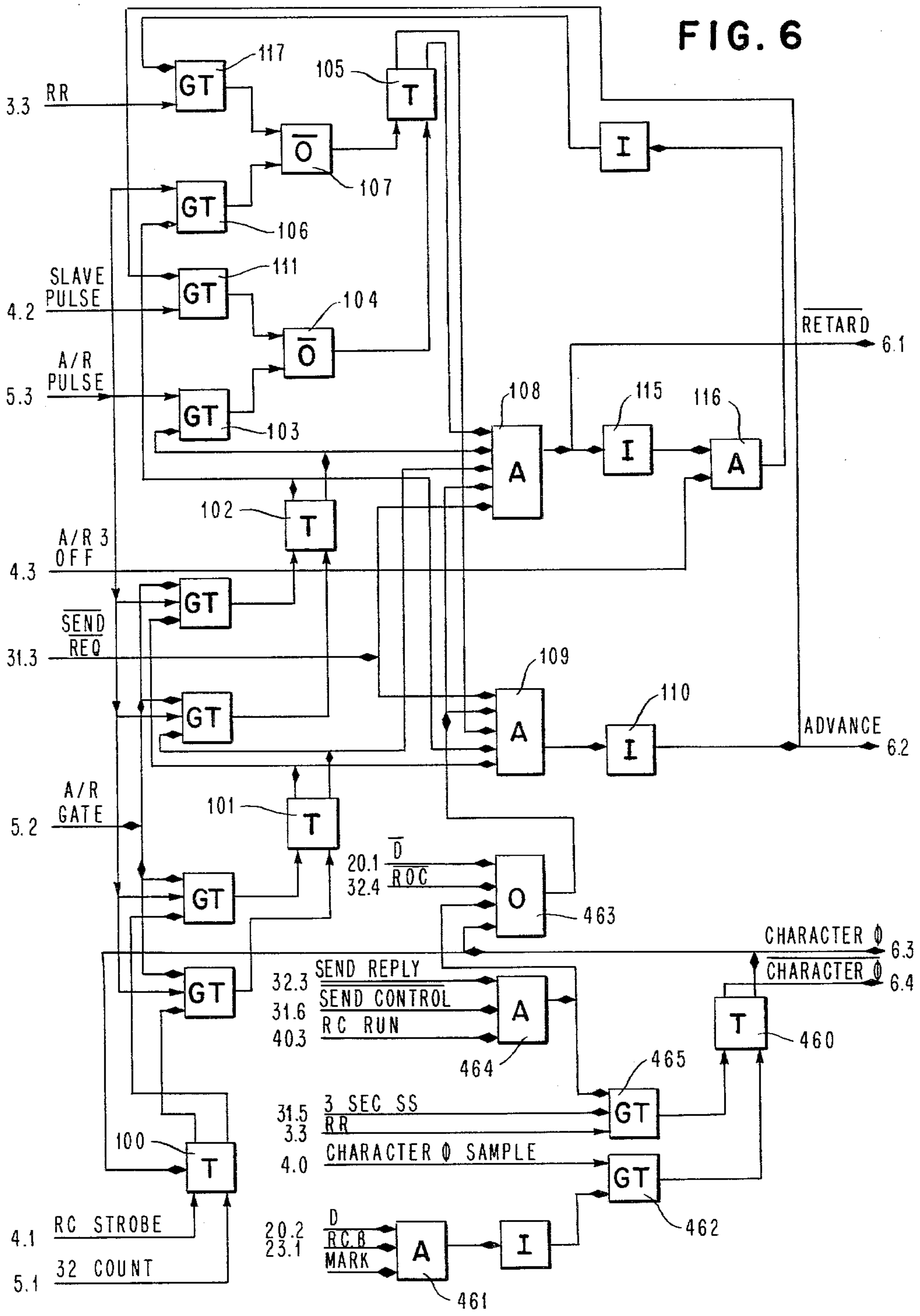
FIG. 6 is a logical block diagram showing the means responsive to the phase counter of FIG. 5 for indicating three successive deviations of a receive strobe from the center of a received signal.
Figure 7:
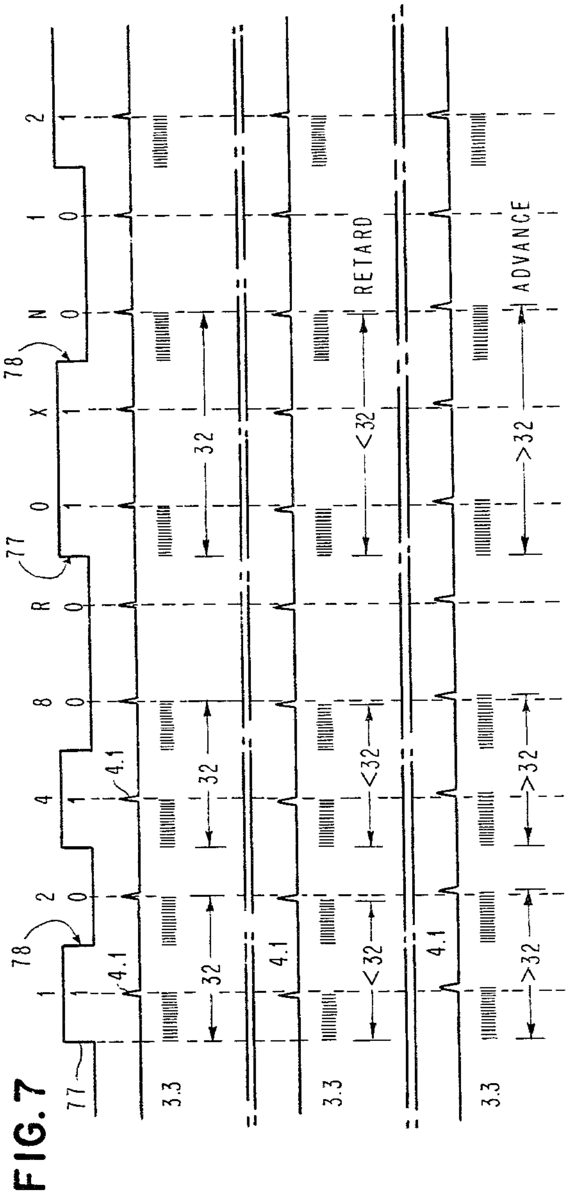
FIG. 7 is a diagram showing a series of received signals of a multi-bit, time-position coded character with an indication of the operation of the phase counter of FIG. 5.
Figure 7A:
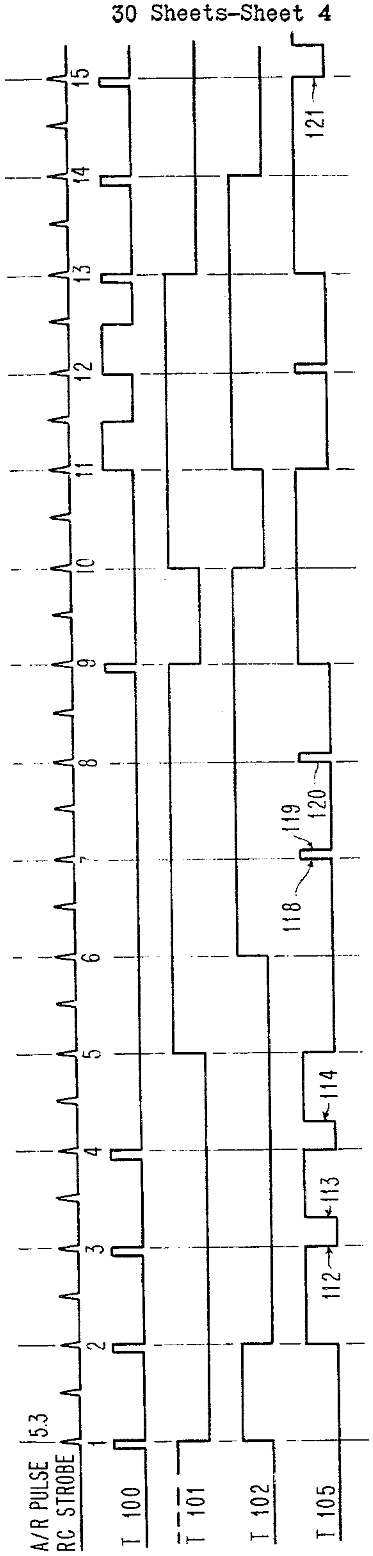
Figure 9:
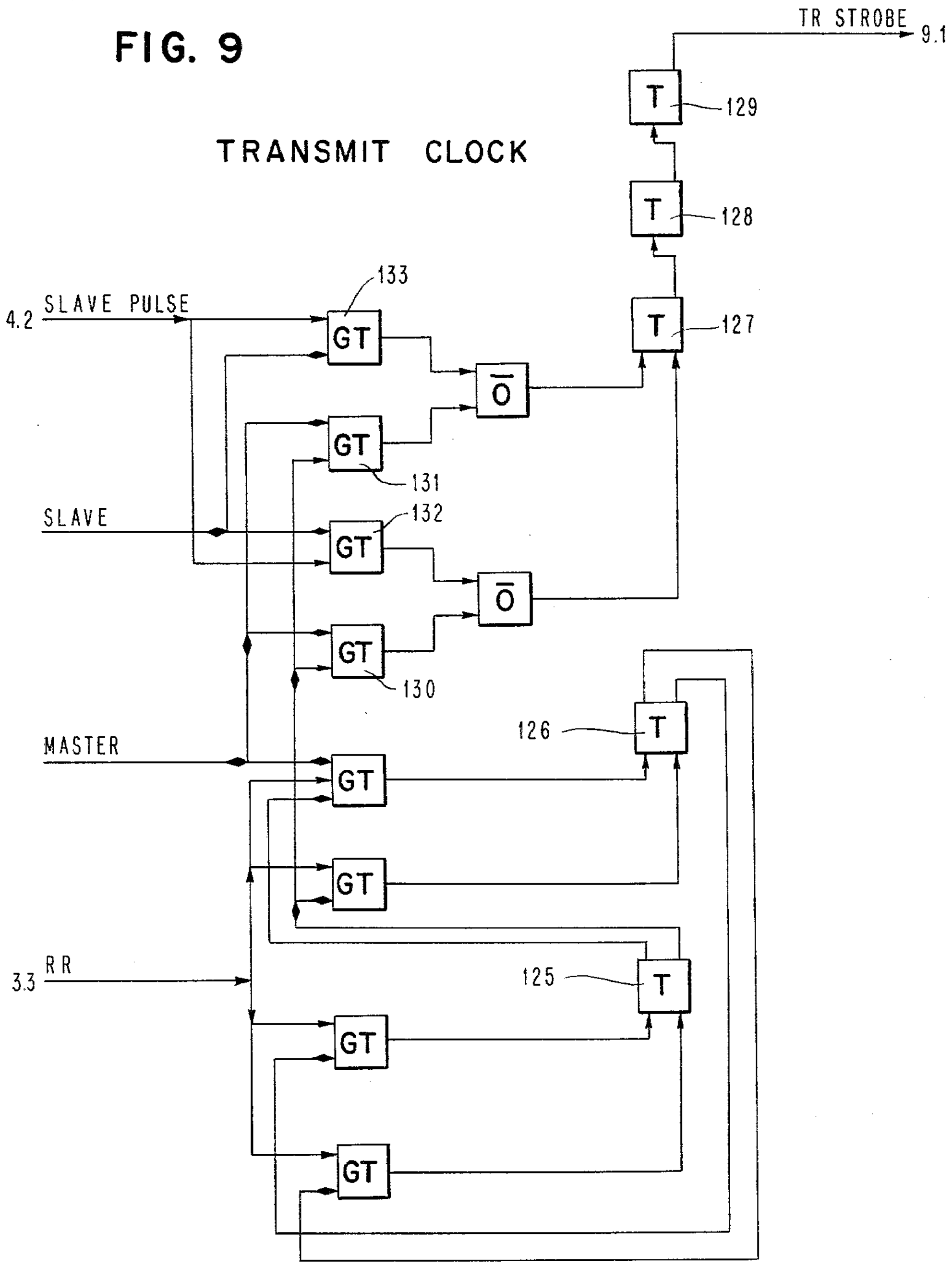
Figure 10A:
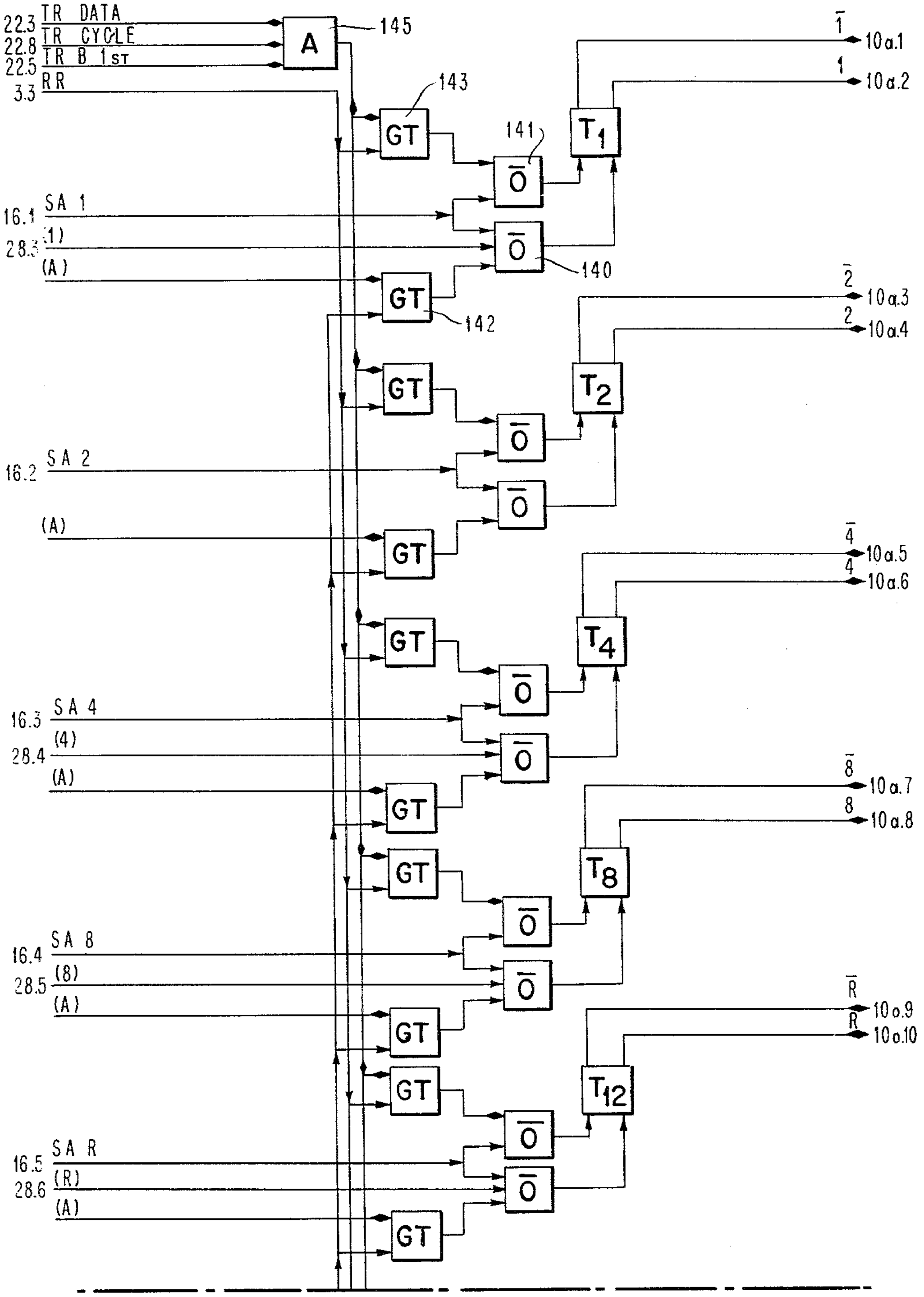
Figure 10B:
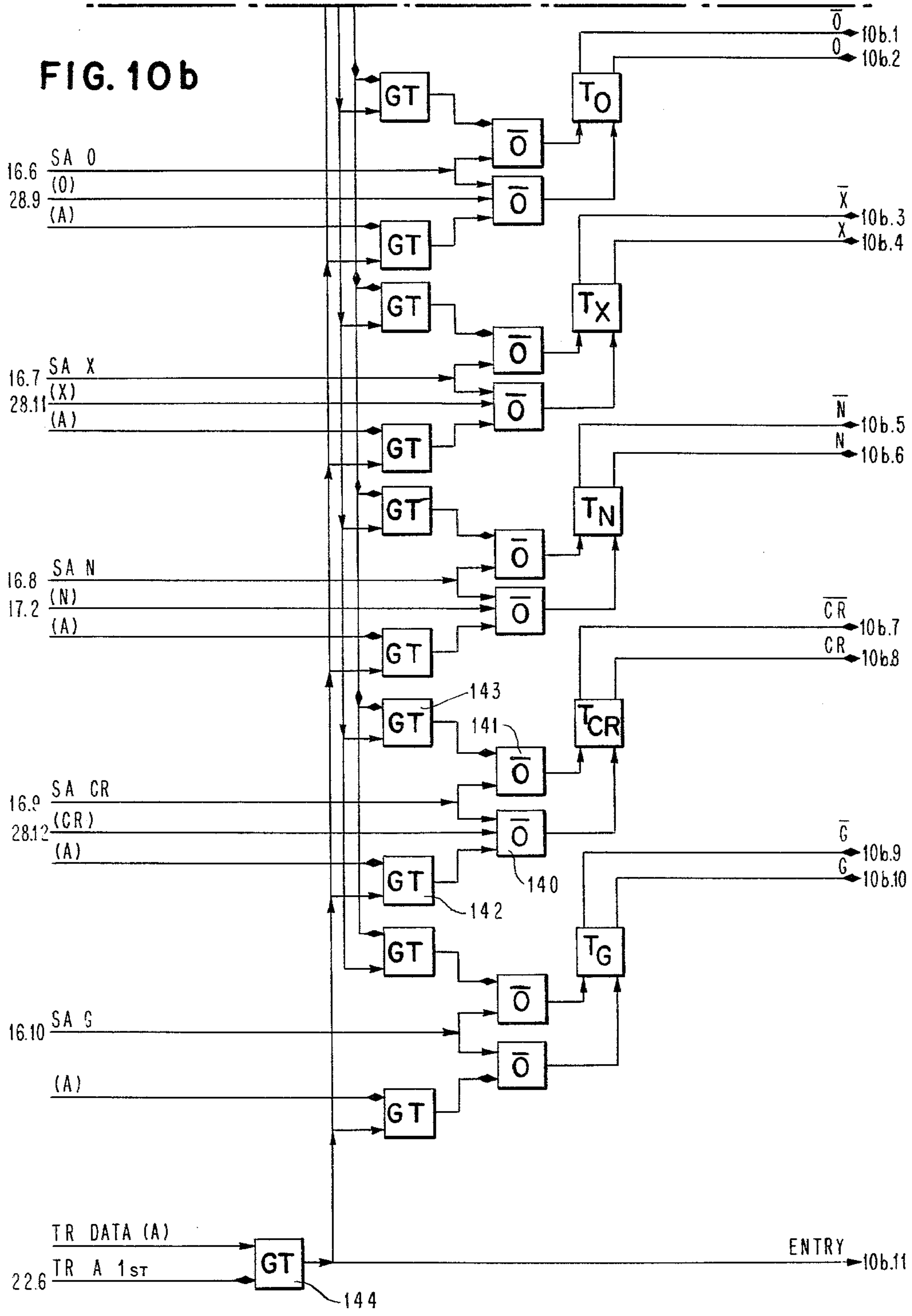
Figure 11:
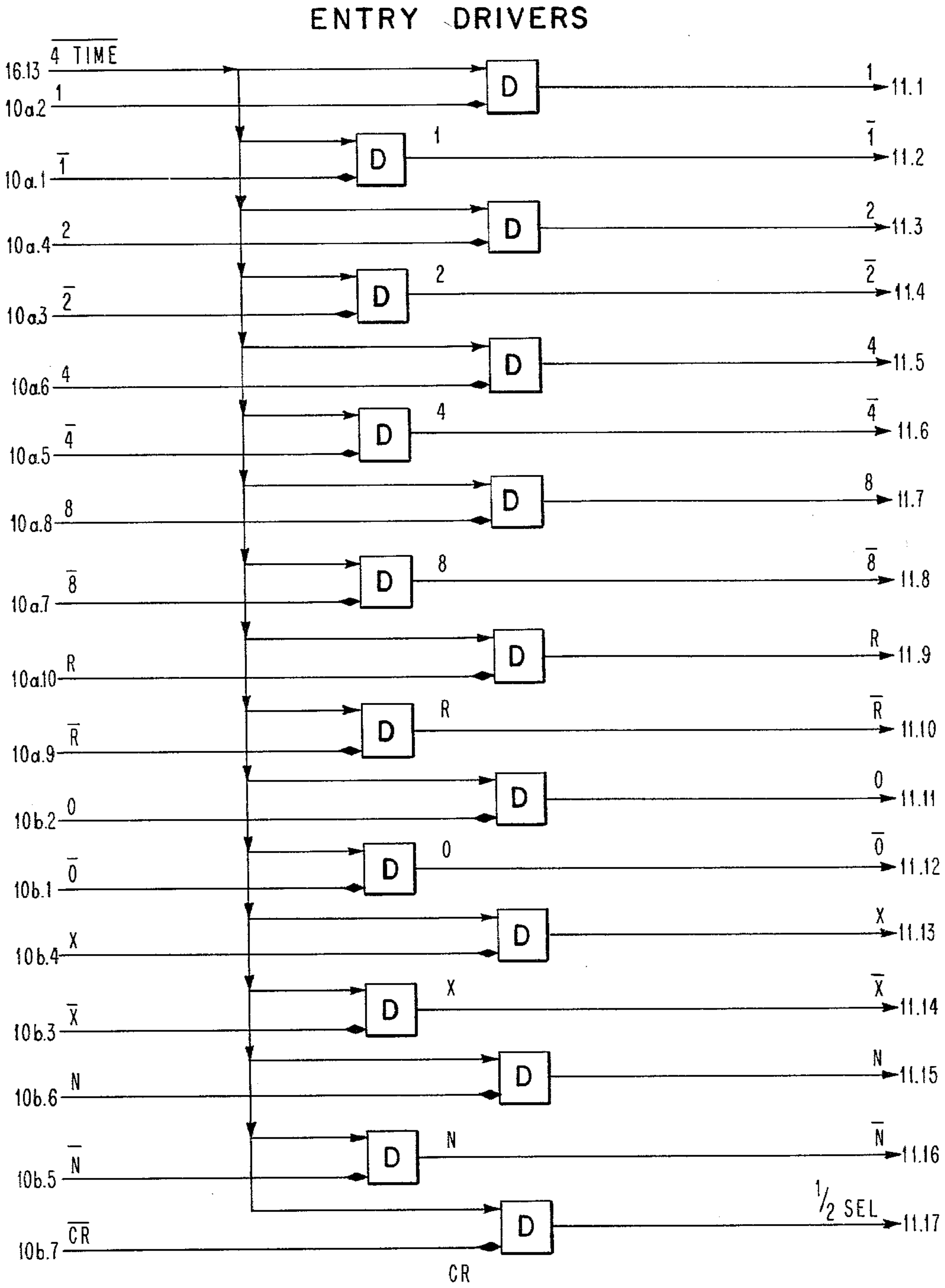
Figure 12:
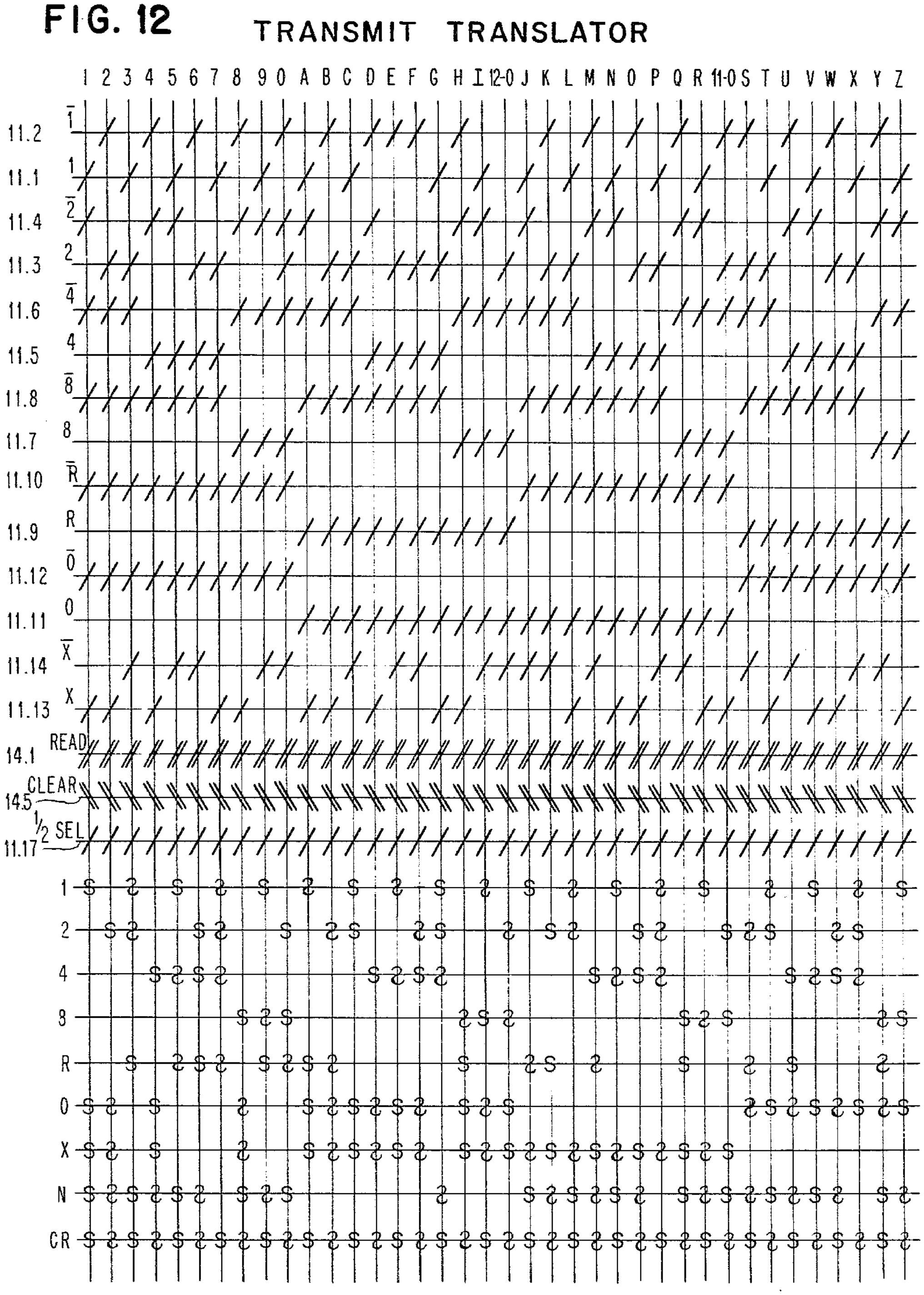
Figure 13:
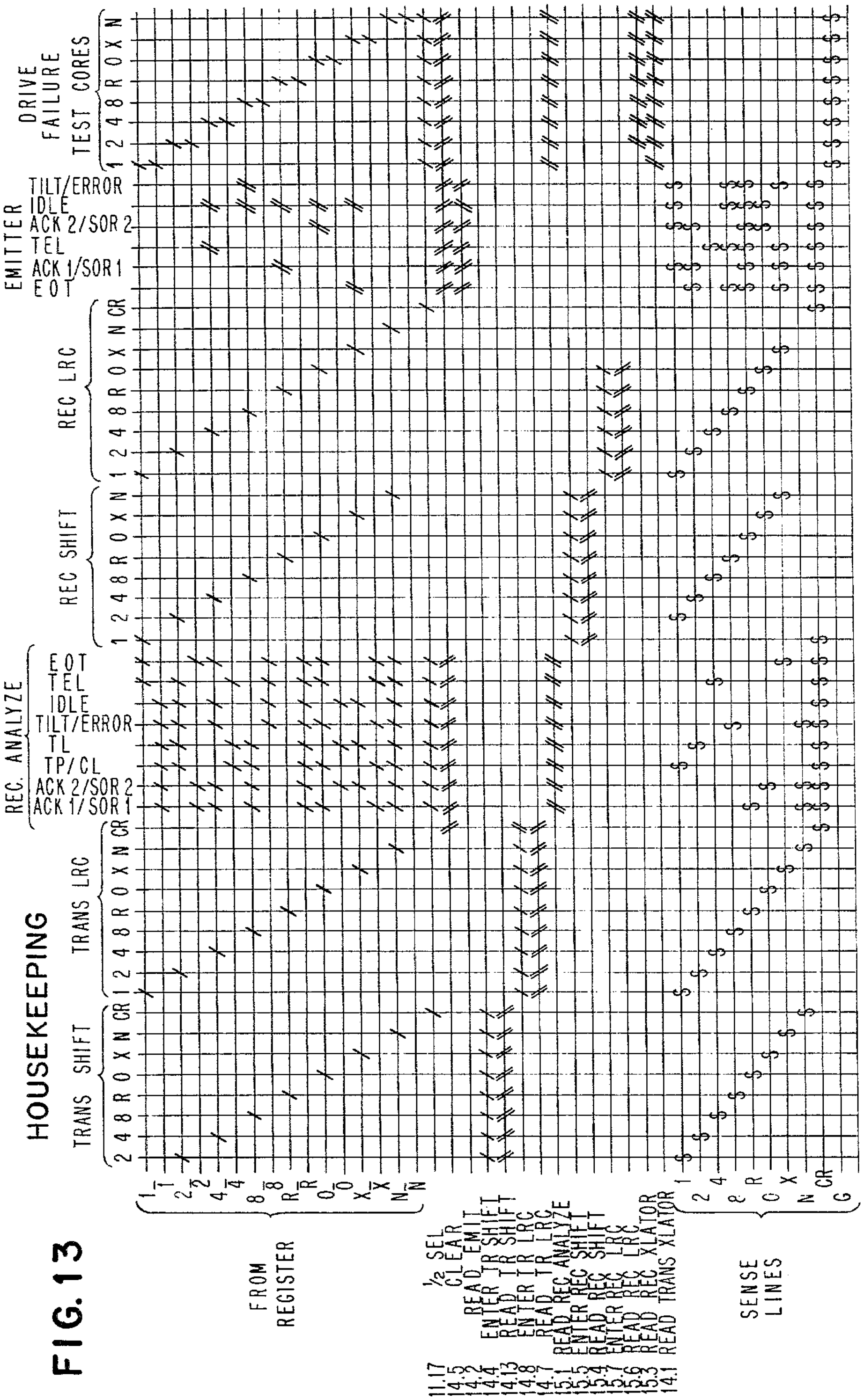
Figure 14:
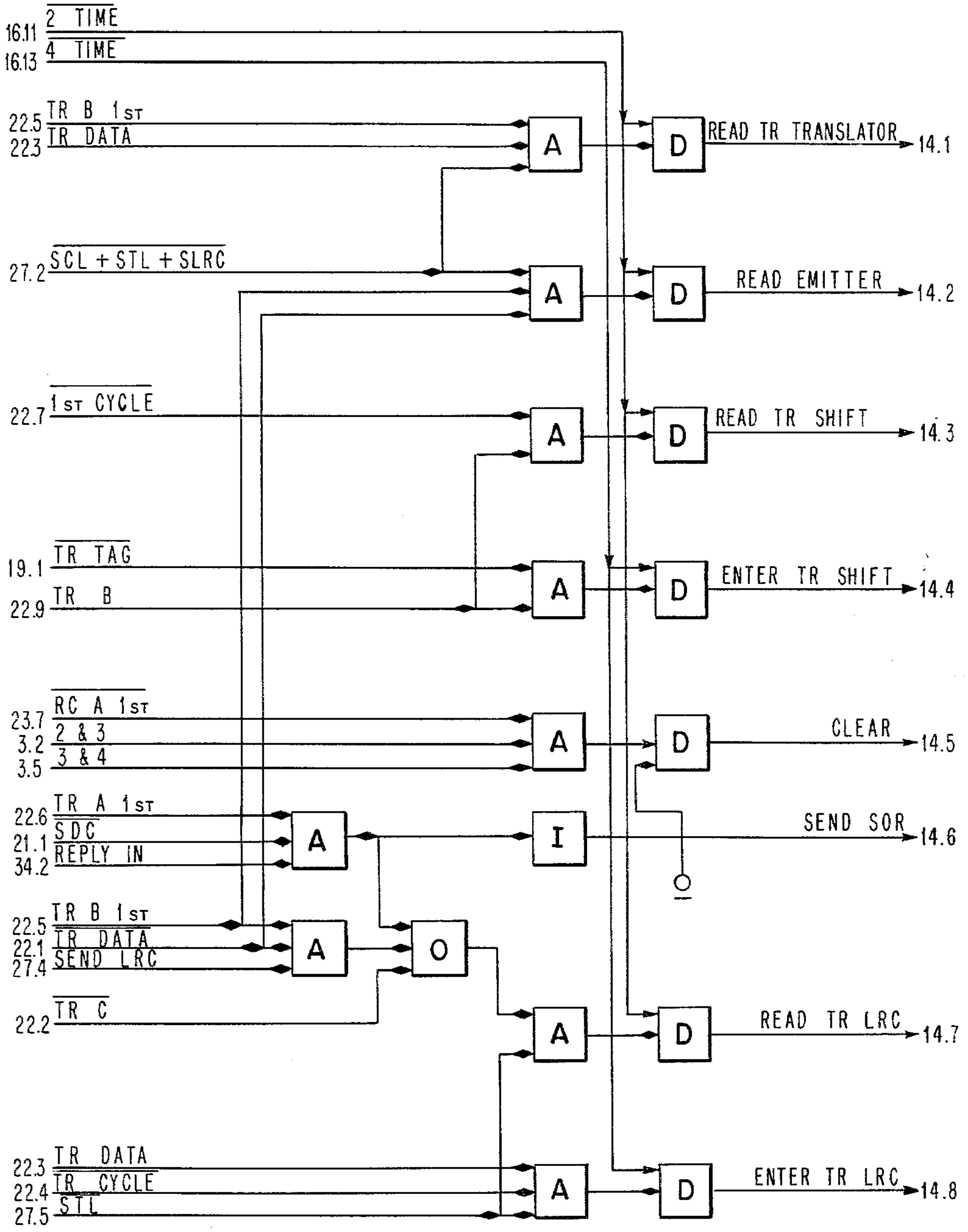
Figure 17:
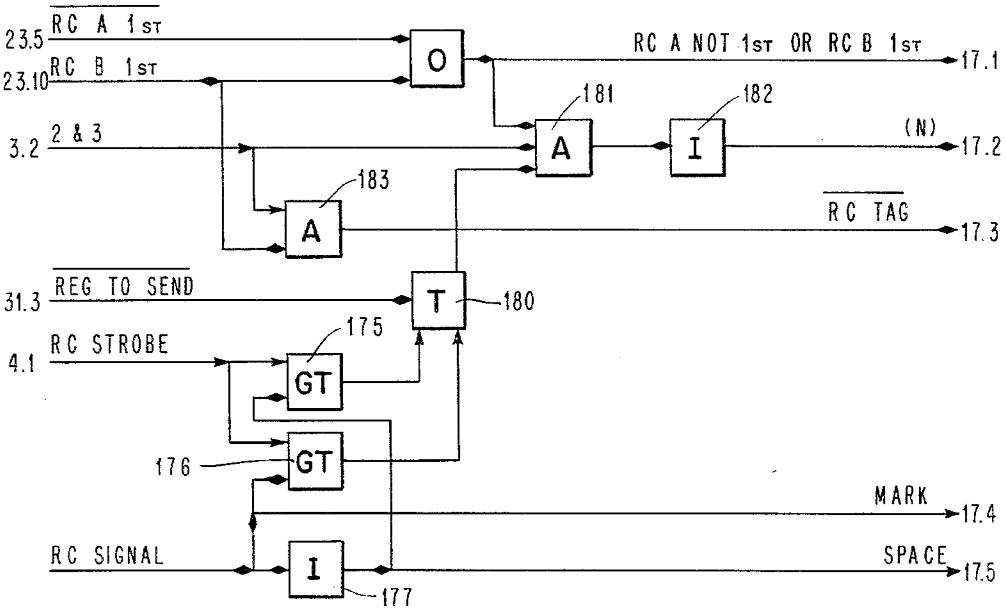
Figure 15:
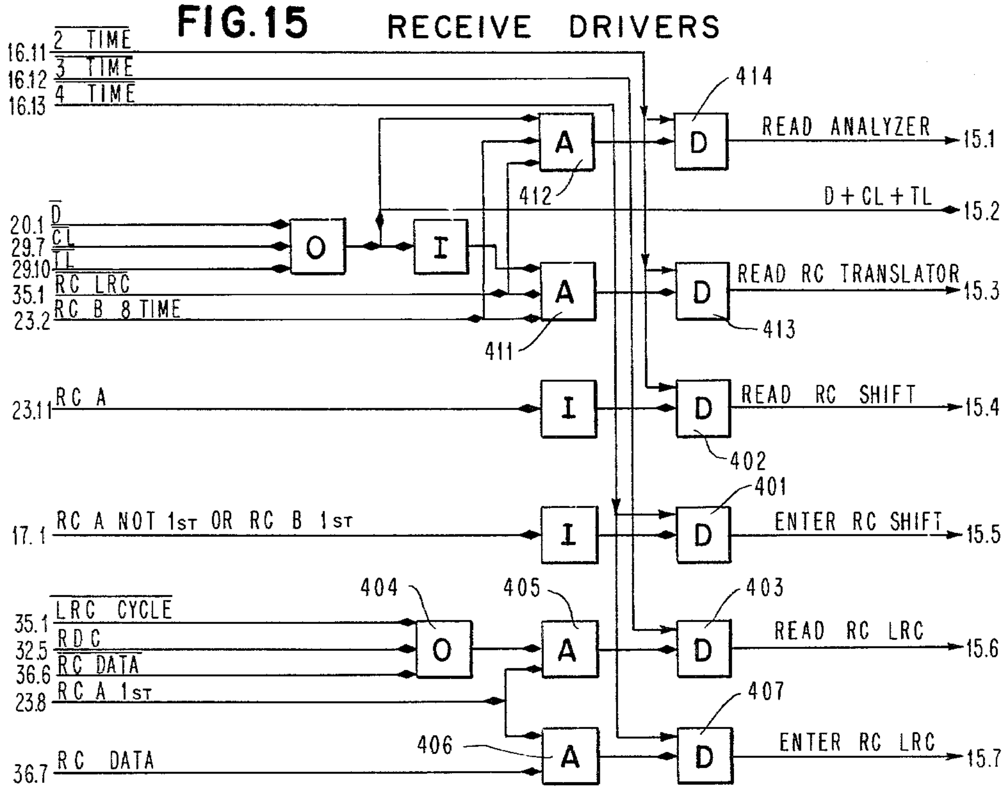
Figure 22:
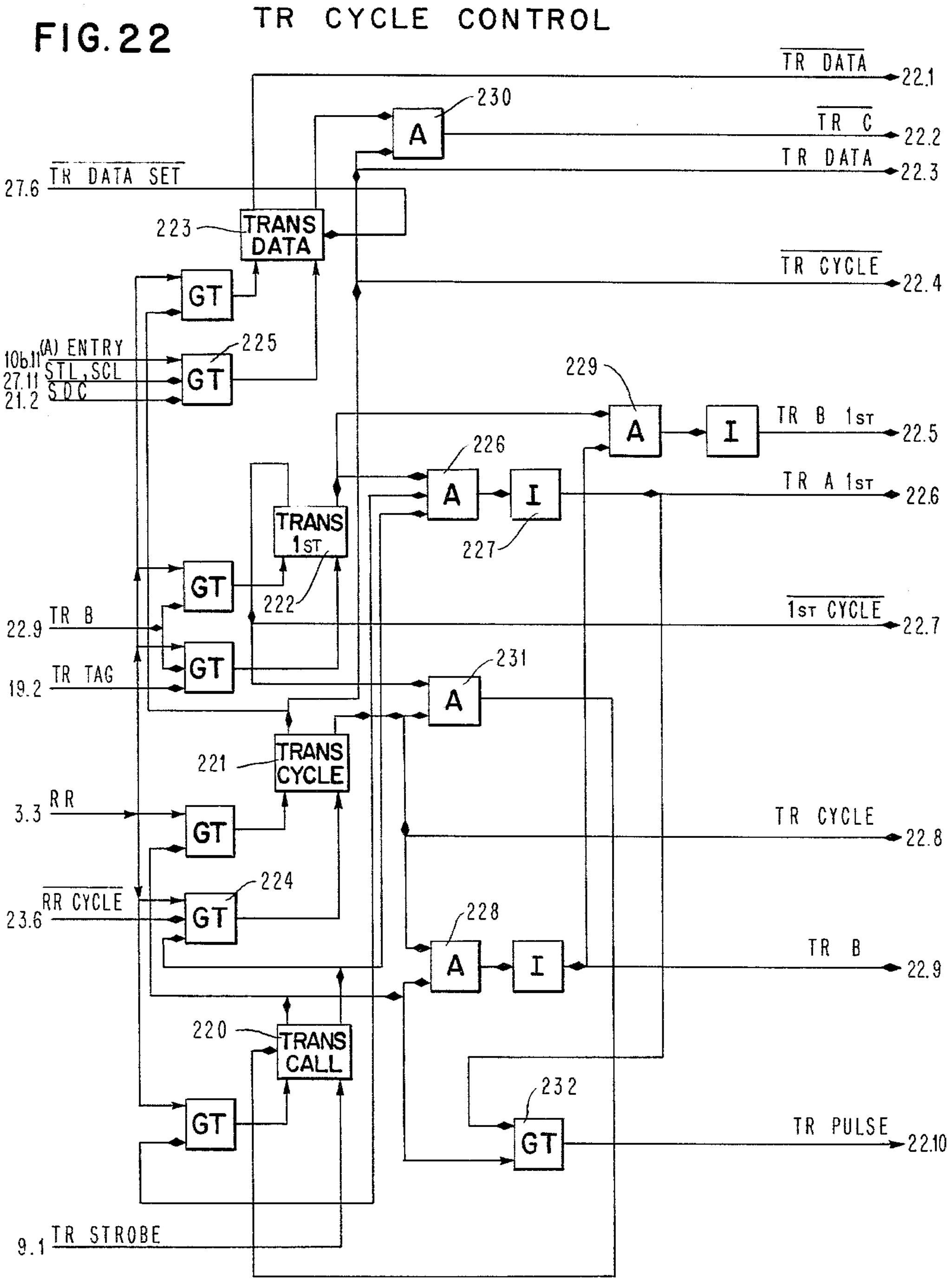
Figure 23:
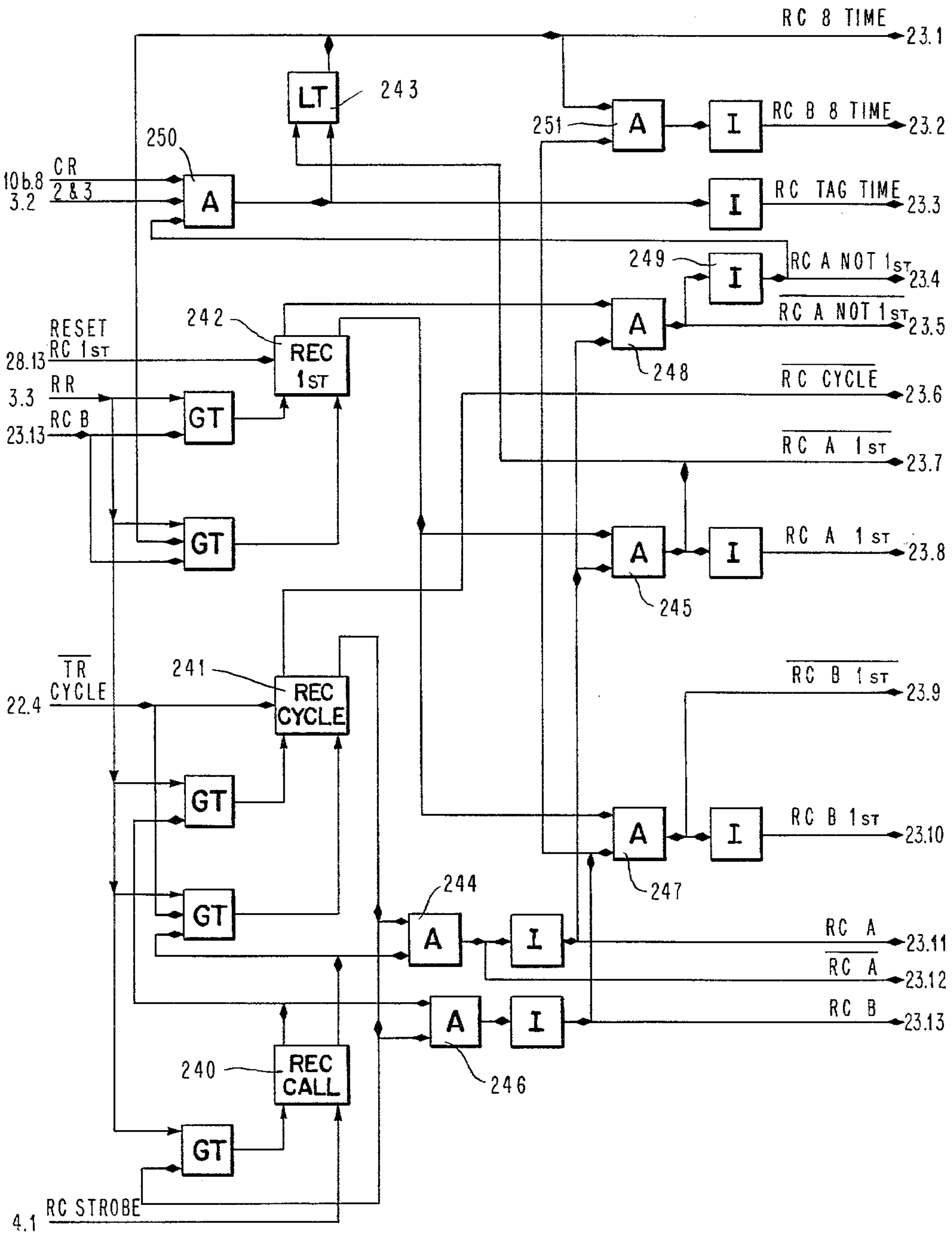
Figure 24:
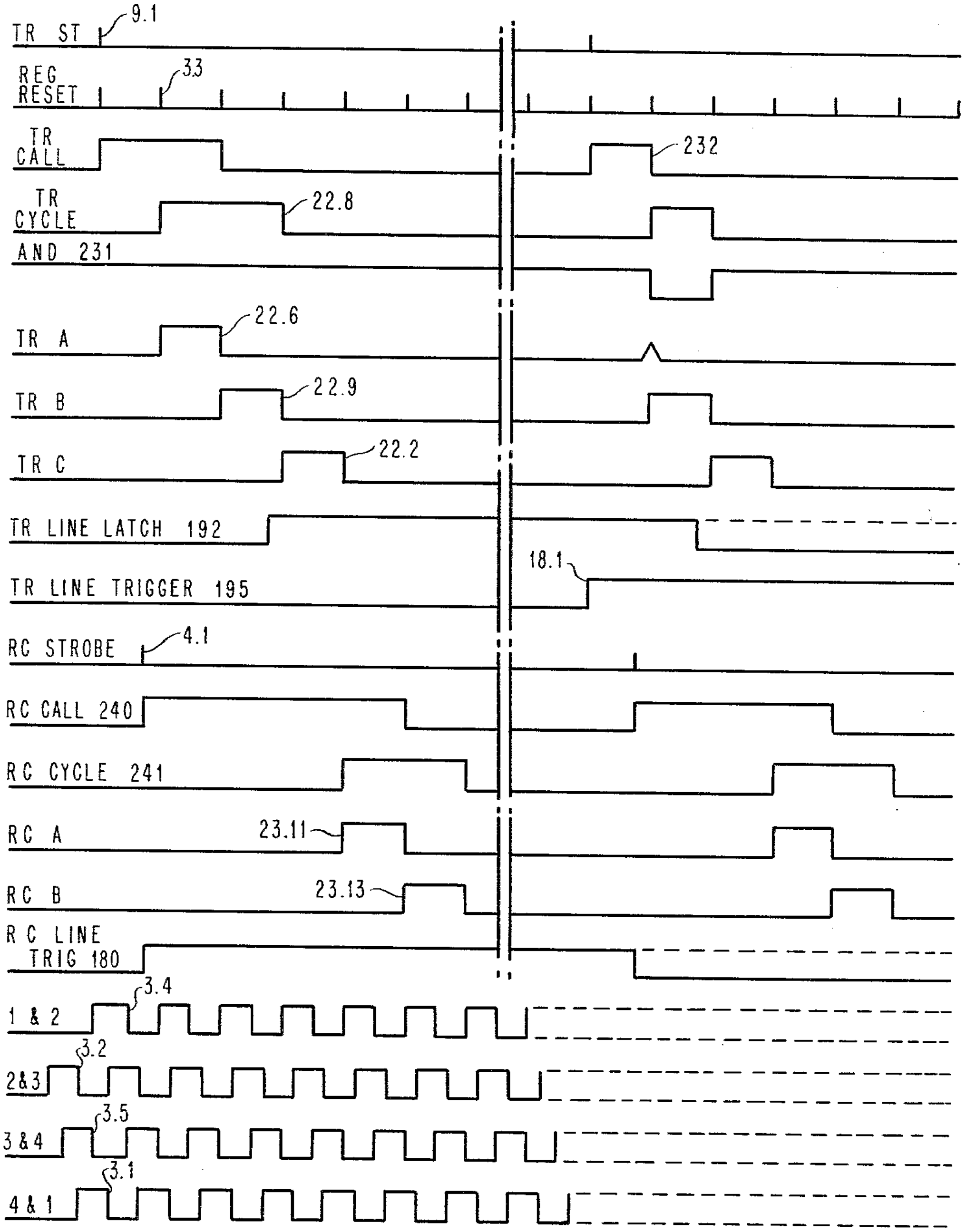
Figure 27:
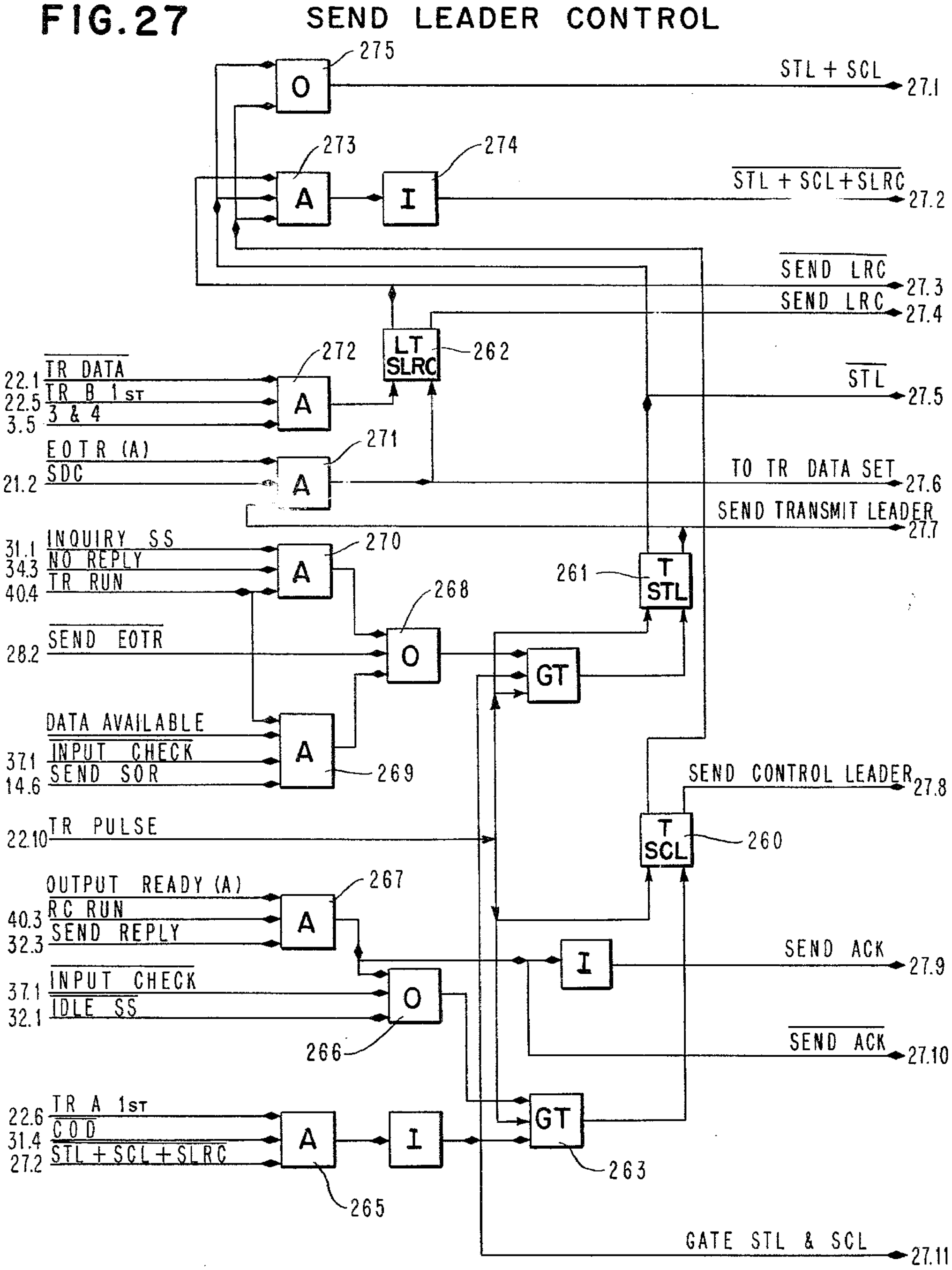
Figure 28:
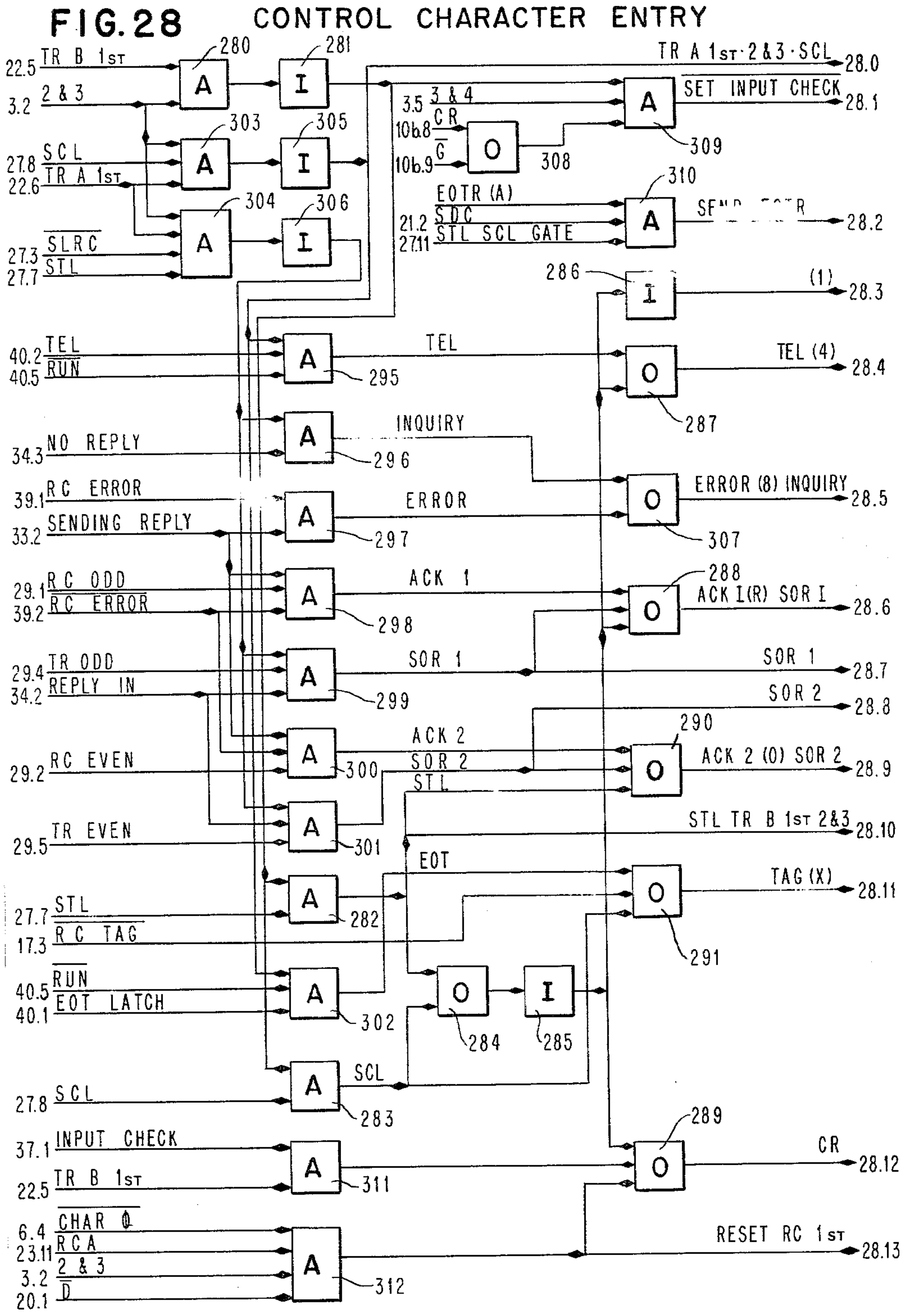
Figure 29:
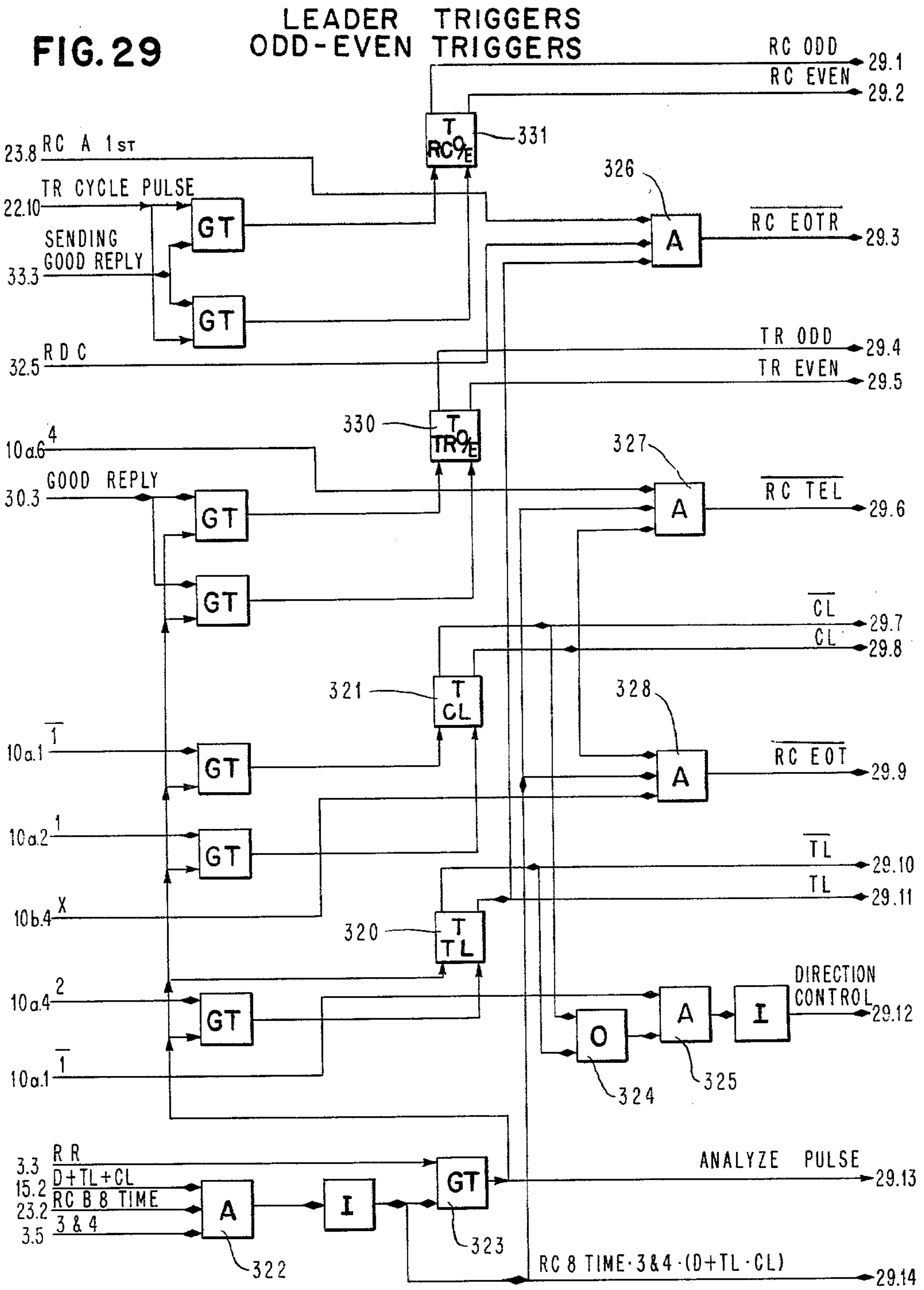
Figure 30:
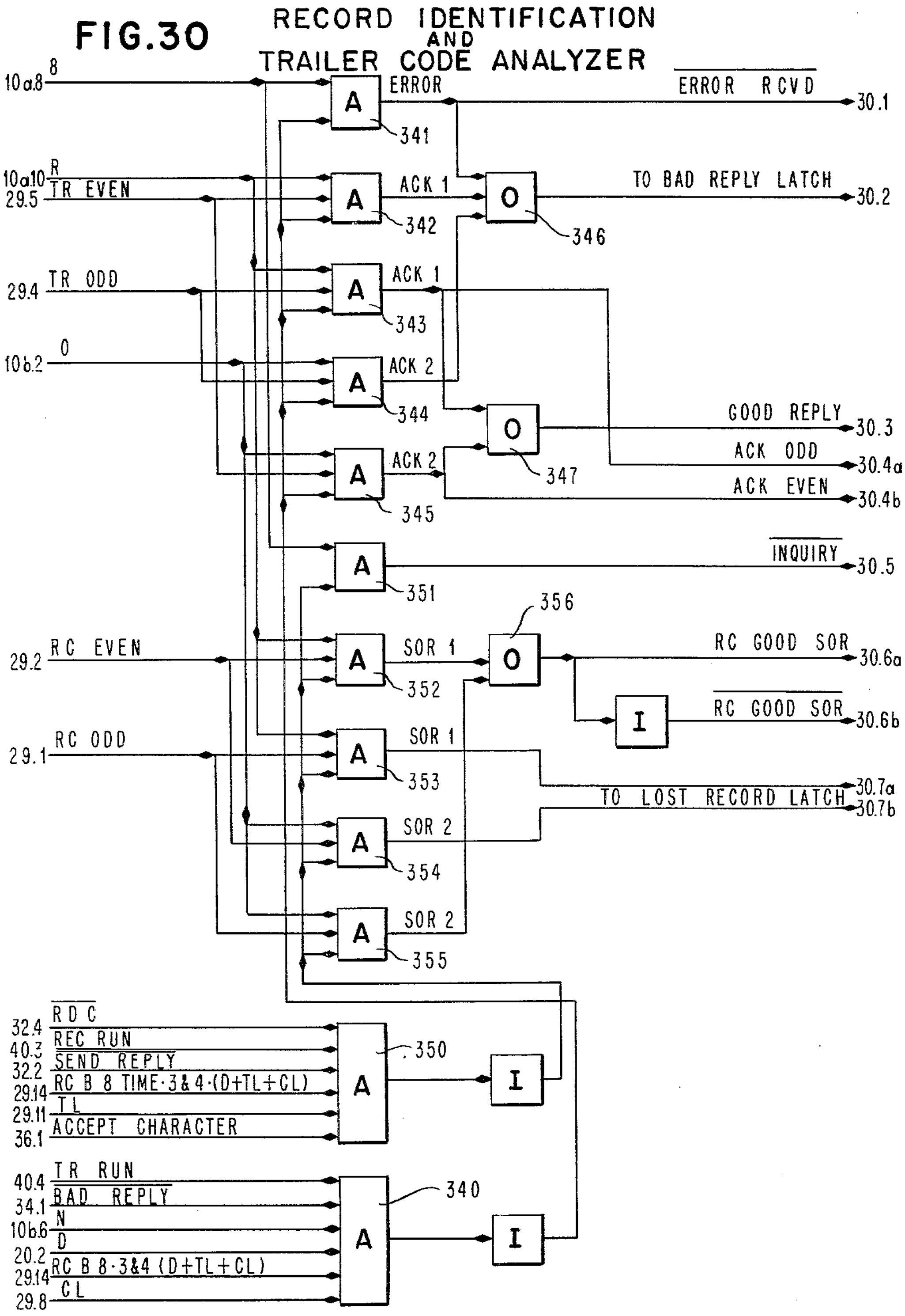
Figure 31:
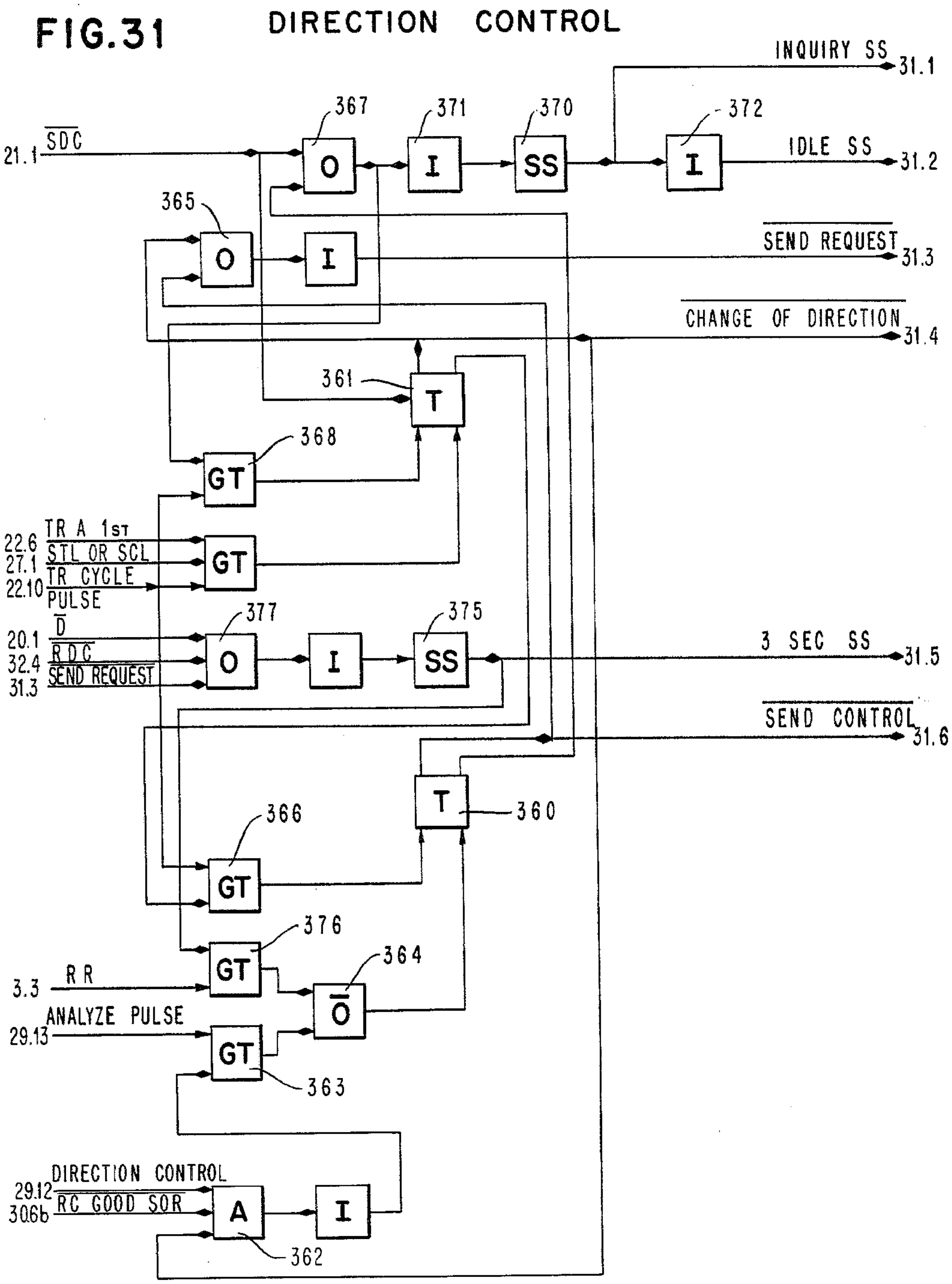
Figure 34:
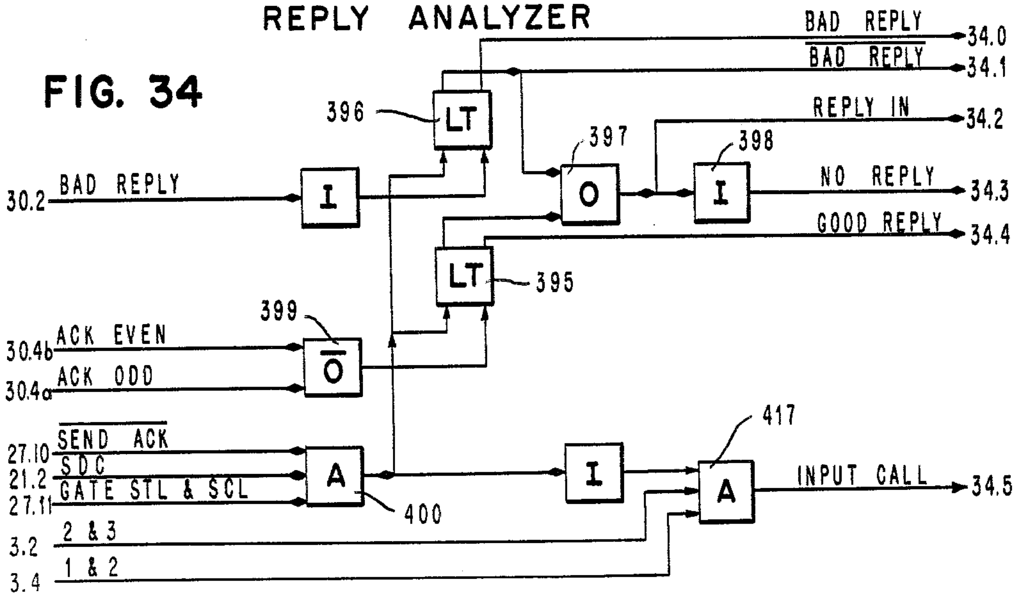
Figure 35:
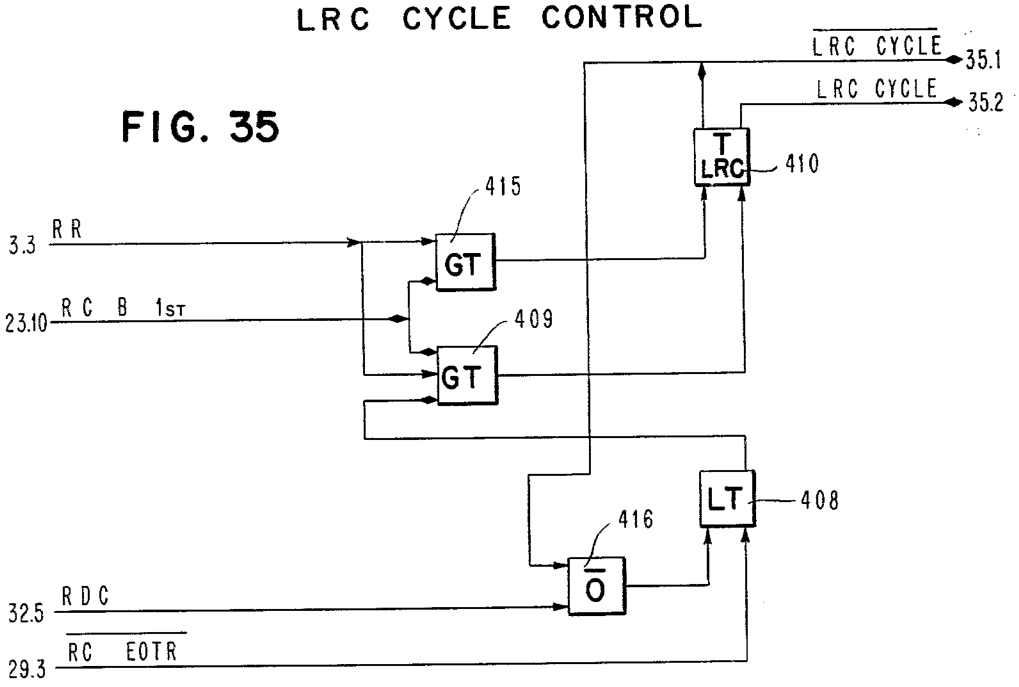
Figure 39:
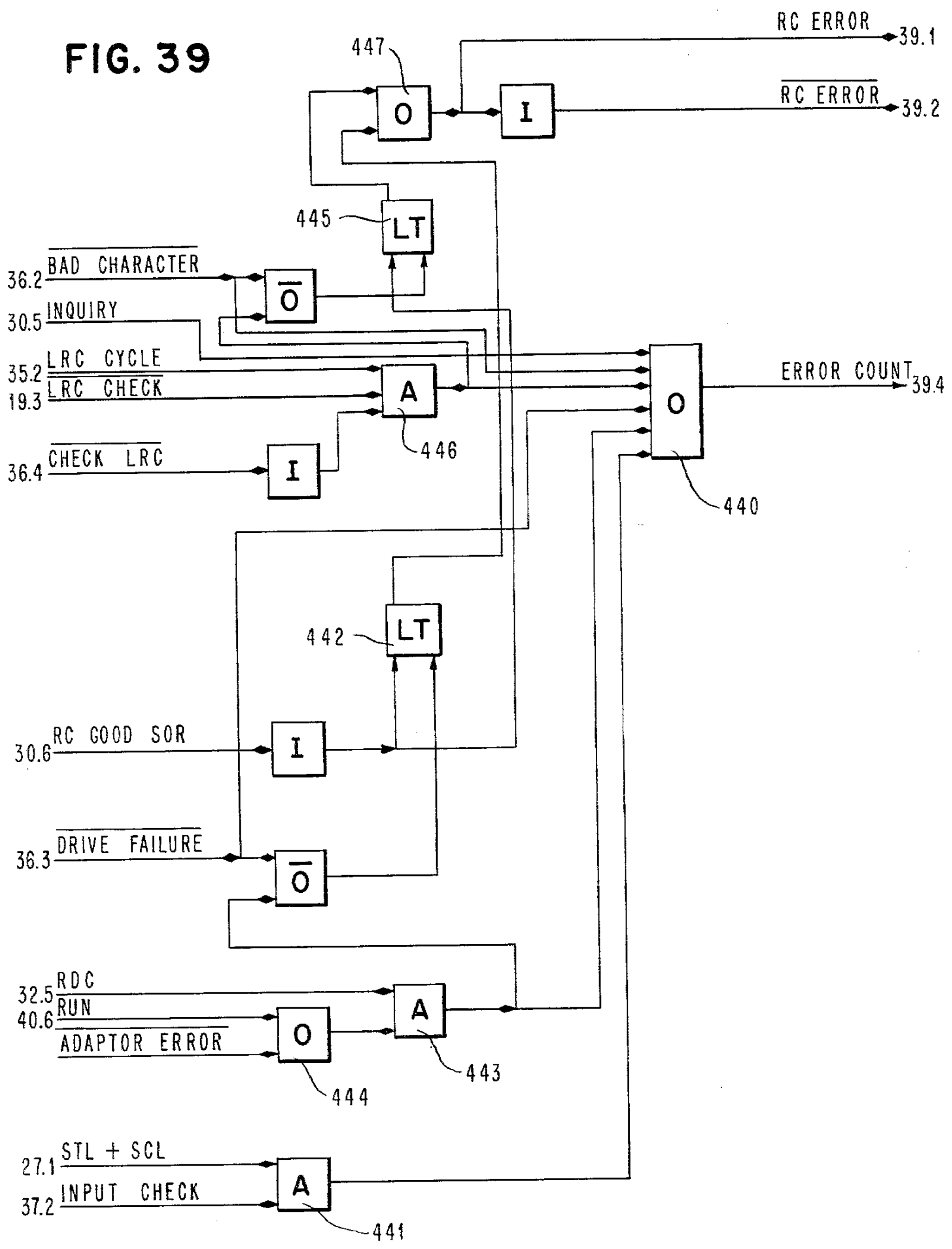
Figure 40:
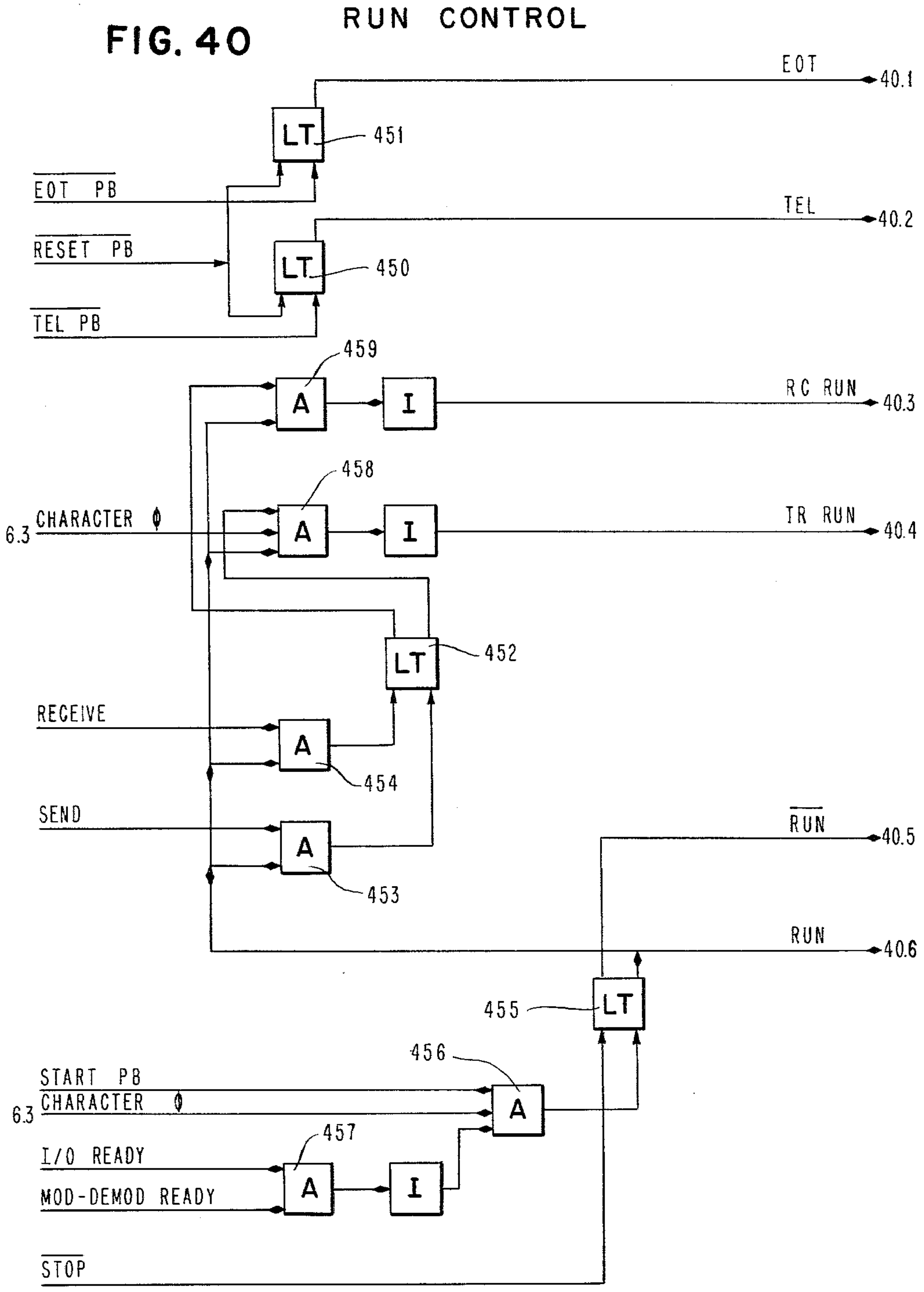

FIG. 7*a* is a diagram showing representative responses of the phase counter responsive means of FIG. 6;

FIG. 8 is a timing diagram showing the waveforms generated by the receive strobe generating means of FIG. 4 when the receive strobe is caused to be advanced or retarded;

FIG. 9 is a logical block diagram showing the means for generating a transmit strobe which controls the transmitted bit rate;

FIG. 10 is a logical block diagram showing the register for transmitting and receiving a multi-bit, time-position coded character;

FIG. 11 is a logical block diagram showing entry core drivers energized by the stages of the register of FIG. 10;

FIG. 12 is a logical diagram of the transmit translator;

FIG. 13 is a logical diagram of the housekeeping core plane;

FIG. 14 is a logical block diagram of other core drivers utilized with the transmit translator of FIG. 12 and the housekeeping core plane of FIG. 13 for causing entry and reading from the planes;

FIG. 15 is a logical block diagram of other core drivers utilized in a receiver translator and the housekeeping core plane of FIG. 13 for causing entry and reading from the planes;

FIG. 16 is a logical block diagram of the sense amplifiers for amplifying the outputs of a receive translator, the transmit translator of FIG. 12 and the housekeeping core plant of FIG. 13;

FIG. 17 is a logical block diagram of the means for receiving a bit from de-modulation equipment;

FIG. 18 is a logical block diagram of the means for presenting a bit to be transmitted to modulating equipment;

FIG. 19 is a logical block diagram of the means for indicating that a complete character has been transmitted;

FIG. 20 is a logical block diagram showing the means for recognizing the receipt of characters other than data;

FIG. 21 is a logical block diagram showing the generation of the signal indicating a send data condition;

FIG. 22 is a logical block diagram showing the generation of transmit cycle controls;

FIG. 23 is a logical block diagram showing the generation of receive cycle controls;

FIG. 24 is a timing diagram showing the operation of the transmit cycle control of FIG. 22 and the receive cycle control of FIG. 23;

FIG. 25 is a diagram showing certain functions performed during transmit cycles;

FIG. 26 is a diagram showing certain functions performed during a receive cycle;

FIG. 27 is a logical block diagram of the means for controlling the transmission of certain control characters identifying the source of other control characters;

FIG. 28 is a logical block diagram showing the means for initiating the insertion of certain control characters into the register of FIG. 10 for transmission;

FIG. 29 is a logical block diagram of the memory means for identifying the particular record being transmitted or received and the means for recognizing the source of control characters;

FIG. 30 is a logical block diagram of the means for recognizing receipt of a proper record identifying character or record acknowledging character;

FIG. 31 is a logical block diagram of the means for controlling the direction of transmission between Synchronous Transmitter-Receivers at distant locations;

FIG. 32 is a logical block diagram of the means for placing a record receiving STR in a receive condition and for conditioning the receiving STR for sending a reply;

FIG. 33 is a logical block diagram of the means in a record receiving STR for indicating that a reply is being sent to a record transmitting STR;

FIG. 34 is a logical block diagram of the means in a record transmitting STR for indicating the presence or absence of a reply from a record receiving STR;

FIG. 35 is a logical block diagram of the means for generating control signals indicating that the record receiving STR should check its accumulated odd-even character against the odd-even character transmitted by the record transmitting STR;

FIG. 36 is a logical block diagram of the means in a record receiving STR for indicating certain errors;

FIG. 37 is a logical block diagram showing the means by which a record transmitting STR indicates that it has made an error;

FIG. 38 is a logical block diagram of the means by which certain alarms are generated;

FIG. 39 is a logical block diagram of means within a record receiving STR for indicating the receipt of a bad character, an improper odd-even character check and the receipt of the wrong record identifying signal, or that the receive translator has functioned improperly;

FIG. 40 is a logical block diagram showing the means by which the STR is initially placed in send or receive running condition prior to transmission of a record.

Before starting a detailed description of the invention, the operation of the logic blocks will be explained and certain of the abbreviations used in the drawings and description will be identified.

The logic blocks will be explained first with the symbols used and the inputs and outputs concerned.

A—AND Circuit wherein when all inputs are at a positive level, the output will be at a negative level.

O—OR Circuit wherein when any input is at a negative level, the output will be at a positive level.

GT—GATE Circuit wherein when all inputs are positive, the output will be positive.

$\bar{O}$—OR Circuit wherein if any one input is positive, the output will be positive such as the required positive input pulse to triggers (T) or if any one input is negative, the desired output will be negative such as the required negative input to latch circuits (LT).

T—TRIGGER Circuit wherein a positive pulse to the bottom right side of the block will turn the trigger on producing a positive level at the upper right output and a negative level at the upper left output or a positive pulse input to the lower left side will produce a positive level at the upper left side and a negative level at the upper right side.

LT—LATCH Circuit wherein a negative pulse input to the bottom right or bottom left side will produce a positive level at the upper right or upper left side respectively.

I—INVERTER Circuit wherein a positive input is inverted to a negative output or a negative input is inverted to a positive output.

SA—SENSE AMPLIFIER wherein when all inputs are positive the output will be a positive pulse.

D—CORE DRIVERS wherein when all inputs are negative the output will be a negative pulse.

Abbreviations used in the drawings and the following descriptions are listed below.

STR—Synchronous Transmitter-Receiver
RC—Receive
TR—Transmit
RR—Register Reset
A/R—Advance/Retard
CL—Control Leader
TL—Transmit Leader
EOT—End Of Transmission
TEL—Telephone
SOR 1/2—Start-Of-Record Odd/Even
ACK1/2—Acknowledgement Odd/Even
LRC—Longitudinal Redundancy Check
SCL—Send Control Leader
STL—Send Transmit Leader
SLRC—Send Longitudinal Redundancy Check
SDC—Send Data Condition
D—Control Character
RDC—Receive Data Condition CR—Tag
COD—Change Of Direction
PB—Push Button
——An input or output designation such as $\overline{SDC}$ should read "negative when in send data condition," or "positive when not SDC."

Output lines in the drawings have been labeled and identified by indicating the figure number before the decimal point and a number after the decimal point indicating the position of the output line in the figure. As an example, the RC Strobe pulse has been identified as such and has been given a numeral designation of 4.1 indicating that the pulse originates from FIG. 4 and is the first output at the top of the figure. Input lines which enter from the left of each figure are identified as to their source. Arrows and diamond heads indicate circuit connections. Arrow heads indicate a pulse type of input and diamond heads indicate a voltage level.

When reference is made to a transmitting STR, this is the STR which is being utilized to transmit data characters of a record from an input device. A receiving STR is receiving data characters of a record for presentation to an output device. It must be remembered that a receiving STR is also capable of transmitting control characters when called for and that a transmitting STR may receive control characters.

Figure 1:
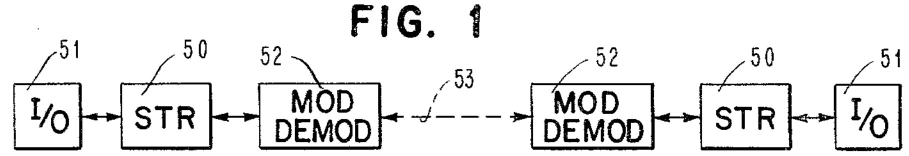
FIG. 1 is a simplified block diagram showing the place of a Synchronous Transmitter-Receiver (STR) in a record transmission system.

FIG. 1 depicts the place of the Synchronous Transmitter-Receiver (STR) in a transmission system. The STR 50 accepts characters of a variable length record from an Input/Output Device 51 or a modulator-demodulator 52 and is capable of presenting data in the form of multi-bit characters to either the input/output device 51 or the modulator-demodulator 52 for transmission over a medium 53.

The major portions of the STR are shown in block form in FIG. 2. Probably the most heavily worked area of the STR is the multi-stage register 54. Data bits which make up a character are entered into the register positions identified as 1, 2, 4, 8, R, O, X, N. The remaining two positions designated CR and G are utilized for certain control functions. The data input from an input device is entered in parallel form, a character at a time and in the preferred embodiment of the invention is a character of 7 bits. The input character is then read out of register 54 through a corresponding plurality of core drivers 55 to a transmit translator core plane 56. The translated input character is read out from the translator 56 through a corresponding plurality of sense amplifiers 57 back to the register 54. The transmit translator 56 is effective to translate the 7 bit input code to a transmission code which contains 4 out of 8 data bits. The data bit contained in position 1 of the register 54 is then presented to the modulating equipment for transmission.

After transmission of the first bit of information from the register 54 the transmittal code is then read out through the core drivers 55 to a housekeeping core plane 58 containing a temporary storage register for the remainder of the transmittal character. On the next transmit cycle, the housekeeping core plane temporary storage means is read out through the sense amplifiers 57 to the register 54. The temporary storage means within the housekeeping plane 58 is operative to shift all the data bits in the transmittal character to the next preceding register position. Thus, the data bit originally placed in register position 2 will have been shifted to register position 1 for transmission by the modulating equipment. The entire transmittal character is thus shifted through the register 54 for transmission. Register position CR is the "tag" position which was set to a predetermined stable state when the translated character was originally read from the transmit translator 56. As the transmittal character is shifted out of the register 54, the tag bit will eventually be shifted to register position 2 at which time a sample of the predetermined stable state of register position 2 and an opposite stable state of the remaining register positions will indicate that an entire character has been transmitted and the time is proper for calling for another 7 bit character from the input device.

In the receive mode of operation of the STR, register position "N" accepts the serially received 4 out of 8 data bits. Upon receipt of the first bit of the character, a tag is inserted in register position "X" of the register. After receipt of each data bit, the register 54 is read out through the core drivers 55 to the housekeeping plane 58 which contains a receiver temporary storage means. On each receive cycle the receiver temporary storage means is read out through the sense amplifiers 57 to the register 54. The receiver temporary storage means is effective to shift the previously received bits to the next preceding register position and the next following data bit is received at register position "N." When an entire 8 bit character has been received, the tag originally inserted in register position "X" will be shifted through the register 54 and back to the register position "CR" indicating that the entire 8 bit character has been received. At this receive tag time the entire 4 out of 8 character will be read out of the register 54 through the core drivers 55 to a receive translator core plane 59. The 4 out of 8 transmittal code is translated to an output code by the receiver translator 59 and is read through the sense amplifiers 57 to the register 54 for presentation in parallel form as data output to an output device.

Control characters which may be transmitted and received by each STR are recognized in a control code analyzer 60 for causing certain STR functions and for changing the direction of transmission between the distant STR units.

As master oscillator 61 controls the entire operation of the STR. The oscillator pulses are applied to a cycle control unit 62 which is effective to interleave transmit and receive cycles of the STR. The cycle control 62 is effective to control transmit and receive clocks 63. The transmit clock is effective to control the transmitting bit rate of the STR. The receiving clock is effective to produce a receiving sample strobe pulse which is synchronized to the center of received data bits for sampling the presence or absence of a data bit in the time-position encoded character.

Figure 3:
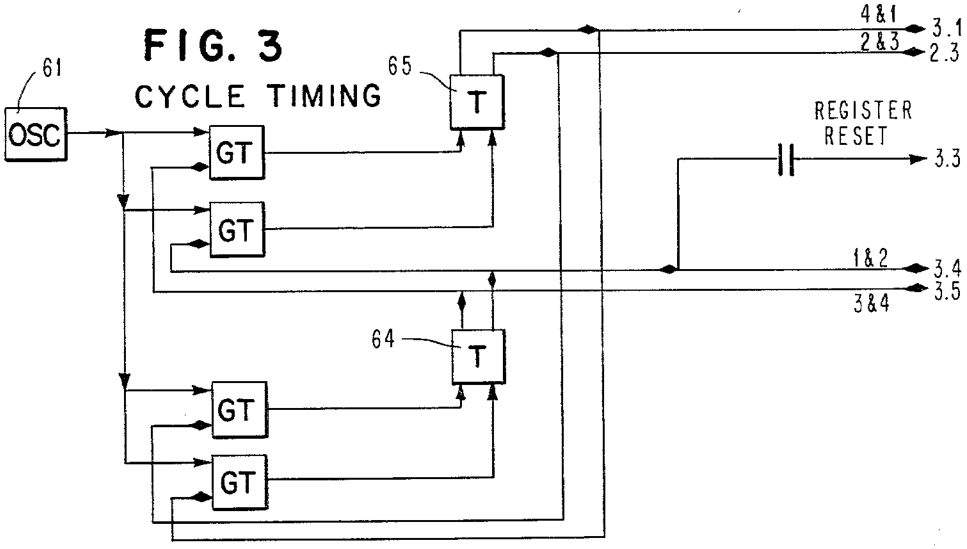
FIG. 3 is a logical block diagram showing the source of sub-cycle timings.

FIG. 3 shows the means by which basic timing in the STR is achieved. The oscillator 61 feeds pulses to input gates of a trigger 64 and a trigger 65. The triggers 64 and 65 are coupled in such a way that the ON side of trigger 64 gates the ON side of 65 and the OFF side of 64 gates the OFF side of 65. The ON side of trigger 65 gates the OFF side of trigger 64 and the OFF side of trigger 65 gates the ON side of trigger 64. In this manner, the stable state of trigger 65 changes to the same stable state as 64 one oscillator pulse later. Each of the triggers 64 and 65 completes a cycle of operation on the occurrence of 4 oscillator pulses. The register reset (RR) pulse 3.3 is generated every fourth oscillator pulse and coincides with the beginning of voltage level 3.4. (See FIG. 24.)

FIG. 4 shows the receiver clock which generates the receiver sampling strobe (RC STROBE) 4.1. The RC STROBE pulse 4.1 is normally generated upon applying 32 RR pulses 3.3 to a divider consisting of triggers 66, 67, 68, 69 and 70. Triggers 66 and 67 are cross-coupled in the same manner as triggers 64 and 65 in FIG. 3. Triggers 66 and 67 being cross-coupled will normally cause the ON side of trigger 66 to go from a negative level to a positive level on the occurrence of 4 RR pulses. The change of trigger 66 from OFF to ON will apply a positive pulse to a binary input of trigger 68 changing trigger 68 from the existing stable state to the opposite stable state. As each of the triggers 68, 69 and 70 change from OFF to ON, the next succeeding trigger is triggered from the existing stable state to an opposite stable state.

When the receive clock is to produce a RC STROBE 4.1 upon the occurrence of 32 RR pulses, the ADVANCE line 6.2 will be at a negative level and the RETARD input 6.1 will be at a positive level. In this condition, gates 71, 72, 73 and 74 cause triggers 66 and 67 to function in the ordinary manner. The means by which the RC STROBE 4.1 can be advanced or retarded will be more fully explained later. The energization of either the ADVANCE line 6.2 or the RETARD line 6.1 will be effective to cause trigger 66 to change from the OFF condition to the ON condition, changing the stable state of trigger 68, upon the occurrence of 3 to 5 RR pulses 3.3.

A character is transmitted as a series of "1's" and "0's" representing mark and space conditions respectively of a 4 out of 8 code. Each character will have 4 mark bits and 4 space bits. It is essential that the RC STROBE pulse 4.1 be maintained in a definite time relationship with received data bits. Separate synchronizing pulses do not accompany each character transmitted. The present invention includes means by which the RC STROBE pulse 4.1 is maintained in the center of received bit signals. This is accomplished by causing a count to be made of the number of RR pulses 3.3 which occur during certain conditions. The count of RR pulses 3.3 is accumulated by counting the pulses starting with the leading edge of a received mark signal to the occurrance of the next RC STROBE pulse 4.1. To this first partial count is added a count of RR pulses 3.3 commencing with the trailing edge of a received mark signal to the occurrence of the next RC STROBE 4.1. When the RC STROBE 4.1 is exactly centered in each bit position, the count of RR pulses 3.3 will be exactly 32. When the RC STROBE 4.1 occurs before the center of received bits, the total count of RR pulses 3.3 will be less than 32. When the RC STROBE 4.1 occurs after the center of receive data bits, the total count of RR pulses will be greater than 32. This manner of counting to determine any deviation of the RC STROBE from the center of the received bits is unaffected by distortion of the received signal. If the received mark has been shortened during transmission, the first partial count will be somewhat less than normal but this will be compensated for because the trailing edge of the signal will occur earlier than normal and will cause the second partial count to be more than usual. Likewise, if the received mark signal should be lengthened, the first partial count will be greater than normal but the second partial count will be less than normal. If the RC STROBE 4.1 is centered within each received bit, the total count of pulses will be 32. (See FIG. 9.)

Figure 5:
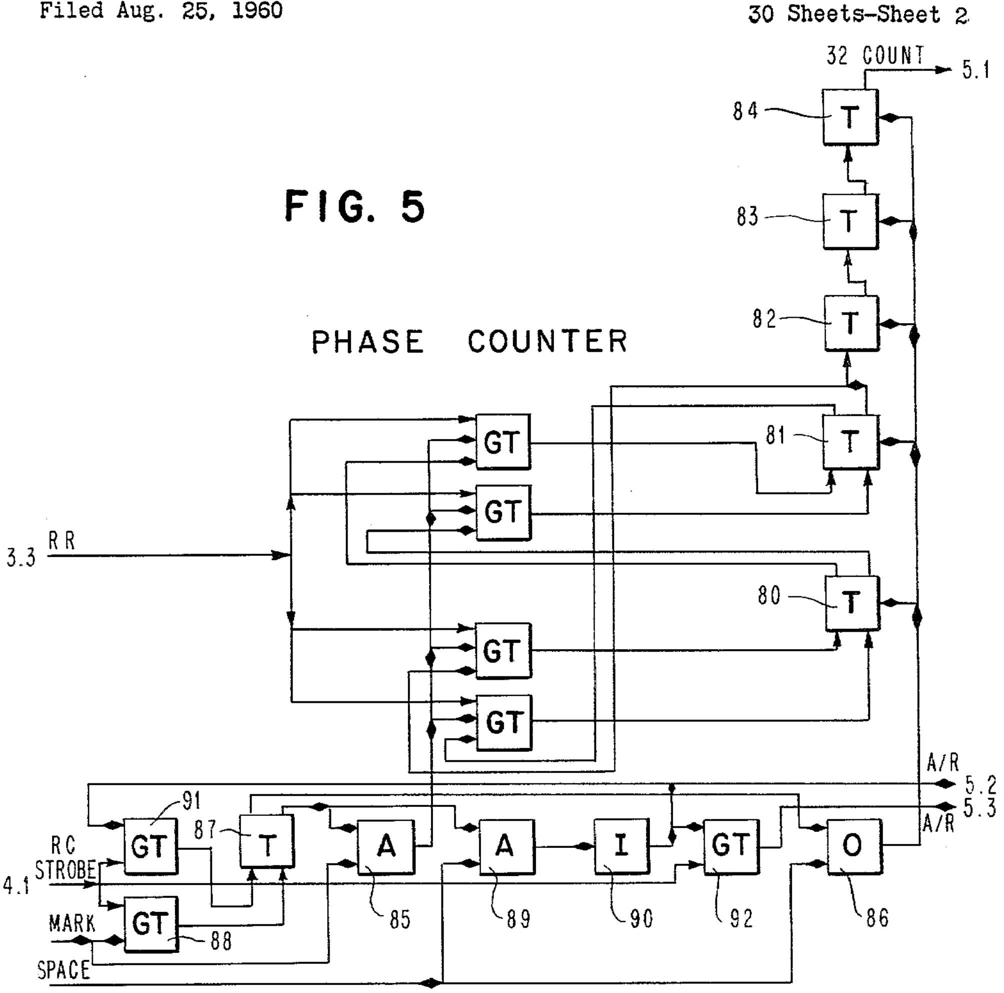
FIG. 5 is a logical block diagram showing the phase counter of the STR for determining the relative position of the receiver bit sampling strobe with the center of a received signal.

FIG. 5 shows the phase counter by which a first and second partial count of RR pulses 3.3 is accumulated. The counter consists of a series of triggers 80, 81, 82, 83 and 84. These triggers are effective to produce an output indicating a count of 32 from trigger 84 as it changes from the OFF to the ON condition. Triggers 80 and 81 are cross-coupled in a manner to produce a binary input to trigger 82 upon the occurrence of 4 RR pulses 3.3. The input gates of triggers 80 and 81 are conditioned by the triggers 80 and 81 in the manner previously discussed and in addition, are conditioned by the output of an AND circuit 85. During marking periods of a received character, the input from the de-modulator labeled MARK will be at a positive potential and the input labeled SPACE will be at a negative potential. For the period in which a SPACE is being received, the conditions will be reversed. During the initial condition when a SPACE is being received an OR circuit 86 will be conditioned by the SPACE signal and the positive level of the OFF side of trigger 87 producing a negative output level which causes the triggers 80 through 84 to be set in the ON condition. The negative output of OR circuit 86 will prevent RR pulses 3.3 from being counted. During this initial phase, AND circuit 85 will be producing a positive output level because both inputs are not positive. As soon as a MARK is received, the SPACE input will go to a negative level and the set output of OR circuit 86 will be removed. With the set removed from triggers 80 through 84, the triggers 80 and 81 will commence to count RR pulses 3.3 applied to their respective input gates.

The occurrence of the immediately following RC STROBE 4.1 during the MARK condition will energize gate 88 producing a positive pulse to the ON side of trigger 87. With the ON side of trigger 87 at a positive level in addition to the positive level of the MARK condition, AND circuit 85 will now produce a negative voltage level to the input gates of triggers 80 and 81 stopping their counting action. When the trailing edge of the MARK signal occurs and the SPACE input line goes to a positive level, the second partial count will be started. With the MARK input at a negative level and trigger 87 ON, AND circuit will produce a positive output to the input gates of triggers 80 and 81 and normal counting by triggers 80 and 81 will start again. With the SPACE input at a positive level and trigger 87 ON, an AND circuit 89 will be conditioned producing a negative output level which is inverted at inverter 90 to produce a positive level at a gate 91. The occurrence of the next RC STROBE 4.1 at gate 91 will produce a positive pulse to the OFF side of the trigger 87. When trigger 87 returns to the OFF condition during the duration of a SPACE, OR circuit 86 will be conditioned by two positive levels producing a negative level output applied to the triggers 80 through 84 to stop counting operation and to set all triggers to the ON stable state.

If the RC STROBE 4.1 were occurring at or after the center of received signals, trigger 84 would have produced a 32 COUNT pulse 5.1. If the RC STROBE 4.1 were occurring before the center of received MARK signals, trigger 84 would not have produced a 32 COUNT pulse 5.1 at the time the second partial count was stopped and the triggers reset.

A gate 92 conditioned by inverter 90 when its output is positive and the occurrence of the RC STROBE 4.1, which halts the second partial count, produces an A/R pulse output 5.3 the purpose of which will be explained later.

FIG. 6 shows the phase count responsive means which will indicate whether or not the phase counter had counted at least 32 RR pulses thereby bringing to a positive level the 32 COUNT output 5.1. Each time the phase counter of FIG. 5 counts more than 32 RR pulses, the 32 COUNT line 5.1 will turn ON a trigger 100. If the phase counter had not counted 32 RR pulses at the time of the RC STROBE 4.1, trigger 100 would not have been turned ON. The ON side of the trigger 100 conditions an OFF side gate of a trigger 101 and the OFF side of trigger 100 conditions an ON side gate of trigger 101. The ON side of trigger 101 in turn conditions the ON side of a trigger 102 and the OFF side of trigger 101 conditions the OFF side of trigger 102. The ON side of trigger 102 conditions a gate 103 which when conditioned will apply through OR circuit 104 a positive pulse to the ON side of a trigger 105. The OFF side of trigger 102 conditions a gate 106 which in turn applies a positive pulse to the OFF side of trigger 105 through an OR circuit 107.

Triggers 101, 102 and 105 are included in correcting means responsive to 3 consecutive deviations of the RC STROBE 4.1 from the center of received MARK signal. When triggers 101, 102 and 105 are all ON, and AND circuit 108 will have all its inputs positive producing a negative RETARD output 6.1. When the triggers 101, 102 and 105 are all OFF, an AND circuit 109 will have all its inputs positive producing a negative output level which is inverted by inverter 110 to produce ADVANCE level 6.2. For normal synchronization and correcting operations, the remaining two inputs to AND circuits 108 and 109 will be positive. The reason and operation of the remaining two inputs to AND circuits 108 and 109 will be more fully explained later.

The input gates of triggers 101 and 102 are additionally conditioned by A/R GATE input 5.2 which is at a positive level during a SPACE period during which time the second partial count is being accumulated in the phase counter of FIG. 5. This positive level is obtained from inverter 90 in FIG. 5. The pulse which causes triggers 101, 102, and 105 to change their stable states is obtained from gate 92 of FIG. 5 which produces an A/R PULSE output 5.3 upon the occurrence of the RC STROBE 4.1 which halts the second partial count.

The manner in which triggers 101, 102 and 105 are caused to assume the same stable state is shown in FIG. 7*a*. Gating of triggers 101, 102 and 105 is such that triggers 102 and 105 cannot change to a particular stable state until the next preceding trigger has changed to that stable state. Trigger 101 is conditioned to turn OFF only if trigger 100 has been turned ON by the 32 COUNT output 5.1. In a like manner, trigger 101 will not be turned ON by A/R PULSE 5.3 unless trigger 100 has remained OFF. The triggers, and in particular trigger 101, will not be turned ON or OFF unless the respective gates have been conditioned for a predetermined length of time. As a result, trigger 101 will never be turned OFF by A/R PULSE 5.3 if trigger 100 is turned ON by the 32 COUNT pulse 5.1 which coincides with the A/R PULSE 5.3 if the RC STROBE is occurring at the center of received bits.

In FIG. 7*a* triggers 100, 101, 102 and 105 may assume any initial state. Assume initially trigger 101 ON, 102 OFF, and 105 OFF. Also assume that alternate MARK-SPACE signals are being received such that a correction may be made every other RC STROBE 4.1. The numbered pulses represent A/R PULSE 5.3 which occurs every other RC STROBE 4.1. If the phase counter of FIG. 5 is counting more than 32 pulses, trigger 100 will be turned ON by 32 COUNT output 5.1. At the occurrence of A/R PULSE 5.3 number 1, trigger 101 will be conditioned to be turned OFF, 102 ON, and 105 will remain OFF. If at the occurrence of A/R PULSE number 2 trigger 100 has been turned ON, trigger 101 is already OFF and since 101 is OFF, trigger 102 will be conditioned to be turned OFF, and with trigger 102 ON initially, trigger 105 will be conditioned to be turned ON. The occurrence of the third consecutive A/R PULSE in which trigger 100 has been turned ON, all triggers 101, 102 and 105 will be turned OFF by A/R PULSE 5.3. With all triggers OFF, AND circuit 109 of FIG. 6 will be conditioned and ADVANCE output 6.2 will be generated. The affect of ADVANCE output 6.2 going to a positive level will be more fully disclosed later. With the ADVANCE line 6.2 at a positive level, a gate 111 of FIG. 6 will be conditioned and at the occurrence of SLAVE PULSE 4.2 going positive, trigger 105 will be turned ON through OR circuit 104. Slave PULSE 4.2 is generated in the receive clock of FIG. 4 when trigger 67 is changed from the ON to the OFF condition.

In FIG. 7*a* trigger 105 was turned OFF at 112 and turned back ON at 113. If the next succeeding count were again greater than 32, trigger 105 would again be conditioned and turned OFF by A/R PULSE number 4 causing another advance cycle to occur in the receive clock. Trigger 105 is again caused to be turned ON at 114 following the fourth count.

It is now assumed that at the time of the fifth A/R PULSE the phase counter of FIG. 5 failed to reach a count of 32. Trigger 100 would have been left in its OFF condition. The OFF side of trigger 100 conditions trigger 101 to be turned ON. Trigger 101 is turned ON by A/R PULSE and since trigger 102 is OFF at this time trigger 105 will in turn be turned OFF. At the occurrence of the sixth A/R PULSE, if the count is again less than 32, trigger 100 will remain OFF, trigger 101 will remain ON, and with trigger 101 ON trigger 102 is conditioned to be turned ON and will be turned ON. At the occurrence of the third count of less than 32, shown as A/R PULSE number 7 in FIG. 7*a*, trigger 105 will be conditioned to be turned ON by trigger 102 and will turn ON. Thus immediately after the occurrence of the third consecutive count of less than 32 all triggers 101, 102 and 105 will be in the ON condition and gate 108 will have all its inputs positive producing a negative RETARD output 6.1. The effect of the negative RETARD output 6.1 on a receiver clock will be discussed later. The negative RETARD output 6.1 is inverted by an inverter 115 to a positive level at an AND circuit 116. The other A/R 3 OFF input 4.3 to the AND circuit 116 is produced in the receiver clock by the ON side of trigger 66. With both inputs positive to AND circuit 116, the inverted output will be positive and is applied to a gate 117. With gate 117 conditioned the next RR pulse 3.3 applied to gate 117 will apply a positive pulse through OR circuit 107 to the OFF side of trigger 105.

In FIG. 7*a* trigger 105 would have been turned ON at 118 and turned OFF at 119. If the next count of the phase counter were again less than 32 trigger 100 would have been OFF and through the conditioning of the remaining triggers, trigger 105 would have again been turned ON at 120.

A/R PULSES 9 and 10 in FIG. 7*a* represent a condition in which there is first a count of more than 32 and then a count of less than 32 respectively. Following through the conditioning of triggers 101, 102 and 105 will show that at no time will these triggers all be ON or all be OFF.

A/R PULSES 11 and 12 in FIG. 7*a* represent a condition in which the RC STROBE occurs at the same time the 32 COUNT output 5.1 is generated. In this case trigger 100 is turned ON to condition trigger 101 to turn OFF. A/R PULSE number 11 occurs at the same time trigger 100 turns ON, and occurs before the time needed to gate the OFF side of trigger 101 so that trigger 101 is not turned OFF. If trigger 101 had been OFF, it would have been gated to be turned ON by A/R PULSE number 11 and would have been turned ON. At A/R PULSE number 12 it is seen that even though the RC STROBE is occurring at the center, all the A/R triggers will be ON and a RETARD cycle will be caused. Trigger 100 is turned ON by the 32 COUNT pulse 5.1, but is not turned OFF until the next succeeding RC STROBE which occurs between A/R PULSES 11 and 12, and 12 and 13. A/R PULSES 13, 14 and 15 in FIG. 7*a* again show three consecutive occurrences of a greater than 32 count indicating that an advance correction should be made at 121.

It has been shown that the correction means including triggers 101, 102 and 105 is only effective on three consecutive count indications of the same sense. Line jitter will not affect synchronization.

Figure 8A:
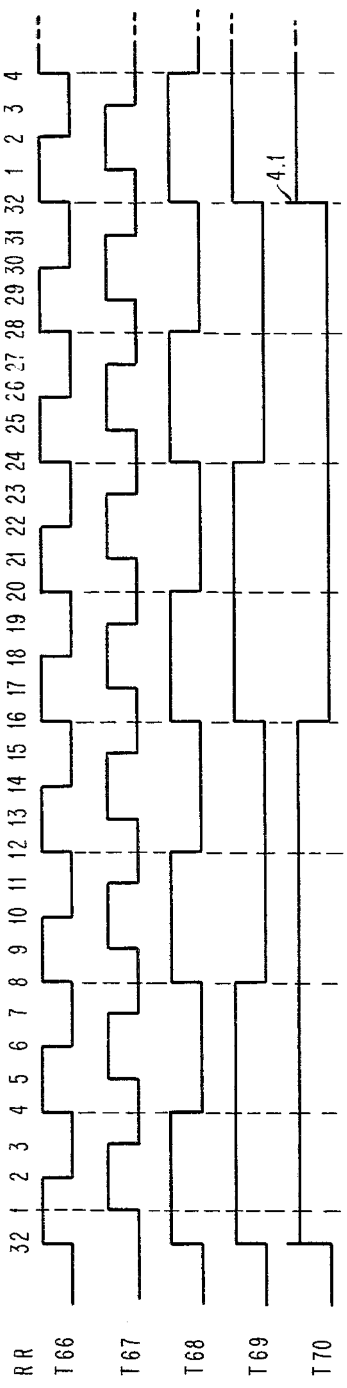

FIG. 8*a* shows the normal waveform of the ON side of triggers 66 through 70 in the receiver clock of FIG. 4. It can be seen that triggers 66 and 67, being cross-coupled are caused to change stable states normally upon the occurrence of every other RR pulse 3.3.

Figure 8B:
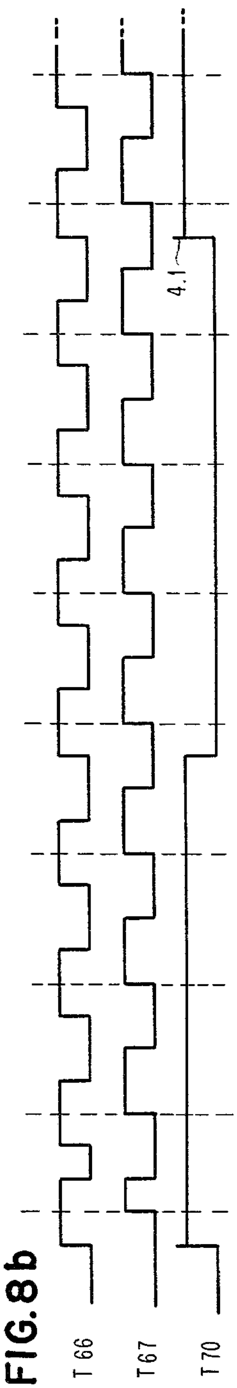

FIG. 8*b* shows the manner in which the RC STROBE 4.1 is caused to occur one RR pulse early. In this case, the advance/retard triggers 101, 102 and 105 have all been turned OFF producing a positive level on the ADVANCE output 6.2. The ADVANCE output 6.2 is applied to gate 75 in the receiver clock of FIG. 4. With gate 75 conditioned the next RR pulse 3.3 will cause a positive pulse to be applied through OR circuit 76 to the OFF side of trigger 67. In FIG. 8*b* it can be seen that trigger 67 has been caused to change from the ON condition to the OFF condition at the same time trigger 66 changed to the OFF condition. With trigger 67 turned OFF one pulse early trigger 66 will be turned ON at the occurrence of the third RR pulse instead of the fourth RR pulse. When trigger 67 is turned OFF SLAVE PULSE 4.2 is produced which is effective at gate 111 of FIG. 6 to turn ON trigger 105. (See FIG. 7*a* waveform of trigger 105 at 113.)

Figure 8C:
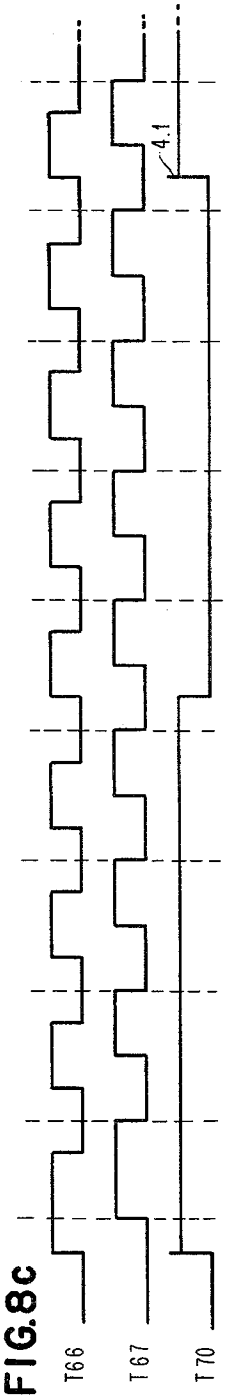

When triggers 101, 102 and 105 are all ON indicating that the RC STROBE is occurring early and should be retarded, the RETARD output 6.1 from AND circuit 108 in FIG. 6 will go to a negative level. The RETARD level 6.1 is applied to gate 72 in FIG. 4. The effect of this will be apparent from FIG. 8*c*. Trigger 66 would normally be turned OFF by RR pulse number 2 but the presence of the negative RETARD signal 6.1 at gate 72 prevents this RR pulse 3.3 from turning trigger 66 OFF. The RR pulse 3.3 labeled number 2 in FIG. 8*c* is effective however at gate 117 of FIG. 6 as the AND circuit output 116 is inverted to a positive level. This RR pulse 2 is effective to turn OFF trigger 105 through OR circuit 107. Turning trigger 105 OFF deconditions AND circuit 108 and returns the RETARD output 6.1 to the positive level allowing the next RR pulse 3.3 to turn trigger 66 OFF. It is apparent then at FIG. 8*c* that trigger 66 is caused to be turned ON upon the occurrence of 5 RR pulses rather than 4 RR pulses. The net effect of this is to cause the next receive strobe 4.1 to occur after 33 RR pulses.

Line jitter in received signals may cause receive strobe corrections but for the fact three consecutive deviations in the same direction are necessary to cause a correction to be made. Thus if signals are jittering back and forth, triggers 101, 102 and 105 will never assume the same stable state to cause a correction. Only when signals are received properly and the RC STROBE 4.1 starts to drift from the center of the received bits will corrections be made. Synchronization of a receiver sampling strobe with the transmitted bit rate of a distant transmitter is thus achieved without the need for time consuming and inefficient insertion of synch pulses in data signals.

FIG. 9 shows the transmit clock which produces a TR STROBE pulse 9.1 which controls the transmitted bit rate. The transmit clock consists of a series of five triggers 125, 126, 127, 128 and 129. Triggers 125 and 126 are cross-coupled as previously discussed such that the ON side of trigger 125 will produce a positive-going output upon the occurrence of every fourth RR pulse 3.3. As mentioned previously in the introduction, when a half-duplex mode of operation is in effect, a single oscillator controls the transmitting STR bit rate, the receiving STR receiver sample strobe synchronization and the receiving STR replying bit rate. The STR which is to transmit a record will be in the MASTER condition, and the receiving STR will be in the SLAVE condition. The transmitting STR when in the MASTER condition will have the MASTER line in FIG. 9 at a positive level and the SLAVE line at a negative level. In this manner, triggers 125 and 126 control the turning ON and OFF of trigger 127 through its input gates 130 and 131 condition by the MASTER input. At the receiving STR the SLAVE input will be at a positive level and the MASTER input at a negative level. In this case the SLAVE input at a positive level conditions the input gates 132 and 133 of trigger 127. In this condition every fourth RR pulse 3.3 which produces a positive-going level at the ON side of trigger 125 will have no affect on trigger 127. Trigger 127 of the receiving STR will be triggered either ON or OFF upon the occurrence of SLAVE PULSE 4.2. SLAVE PULSE 4.2 is produced by the receiving STR receiver clock. (See FIG. 4.) The SLAVE PULSE 4.2 is produced when the trigger 67 in the receiver clock of FIG. 4 is turned OFF and this occurs every fourth RR pulse in the receiving STR unless the receiver clock in the receiving STR has been affected by the advance or retard condition. In this manner, the TR STROBE 9.1 in the receiving STR is caused to vary in accordance with corrections made in the receiving clock of the receiving STR, thus maintaining synchronism with the master oscillator of the transmitting STR which is in turn controlling its receiving station.

FIG. 10 shows the logical arrangement of the register 54 in FIG. 2. The register includes a plurality of triggers corresponding to the 8 bits of a character plus the "tag" bit and a register position operative to indicate proper functioning of the core code translator drive lines. The ON and OFF side input of each of the triggers in the register includes an OR type circuit 140 and 141 respectively. Each of the OR circuits 140 has as one of its inputs the output of a gate 142. Each of the OR circuits 141 has as one of its inputs the output of a gate 143.

Each of the gates 142 is conditioned by suitable means in an input device indicative of an input character. This conditioning line is labeled (A). A positive pulse will be applied through the OR circuits 140 to the ON side of the register triggers if the input character has conditioned the gate at the time the pulse is applied to the gates 142 from a gate 144. Gate 144 is conditioned by a definite TR cycle condition 22.6 and a pulse from the input device indicating the character is to be entered into the register. An AND circuit 145 conditions each of the gates 143. The output of AND circuit 145 will be at a positive level unless all of the inputs are at a positive level. The generation of these inputs to AND circuit 145 will be explained more fully later. With the output of AND circuit 145 at a positive level each RR pulse 3.3 will cause the register triggers to be turned OFF.

Information may be entered into the register triggers from the sense amplifiers of FIG. 16 to be fully described later. The sense amplifier (SA) inputs 16.1–16.10 are applied to both OR circuits 140 and 141 as positive pulses. The positive pulse output from OR circuits 140 or 141 is effective to switch the register triggers from the existing stable state to the opposite stable state.

Information may also be entered into the register triggers by applying positive pulses to OR circuits 140 generated from FIG. 28, the operation of which is to be more fully explained later.

FIG. 11 shows the drivers 55 of FIG. 1. The drivers are effective on the application of a negative level and a negative 4-TIME pulse 16.13 to provide the necessary drive current to the transmit translator 56, the housekeeping core plane 58 and the receive translator 59. The negative levels applied to the drivers are produced in the register 54.

FIG. 12 is a schematic representation of the transmit translator 56 of FIG. 2. The translator accepts a data character from the register in the input code and returns the same character to the register in the 4 of 8 transmittal code. The transmit translator 56 is shown as being capable of translating only numerical and alphabetical characters; however, it should be remembered that in the 4 of 8 code additional special characters are possible. In FIG. 12 the vertical lines represent the cores in the translator. There is one core for each character to be translated. Horizontal lines indicate drive lines and sense lines. The diagonal lines indicate that a specific core has a turn of a drive line around it. Double diagonal lines indicate a two turn winding about the core. The slant of the diagonal lines indicates the direction of the turn thus all windings but the clear winding in FIG. 12 are in the same direction, the clear winding being in the opposite direction. Sense windings representing the output code are shown as an "S." The direction of the sense windings alternates to reduce output noise.

Before translation all the cores are set to the "1" state by the clear winding 14.5. The input code is entered from the register 54 through the drivers of FIG. 11. The drive lines 11.1–11.13 are wound on the cores in such a pattern that all cores with the exception of the desired core, are switched to the "0" condition. The 1/2 SELECT winding 11.17 aids in this switching. At a later point in the translation cycle a READ pulse 14.1 is applied to all the cores which will then be effective to switch the desired core from the "1" condition to the "0" condition. At this time the sense windings will be energized producing the desired translated output code in 4 of 8. The "CR" sense winding links all the cores in the translator and thus upon each translation the "CR" position of the register will be set to a predetermined stable state to represent a "tag" bit. The translator core planes are wound in such a fashion that any input code which is not a valid code will switch all the cores to the "0" condition at the time of entry into the translator. Thus at read time there will be no translation or entry into the register which may be detected indicating an input error.

As an example of the translation, assume the letter A has been inserted in the register in the input code. The letter A in the input code would turn ON the "1," "0," "X", and "R" trigger positions in the register. The transmit translator of FIG. 12 would then be cleared by the CLEAR pulse 14.5 placing all the cores in the translator to the "1" condition. On the application of a negative pulse to the drivers of FIG. 11 the following output lines would be energized: 11.2, 11.3, 11.5, 11.7, 11.10, 11.12 and 11.14. With this combination of drivers energized, all cores in the translator which do not contain in their codes a 1, R, O, and X, will be switched to the "0" condition and all cores which do contain in their code a 2, 4, 8, will be switched to the "0" condition. The application of the 1/2 SELECT pulse 11.17 is necessary at this time. By noting the windings on the "A" core in the translator, it will be seen that it is the only core in the translator which does not receive a pulse in addition to the one-half select pulse, thus the core representing character "A" will remain in the "1" condition. By applying the READ pulse 14.1 at a later time the core representing character "A" will be switched to the "0" condition producing the translated output on sense lines 1, R, O, X and CR.

Although a receive translator 59 has not been shown, its operation and logic is the same as the transmit translator 56. The receive translator will accept as an input code the 4 out of 8 transmittal code and translate the character to the desired output code for presentation to the output device.

The housekeeping core plane 58 of FIG. 2 is shown in more detail in FIG. 13. The schematic drawing in FIG. 13 is the same as for the transmit translator wherein vertical lines represent cores, horizontal lines represent windings, and diagonal lines represent turns of windings upon the cores. The housekeeping plane has a plurality of sections which include TR SHIFT, TR LRC, RC SHIFT, RC LRC, DRIVE FAILURE, EMITTER and RC ANALYZER. The TR SHIFT cores are utilized for temporary storage of the character being transmitted. When the character is read into the temporary storage of the TR SHIFT cores, all the bits are entered with the exception of the bit contained in register position "1." When the character is read out of the temporary storage of the TR SHIFT cores, the sense windings are wound in such a fashion that shift core 2 produces an output to register position "1" and shift core 4 produces an output to register position "2" etc. In this fashion, the character to be transmitted is shifted through the register by cycling the character in and out of the register through the TR SHIFT cores whereby each bit position is shifted to the next preceding register position.

The TR LRC cores accept bits from each register position. After an input code has been translated to the transmittal code, the 4 of 8 bits are utilized to accumulate a longitudinal redundancy check (LRC) character. The first character to be transmitted in a record, immediately after translation, is entered into the LRC cores. The following characters, after translation to the transmittal code, are held in the register for an LRC cycle. After the bit in the first register position has been sent to the transmission medium, the LRC cores are read out to the register. A binary addition without carries takes place in the register of the character presently being transmitted and the already accumulated LRC character. After the addition, the character is re-entered into the TR LRC cores. The LRC character is added to each transmitted character in a like fashion and then re-entered into the LRC cores. After transmission of the last character of a record, the LRC character is read from the LRC cores to the register and transmitted to the receiving STR. The addition without carries thus produces an indication for each bit position of whether there has been an even (0) or odd (1) number of bits transmitted.

The RC SHIFT cores also perform temporary storage in the receiving STR. As mentioned previously, each serially received bit is entered into "N" register position. The "N" position trigger is read out to the "N" RC SHIFT core. Prior to the receipt of the next serially received bit the RC SHIFT cores are read out. The sense lines of the RC SHIFT cores are applied to the next preceding register position. Thus it can be seen that each bit inserted into the register position "N" and thereafter inserted in the "N" RC SHIFT core is read out to the "X" position trigger in the register. Thus it can be seen that as each of the RC SHIFT cores is read out its output is applied to the next preceding stage in the register. It should also be noted that RC SHIFT core 1 has its output applied to the "CR" position of the register. Receipt of the first bit of a character is recognized in the cycle timing and a "tag" is inserted in register position "X" initially. After 8 bits in the 4 of 8 transmittal code have been received, this tag will have been shifted through the register to the RC SHIFT core 1 and read out to register position "CR." This indicates to the STR controls that an entire character has been accumulated.

When an entire character has been received by the receiving STR this character in the 4 of 8 code is entered into the RC LRC cores. In the same manner that the LRC character was accumulated in the transmitting STR, an LRC odd/even character will be accumulated in the receiving STR. At the end of a record being transmitted the transmitting STR transmits the LRC character it had accumulated. When this character is received at the receiving STR, the receiving STR will read out its RC LRC cores into the register. If the LRC characters coincide indicating a proper transmission of all bits in the record, the register positions will all be turned OFF. Means are provided for detecting that this condition exists, to be explained more fully later, and will condition certain units in the receiving STR for sending reply information.

The DRIVE FAILURE cores are utilized to indicate in register position "G" the proper functioning of the receive translator, transmit translator and receiver analyzer. On a clear cycle all of the DRIVE FAILURE cores are set to the "1" condition. Each of the DRIVE FAILURE cores has a winding from each driver. On each translation cycle at least one of the pair of drivers associated with each register position should be energized. With the proper functioning of the drivers, all the DRIVE FAILURE test cores will be set to the "0" condition and when the READ RC ANALYZER pulse 15.1 or the READ RC TRANSLATOR pulse 15.3 or the READ TR TRANSLATOR pulse 14.1 is applied, none of the DRIVE FAILURE cores will be switched at this time and there will be no input to the "G" position of the register. If one of the drivers fails to function, at least one of the DRIVE FAILURE cores will have remained in the "1" condition at the time of reading either translator or the analyzer cores and the "G" sense line would have been energized placing this information in the "G" position of the register.

A group of co ntrol characters may be transmitted by an STR and these control characters are generated within the STR. The housekeeping core plane of FIG. 13 contains a set of cores for generating these control characters. The EMITTER portion of this plane accomplishes this. When a control character is to be transmitted, the STR will insert a single bit into the register 54. Entry and reading out of the EMITTER cores takes place only at a definite cycle time when there is no data to be transmitted. The control characters (D characters) are INQUIRY/ERROR, IDLE, ACK 2/SOR 2, TEL, ACK 1/SOR 1 and EOT.

It will be noted that all of the EMITTER cores with the exception of IDLE, have a single 2-turn input. IDLE has a 2-turn winding corresponding to the windings of each of the other EMITTER cores. It should be noted that the READ EMITTER pulse 14.2 is applied to all of the EMITTER cores but is turned on the IDLE core in the opposite direction.

At the proper time, when the STR is not in a data condition and a D character is to be sent, all cores of the EMITTER plane are set off by the CLEAR pulse, 14.5. Later one of the cores may be set to the ON condition by the single bit input from the register. Any core which is turned ON also turns ON the IDLE core. Assume the TEL code was entered into the register. The TEL core and the IDLE core would be set ON. Upon application of the READ EMITTER pulse 14.2 the TEL core goes to the OFF state. This switching of the TEL core is picked up in the sense windings wound on the TEL core and the output in 4 of 8 code is sent to the register.

The IDLE core cannot be reset OFF with the READ EMITTER pulse 14.2 since its read winding is pulsed in the same direction as that of its entry winding and, therefore, no switching occurs. Although IDLE is turned ON when any one of the other five cores is turned ON, IDLE is not switched OFF during readout and, therefore, not picked up by the sense amplifiers.

If no bit were entered into the register at the time the EMITTER was to be read, none of the cores including IDLE would be set on at the entry time. When the READ EMITTER pulse 14.2 occurs, the IDLE core will be set to the ON state. Switching of the IDLE core at this time will be sensed by the sense windings linking the IDLE core. This output in a 4 of 8 code will be inserted in the register for transmission. In order to maintain synchronization between a transmitting STR and a receiving STR when no other characters are to be sent, a series of IDLE characters will be sent.

In addition to the 6 D characters generated in the EMITTER cores, 2 other D characters may be generated and transmitted. These D characters include control leader (CL) and transmit leader (TL). These D characters are generated through logic conditions recognized within the STR.

The D characters CL and TL are utilized in conjunction with the other 6 D characters. The TL character precedes all D characters transmitted by the transmitting STR. The CL character precedes D characters generated and transmitted by a receiving STR and certain D characters transmitted by either STR. A single D character code may have two meanings. The D character INQUIRY and the D character ERROR are both coded with the same bits. The INQUIRY signal is always transmitted by a transmitting STR and the ERROR character is always transmitted by a receiving STR. In order that the logic within each of the STR units may recognize whether it is to read the D character as INQUIRY or ERROR, the preceding leader code (TL or CL) will have been examined to indicate the proper reading of the character received.

The housekeeping plane of FIG. 13 also contains 8 RC ANALYZE cores. The RC ANALYZE cores are switched in accordance with the received 4 out of 8 D characters. Each STR has logic means energized by the register triggers for detecting the presence in the register of a D character. Although this D character is entered into both the receive translator and the housekeeping plane, the D character will be recognized and only the ANALYZER cores will be read. Recognition of a D character will cause the READ RC ANALYZE pulse 15.1 to be generated rather than READ RC TRANSLATOR 15.3. The particular ANALYZE core which had been energized will produce an output on sense windings to the register. This output, as apparent in FIG. 13, may be a two-bit or a simple-bit output in addition to the "tag" output. Receipt of the D character IDLE has no meaning within a receiving STR. Its only use is during periods in which no data is being sent to maintain synchronism The code for the D characters are given below:

| | |
|---|---|
| IDLE | 1 – – 8 R O – –; |
| CL | 1 – 4 – R – X –; |
| TL | 1 – 4 – R – O – –; |
| INQUIRY/ERROR | 1 – – 8 R – X –; |
| SOR 1/ACK 1 | 1 2 – – R – X –; |
| SOR 2/ACK 2 | 1 2 – – R O – –; |
| TEL | – – 4 8 R – X –; |
| EOT | – 2 – 8 R – X –; |

The control character sequences and the functions which they initiate are listed below:

CL–IDLE—Used during idle periods for change of direction of transmission of IDLE signals.

CL–TEL—A push button entry which sounds an alarm when received by an STR notifying an operator that telephone communication is desired.

CL–EOT—A push button entry at a transmiting STR for indicating to the operator of the receiving STR that all transmission is completed.

The following D character sequences are transmitted only by an STR that is sending data:

TL—INQUIRY Calls for a reply from the receiving STR (ACK 1, ACK 2, ERROR).

TL–SOR 1—Conditions both sending and receiving STR units for initial transmission of data SOR 1 used for identifying the first and all following odd numbered records.

TL–SOR 2—Used for identifying the second and all even numbered records.

TL–LRC—Transmission of the TL code and the LRC character indicates the end of record to the receiving STR and calls for a reply from receiving STR.

The following D character sequences are transmitted only by an STR that is receiving data:

CL–ACK 1—Acknowledges for the correct reception of a record preceded by SOR 1.

CL–ACK 2—Acknowledges for the correct reception of a record preceded by SOR 2.

CL–ERROR—Calls for a repeat transmission of the last transmitted record.

FIG. 14 and FIG. 15 show the generation of entry pulses and read pulses utilized in the transmit translator, receive translator and the housekeeping plane. The drivers shown require a negative level and a negative pulse to produce an output. These drivers are energized at particular times and under particular conditions logically determined in the STR. The inputs to the logic shown in FIG. 14 and FIG. 15 in particular combinations will become apparent from a later discussion concerning transmit and receive cycles.

The sense line outputs of the transmit translator of FIG. 12 are applied to sense amplifiers in FIG. 16. The sense amplifier outputs are applied to corresponding triggers in the register 54 through OR circuits 140 and 141. The sense amplifiers are allowed to amplify the translator outputs only at definite times in each cycle of operation. These times are dictated by the positive output of single-shot circuits 146 and 147. A gate 148 to which is applied a positive level and a positive pulse at definite times will trigger single-shot 147. Another single-shot 149 is triggered by a gate 150 through the output of the OR circuit 151. The single-shot circuits 146, 147, and 149 produce negative outputs representing 2-TIME 16.11, 3-TIME 16.12, and 4-TIME 16.13 respectively.

FIG. 17 shows the means by which the serially received bits from the demodulation equipment are inserted in register position "N." The received signal is applied to a gate 175 through an inverter 17 and a gate 176. The RC STROBE 4.1 samples gates 175 and 176. If the received signal is at a positive level indicating a MARK condition, gate 176 will be conditioned with a positive level and gate 175 will not be conditioned through the action of inverter 177. The RC STROBE 4.1 will therefore gate a pulse through gate 176 to the ON side of a trigger 180. The positive level of the ON side of trigger 180 is applied to an AND circuit 181. The other two inputs to AND circuit 181 are applied at definite periods in a receive cycle. If the RC STROBE 4.1 detected a MARK condition, trigger 180 would be turned ON and at the proper cycle time AND circuit 181 would be conditioned producing a negative output. The negative output is inverted by inverter 182 and a bit will be entered into the "N" position trigger turning the trigger ON.

At the proper cycle time, an AND circuit 183 will be energized producing a negative output indicating the need for inserting a "tag" bit in the register. This negative level indicating RC TAG 17.3 is utilized in further logic for inserting the tag in the "X" position of the register.

Whenever an STR is in a sending condition, the REQUEST TO SEND line 31.3 will be at a negative level holding trigger 180 in the OFF condition preventing any disturbance of the "N" trigger in the register.

FIG. 18 shows the means by which the "1" position of the register 54 is sampled to present bits to the transmission medium. An AND circuit 190 is conditioned by the ON side of the "1" trigger and an AND circuit 191 is conditioned by the OFF side of the "1" trigger. When the "1" is in the ON condition, a MARK is to be transmitted and when in the OFF condition, a SPACE is to be transmitted. At the proper time in a transmit cycle the conditioning of AND circuits 190 and 191 is sampled. A negative output from either AND circuit is applied to a latch 192. If a MARK is to be transmitted, AND circuit 190 will be conditioned and latch 192 will be turned ON. With latch 192 ON a gate 193 will be conditioned. If a SPACE were to be transmitted, AND circuit 191 would have been conditioned and a negative pulse would have been applied to the OFF side of latch 192. The OFF side of latch 192 is applied to a gate 194. The occurrence of a TR STROBE 9.1 samples gates 193 and 194 either turning a trigger 195 ON or OFF respectively. The ON side of trigger 195 is applied as output 18.1 to the modulation equipment to cause transmission of a MARK. Latch 192 and trigger 195 remain in their existing stable states until adjacent bits to be transmitted differ.

FIG. 19 shows the means by which a transmitting STR recognizes that an entire 8 bit character has been transmitted. An AND circuit 200 has applied as inputs the OFF side of all but the first two register triggers. On the 8th cycle of transmitting a character, the "tag" bit will have moved to register position "2" and all remaining register positions will be OFF. The positive level applied to AND circuit 200 by all the remaining triggers will produce a TR TAG as a negative level 19.1 and a positive level 19.2.

FIG. 19 is also utilized for comparing LRC characters. If the LRC characters are identical at the receiving STR, the register positions will all have been turned OFF. The negative output of AND circuit 200 indicating the OFF condition of all but the first two register positions is inverted by an inverter 201 and this positive level is applied to an AND circuit 202. The remaining two register positions are also applied to the AND circuit 202. AND circuit 202 will thus produce a LRC CHECK output 19.3 when all register positions are OFF.

FIG. 20 shows the logical means for determining when an STR has received a D character. The previous discussion of the control characters pointed out how these characters were coded. The logic of FIG. 20 is operative to recognize the specific conditions of the register positions at the time a complete character has been formed in the register. It will be apparent from an examination of the D character codes that all D characters contain either no "O" and an "X" or an "O" and no "X." This condition is recognized by an OR circuit 205 provided with inputs from an AND circuit 206 and an AND circuit 207. An examination of the codes for the D characters will also show that in all of the D characters there is an "R" and there is never an "N." It is also apparent that all D characters with the exception of TEL and EOT contain a "1." An AND circuit 208 is provided for indicating at RC TAG TIME 23.3 all the conditions necessary for recognizing a D code. The negative output of AND circuit 208 when a D code is present turns ON a latch 209 which produces a positive output indicating a D code 20.2.

At RC TAG TIME 23.3 if the character assembled in the register is not a D code but a data code, the output line 20.1 indicating no D code will be produced. At RC TAG TIME 23.3 if AND circuit 208 has not been energized, its output will be positive and applied to an AND circuit 210. The positive input from AND circuit 208 and the positive RC TAG TIME input 23.3 will produce a negative pulse from AND circuit 210 which will be applied to the OFF side of latch 209.

FIG. 21 shows a latch circuit 215 providing a positive level output SDC 21.2. The SDC output 21.2 will be positive when an STR is in a send data condition. The send data condition is initiated whenever negative inputs SOR 1, 28.7 or SOR 2, 28.8 is produced. The latch 215 will remain in a send data condition until a certain point in a transmit cycle 28.10 when an end-of-record is to be indicated at which time the transmit leader (TL) will be transmitted. This condition will take the transmitting STR out of a send data condition. When a transmitting STR recognizes it has made a translation or input error, the latch 215 will be turned OFF by the INPUT CHECK PULSE 37.1.

FIGS. 22 and 23 show the logic for generating transmit and receive cycles respectively. FIG. 24 is a timing diagram showing the condition of various components of FIG. 22 and FIG. 23. FIGS. 25 and 26 show in diagram form the various functions performed within a transmitting and receiving STR respectively at the various cycle times.

Transmit cycles are initiated by the TR STROBE 9.1 and receive cycles are initiated by the RC STROBE 4.1. With existing transistor circuits the STR can be designed to operate at a speed of 120,000 bits per second. In the interest of reducing cost of the unit and in view of the high cost of transmission facilities which could accommodate this speed, the STR of the present invention has been designed to operate at a speed of approximately 4,000 bits per second. Standard transmission facilities operate at approximately 1,200 bits per second. The STR of the present invention has been designed to operate at this speed, although as mentioned previously, faster speeds are possible. In the embodiment shown, the TR STROBE and RC STROBE are controlled by dividing RR pulses. The bit rates could be changed by any suitable means which might include utilizing the oscillator pulses directly, the 3 and 4 output 3.5 of FIG. 3 with RR pulses or the strobes could be generated by a separate oscillator. At a bit rate of approximately 1,200 bits/second, the oscillator utilized in the present design will produce a transmitting bit rate wherein the time between transmit strobes or receive strobes will be approximately 833 microseconds. The combined length of time for accomplishing a complete transmit cycle and receive cycle in turn requires about 364 microseconds. This leaves a considerable length of time for internal logical operations of the STR between transmitted or received bits which might include the accumulation and transfer of data in a buffer system used with a faster or slower I/O device.

FIGS. 24–26 show the basic transmit and receive cycles and their respective sub-cycles. These include the major cycles TR A, B, and C and RC A and B. Each of these cycles is further broken down into four sub-cycles generated in FIG. 3. As mentioned previously, the transmit cycle is initiated by a TR STROBE 9.1. The A, B and C cycles are initiated upon the occurrence of RR pulses 3.3 and the four sub cycles within these cycles are produced upon the occurrence of pulses produced in FIG. 3. Both the transmit and receive cycles are further broken down into designations indicating character cycles. Each character transmitted or received contains 8 bits; therefore, there are 8 transmit or receive cycles required for each character transmitted or received. A TR 1st cycle is generated upon the transmission of the first bit of a translated character. There then follows the second through seventh transmit cycles during which the second through seventh bit of the character to be transmitted is placed on the line. The TR 8th cycle is indicated at the time the "tag" bit has moved into the second position of the register.

In a like manner, receive cycles are broken down into the RC 1st cycle at which time the first bit of a character is received, the second through seventh cycles in which the second through seventh bits are received and RC 8th cycle at which time the "tag" bit has been shifted completely through the register into the "CR" position of the register.

TR 1st cycles are further broken down into definite logical conditions. These include a first cycle in which no data is being sent (NOT DATA), a first cycle in which data is to be sent (DATA), and a first cycle in which an LRC character is to be transmitted (LRC). RC 1st cycles are also broken down into four logical conditions. These include a first cycle in which data is not being sent (NOT IN DATA CONDITION), a first cycle in which there is a data character following a control character (DATA CONDITION NOT AFTER DATA CHARACTER), a first cycle for receiving a data character after receipt of a previous data character (DATA CONDITION AFTER DATA CHARACTER), and a first cycle in which the LRC character is being received (LRC). RC 8th cycles are also logically broken down into two conditions. These include an eighth cycle in which a data character is being received (TAG) and an eighth cycle in which an LRC character is being received (LRC).

The TR A, B, and C cycles are generated in FIG. 22. These cycles are generated through logical combinations of a TR CALL trigger 220, a TR CYCLE trigger 221, a TR 1st trigger 222, and a TR DATA trigger 223. Each TR STROBE 9.1 turns ON trigger 220. When trigger 220 is gated ON and there is no RC CYCLE 23.6 the immediately following RR pulse 3.3 applied at a gate 224 will turn ON trigger 221. The TR 1st trigger 222 is turned ON after the occurrence of a TR TAG 19.2 which shows that a previous character has been completely transmitted. The TR DATA trigger 223 is turned ON when a gate 225 has been conditioned. Gate 225 is conditioned to turn ON trigger 223 when the STR is in a SDC 21.2, the input device has a data character to send, and when the input 27.11 is positive. The GATE STL and SCL input 27.11 is generated when data is to be sent at the occurrence of TR A 1st 22.6.

When the TR CALL trigger 220 is turned ON by a TR STROBE 9.1, the immediately following RR pulse 3.3 will turn ON the TR CYCLE trigger 221 as long as there is no RC CYCLE 23.6 in process. The ON side of triggers 220 and 221 are applied to an AND circuit 226 which has an output inverted by inverter 227. With the 1st cycle trigger 222 in the ON condition AND circuit 226 will be conditioned to produce a positive output TR A 1st 22.6 through inverter 227. When the TR CYCLE trigger 221 is turned ON, the ON side of this trigger conditions the OFF gate of trigger 220. The immediately following RR pulse therefore turns OFF the TR CALL trigger 220. The OFF side of trigger 200 and the ON side of trigger 221 condition an AND circuit 228 which has an inverted output for producing positive TR B output 22.9. The TR B output 22.9 and the ON side of the 1st Cycle trigger 222 are applied to an AND circuit 229 which has an inverted output producing a positive TR B 1st output 22.5. The RR pulse 3.3 after trigger 220 has turned OFF will turn OFF the TR CYCLE trigger 221. The ON side of trigger 223 and the OFF side of trigger 221 are combined at an AND circuit 230 producing a negative level output TR C 22.2.

After a TR B cycle 22.9, trigger 222 will be turned OFF. AND circuit 226 therefore will not be conditioned, and after the first transmit cycle of a character, TR A 1st 22.6 will not be generated. A TRA cycle will not be generated because with the TR 1st trigger 222 OFF, and when the TR CYCLE trigger 221 is turned ON, an AND circuit 231 will be conditioned to produce a negative reset pulse to trigger 220 turning trigger 220 OFF. This condition is noted in FIG. 24 at 232. Thus after a TR A 1st has been generated, the remaining seven transmit cycles contain only TR B and TR C cycles.

As mentioned in connection with FIG. 18, the TR STROBE 9.1 samples the condition of a latch 192. The latch 192 is set to the condition of the first position of the register at TR B 3-TIME. (See FIG. 25.) The latch 192 is conditioned during one transmit cycle and stores this condition until the immediately following TR STROBE 9.1 at which time the information is sent on the line for transmission by way of the trigger 195.

An output labeled TR PULSE 22.10 is generated in FIG. 22. This pulse 22.10 is generated from a gate circuit 232 and occurs at the end of a TR A 1st cycles.

FIG. 23 shows the means by which the various receive cycles are generated. The occurrence of each RC STROBE pulse 4.1 turns ON a RC CALL trigger 240. The ON side of trigger 240 gates the ON side of a trigger 241. Trigger 241, which is the RC CYCLE trigger, will be turned ON by the next succeeding RR pulse 3.3 as long as there is no TR CYCLE 22.4. The ON side of the RC CYCLE trigger 241 gates the OFF side of the RC CALL trigger 240.

A trigger 242 is provided to generate RC 1st cycle outputs. A latch 243 provides an output indicated as RC 8-TIME 23.1. With latch 243 ON indicating the 8th cycle of a received character and with a RC B cycle being generated, the RR pulse 3.3 will turn ON the RC 1st trigger 242 indicating that the next bit received will be the first bit of the following character.

When both the RC CALL trigger 240 and the RC CYCLE trigger 241 are ON, an AND circuit 244 will be conditioned to produce a positive output 23.11 and a negative output 23.12 indicating a RC A cycle. The positive RC A output 23.11 and the ON side of the RC 1st cycle trigger 242 are combined at an AND circuit 245 producing a positive and negative output indicating a RC A 1st cycle 23.8 and 23.7 respectively. The immediately following RR pulse 3.3, which turns OFF the RC CALL trigger 240, produces through an AND circuit 246 a positive output indicating a RC B cycle 23.13. The RC B output 23.13 is combined at an AND circuit 247 with the ON side of the RC 1st cycle trigger 242 to provide a negative and positive output indicating RC B 1st 23.9 and 23.10 respectively. An AND circuit 248 and an inverter 249 produce an output 23.5 and 23.4 respectively. These outputs indicate with negative and positive levels a RC A cycle which is not a 1st cycle. During a RC A cycle which is not a 1st cycle, at which time the receive tag has moved into the "CR" position **10*b*8 of the register, an AND circuit 250 will be conditioned at 2 and 3-TIME 3.2 to produce a negative output to latch 243** indicating a RC 8th cycle 23.1. The output of AND circuit 250 is inverted to produce a positive output indicating RC TAG TIME 23.3. The RC 8th cycle 23.1 and RC B 23.13 are applied to an AND circuit 251 to provide a positive output 23.2 indicating RC B 8th cycle. Latch 243 indicating the 8th receive cycle of a character is turned OFF when the next negative RC A 1st 23.7 is generated.

FIG. 24 shows the timing and generation of the RC A and RC B cycles. The trigger 180 of FIG. 17 is turned ON or OFF depending on the MARK or SPACE condition of the received signal upon the occurrence of each RC STROBE 4.1. The ON or OFF condition of the trigger 180 is not sampled to place the bit in the "N" position of the register until RC B, 2-TIME or RC A not the 1st cycle at 2-TIME. (See FIG. 26.)

As mentioned previously in discussingi full-duplex operation of the STR, the register 54 must be utilized for both transmit and receive cycles. The TR CYCLE trigger 221 of FIG. 22 and the RC CYCLE trigger 241 of FIG. 23 are interconnected to prevent the initiation of a transmit cycle if the receive cycle has already been started or a receive cycle if a transmit cycle has already been started. (See Input 23.6, FIG. 22 and Input 22.4, FIG. 23.) In full-duplex operation the TR STROBE 9.1 and RC STROBE 4.1 of one STR are not interconnected in any way. Because of this, and because of the advancing or retarding of a RC STROBE based on the other STR transmission, the RC STROBE in a particular STR may drift and be caused to occur at the same time as a TR STROBE in a particular STR. If a RC STROBE occurs at least 4 oscillator pulses prior to a TR STROBE, the RC CYCLE trigger 241 will have been turned ON preventing the turning ON of TR CYCLE trigger 221. Likewise, if a TR STROBE occurs at least 4 oscillator pulses prior to a RC STROBE, the TR CYCLE trigger 221 would have been turned ON preventing the turning ON of the RC CYCLE trigger 241. This latter condition is shown in FIG. 24 wherein the RC STROBE occurs after a TR STROBE. The RC CALL trigger 240 is allowed to turn ON but the RC CYCLE trigger 241 is held OFF by the negative Transmit Cycle input 22.4. As soon as the TR CYCLE trigger 221 is turned OFF the next succeeding RR pulse 3.3 will allow the RC CYCLE trigger 241 to turn ON initiating the RC A cycle 23.11. It may happen in full-duplex operation that the RC STROBE 4.1 and the TR STROBE 9.1 will occur at the same time. In this case, a transmit cycle is allowed to take precedence. As the TR CYCLE trigger 221 and the RC CYCLE trigger 241 are both trying to turn ON at the same time, a means is provided at the RC CYCLE trigger 241 for applying a reset pulse to the RC CYCLE trigger 241. As a result, although both the RC CYCLE trigger 241 and the TR CYCLE trigger 221 try to come ON at the same time, the RC CYCLE trigger 241 will be held OFF by the negative TR CYCLE input 22.4.

FIG. 27 shows the means by which an STR is conditioned to transmit a control leader (CL) or a transmit leader (TL). The conditions under which the LRC character is to be sent are also shown.

A trigger 260 produces the send control leader (SCL) output 27.8. A trigger 261 produces an output (STL) for sending the transmit leader 27.7 and a latch 262 is provided producing an output 27.4 indicating that the LRC character is to be sent (SLRC).

The various conditions under which CL is to be sent are applied to a gate 263. A gate 264 is conditioned to turn ON trigger 261 for sending TL at the proper time. Gates 263 and 264 are conditioned by the inverted output of an AND circuit 265 during TR A 1st 22.6 and no COD 31.4 and no STL or SCL or SLRC. Gates 263 and 264 are sampled by the TR PULSE 22.10 which is produced at the end of TR A 1st. An OR circuit 266 provides the logic for determining when CL is to be sent. The output of OR circuit 266 is normally negative with all of its inputs positive. It will only provide a positive output to gate circuit 263 when any one of the inputs goes negative. CL is normally sent by a receiving STR preceding a reply character. An AND circuit 267 is provided for initiating CL when an output is ready for data, the STR is in a RC RUN condition 40.3 and the STR has been called upon to SEND A REPLY 32.3. The reply, which may be either an acknowledgment or an error, will be preceded by CL.

When a transmitting STR realizes it has received an improper character from an input device or has made an error in translation, the INPUT CHECK line 37.1 will go negative turning ON the SCL trigger 260. When a receiving STR receives CL when in a receive data condition, the receiving STR will recognize the CL character as an indication of the error to take it out of RDC. CL is also used during IDLE periods when no data is being sent in either direction. In this case, an IDLE SS input 31.2 will produce a positive level every three seconds. The transmission of CL during IDLE periods indicates to the receiving STR that it is to change direction and commence transmitting IDLE signals. CL received during IDLE periods indicates end of IDLE.

Gate 264, which turns ON the STL trigger 261, is conditioned by an OR circuit 268. TL is sent by a transmitting STR preceding an INQUIRY character, a SOR character, and the LRC character. An AND circuit 269 is provided for causing TL to be sent when the STR is in a TR RUN condition 40.4, the input device has data available, there is no INPUT CHECK 37.1 and the STR is to SEND SOR 14.6. An AND circuit 270 is provided for causing the STL trigger 261 to turn ON. When the STR is in a TR RUN condition 40.4 and has not received a reply from a receiving STR, (NO REPLY) 34.3, the INQUIRY SS 31.1 will go positive. The INQUIRY SS input 31.1 goes positive only when three seconds have elapsed without receipt of a reply.

A transmitting STR is caused to send the LRC character by turning ON the SLRC latch 262. This latch 262 is turned ON when the STL trigger 261 is ON, the STR is in a send data condition (SDC) 21.2 and the input device has indicated end of record (EOTR). These conditions are applied to an AND circuit 271 which will provide the negative input to the SLRC latch 262. The SLRC latch 262 will be turned OFF by the negative output of an AND circuit 272 at 3 and 4-TIME 3.5 of a TR B 1st cycle 22.5 when the TR DATA trigger 223 has turned OFF 22.1.

An AND circuit 273 and an inverter 274 will provide a negative output (STL+SCL+SLRC) 27.2 whenever the STL trigger 261 or the SCL trigger 260 or the SCLR latch 262 is turned ON. An OR circuit 275 is provided for producing a positive output (STL+SCL) 27.1 whenever the STL trigger 261 or the SCL trigger 260 is turned ON.

FIG. 28 shows the means by which the leader codes CL and TL are inserted in the register 54 in the 4 of 8 code. FIG. 28 also shows the means by which a single bit is entered in the register 54 when it is necessary to send a D character generated by the EMITTER cores of FIG. 13.

The CL and TL characters are entered into the register 54 at TR B 1st cycle, 2 and 3-TIME. (See FIG. 25.) An AND circuit 280 produces a positive output through an inverter 281 at the desired time for sending TL or CL. The inverter 281 output samples an AND circuit 282 and an AND circuit 283 conditioned by STL 27.7 and SCL 27.8 respectively. AND circuits 282 and 283 will provide a negative output to an OR circuit 284 if TL or CL is to be sent. The positive output of OR circuit 284 is inverted by inverter 285. The negative output of inverter 285 is applied to an inverter 286, an OR circuit 287, an OR circuit 288 and an OR circuit 289. These logic blocks 286–289 provide positive inputs to the register positions "1," "4," "R," and "CR." An examination of the codes for TL and CL will indicate that both of them contain these bits in their 4 of 8 code. AND circuit 282 also provides an input to an OR circuit 290. AND circuit 283 also provides an input to an OR circuit 291. An examination of the codes for the CL and TL characters will further indicate that TL contains the "O" bit and CL contains the "X." Thus depending on whether CL is to be sent or TL is to be sent, the "O" position or the "X" position of the register will be set along with the common bits.

A series of AND circuits 295–302 are provided for inserting the single bits in the register 54 for energizing the proper EMITTER core of FIG. 13. FIG. 25 incates that these single bits are entered into the proper positions of the register 54 at TR A 1st, 2-TIME when the STR is not in a data condition. An AND circuit 303 will be conditioned by SCL 27.8 and an AND circuit 304 will be conditioned by STL 27.7 and not SLRC 27.3. TR A 1st 22.6, and 2 and 3-TIME 3.2 sample AND circuits 303 and 304. The negative outputs of AND circuits 303 and 304 are inverted by inverters 305 and 306 respectively. Inverter 305 provides a positive input to AND circuit 295, and AND circuit 302. With the TEL input 40.2 and the STR not in a RUN condition 40.5, AND circuit 295 will produce through OR circuit 287 the TEL input 28.4 to the "4" position of the register 54. When the STR is not in a RUN condition 40.5 and the EOT latch 40.1 is ON, AND circuit 302 will produce through OR circuit 291 the EOT input 28.11 to the "X" position of the register 54.

The inverter 306 positive output samples AND circuit 296, 299 and 301. When a transmitting STR has received NO REPLY 34.3, AND circuit 296 will produce through an OR circuit 307, the ERROR input 28.5 to the "8" position of the register 54. When an odd record is to be transmitted (TR ODD) 29.4 and there is a REPLY IN 34.2, AND circuit 299 will produce through OR circuit 288 the SOR 1 input 28.6 to the "R" position of register 54. When an even record is to be transmitted (TR EVEN) 29.5 and there is a REPLY IN 34.2, AND circuit 301 will produce an output through OR circuit 290 indicating SOR 2, 28.9 to the "O" position of register 54.

When a receiving STR detects a bad character received or the LRC check does not produce a good indication giving a RC ERROR 39.1 the receiving STR will be SENDING A REPLY 33.2. These two conditions will produce through AND circuit 297 and OR circuit 307 the ERROR output 28.5 to the "8" position of the register 54. When the receiving STR is SENDING A REPLY 33.2 to an odd record (RC ODD) 29.1 received with no RC ERROR 39.2, AND circuit 298 will produce through OR circuit 288, ACK 1, 28.6 to the "R" position of register 54. When the receiving STR is SENDING A REPLY 33.2 to receipt of an even record (RC EVEN) 29.2 with no RC ERROR 39.2, AND circuit 300 will produce through OR circuit 290 ACK 2, 28.9 to the "O" position of register 54.

An OR circuit 308 is provided in FIG. 28 for indicating that the transmit translator 56 has properly functioned by producing CR, **10*b*.8 or that the receive drive lines have functioned properly by not producing an input to the "G" position of the register 10*b*.9. If CR is not produced or G is produced, OR circuit 308 will produce an input to an AND circuit 309, which at TR B 1st cycle, 3-TIME will produce a negative output 28.1** to SET INPUT CHECK latch. (See FIG. 37.)

When an STR is in send data condition at the time GATE STL or SCL 27.11 is produced and the input device has indicated an end of record (EOTR), an AND circuit 310 will produce a negative EOTR output 28.2 indicating to a transmitting STR that TL and the LRC character should be sent.

WHEN a transmitting STR realizes it has made an error causing the input check latch to be turned ON producing a positive INPUT CHECK output 37.1, an AND circuit 311 will produce at TR B 1st cycle 22.5 an output 28.12 through OR circuit 289 to the "CR" position of the register 54. The "tag" is inserted in the CR position of the register to provide a basis for a transmitting STR to recognize an 8th cycle of transmission for a character so that a TR A 1st cycle may be properly initiated. In this manner the transmitting STR will cycle through a complete character although no bits are placed on the line so that the transmitting STR will not be put out of character phase.

An AND circuit 312 is provided in FIG. 28 for producing a negative output 28.13 which RESETS RC 1st trigger 242 of FIG. 23 in the OFF condition. The output of AND circuit 312 also inserts a tag in the "CR" position of the register 54. The purpose of AND circuit 312 will be more fully explained later and is used to insert a tag in the "CR" position of the register on a RC A cycle when the STR units are initially turned ON and are searching for synchronism. The RESET RC 1st output 28.13 has the effect of making every cycle during the initial seeking of synchronism to appear as a RC 8th cycle. As each cycle appears to be an 8th cycle the receiving STR will eventually recognize a D code and an indication will be given that character phase has been achieved at which time the synchronization can take place.

FIG. 29 shows a trigger 320 and a trigger 321 by which an STR recognizes receipt of CL or TL. At RC A, 8th cycle, 2-TIME, the 8th bit of a leader code will have been entered into the register 54. (See FIG. 26.) At this time, RC TAG TIME 23.3 will be generated and latch 209 of FIG. 20 will be turned ON producing the D code output 20.2. At RC A, 8th cycle, 4-TIME, the 4 of 8 code of the control character will have been recognized as a D character and the character will be entered by the entry drivers of FIG. 11 into the ANALYZER cores of FIG. 13. The register 54 is reset at RC B, 1-TIME and at RC B, 8th cycle, 2-TIME READ ANALYZER pulse 15.1 will be generated. At this time the output of the ANALYZER cores of FIG. 13 is inserted in the register 54. In the case of TL a bit is placed in the "2" position of the register 54, and in the case of CL a bit is placed in the "1" position of the register 54.

An AND circuit 322 is conditioned by recognition of a D character 15.2, the generation of a RC B 8th cycle 23.2 and 3 and 4-TIME 3.5. The inverted output of AND circuit 322 is applied to a gate 323. The RR pulse 3.3, which turns OFF the RC B cycle, samples the gate 323. Gate 323 produces a positive ANALYZE PULSE 29.13. The output of gate 323 also samples the input gates of triggers 320 and 321. As mentioned previously if TL has been received the "2" position of register 54 would be ON and the TL trigger 320 would be turned ON indicating receipt of TL. If CL has been received, the output of the ANALYZER cores of FIG. 13 would have inserted a bit in the "1" position of the register. With the "1" position turned ON, the CL trigger 321 would be turned ON producing the CL indication 29.8.

An OR circuit 324 has as its inputs the OFF side of triggers 320 and 321. Receipt of TL by a receiving STR indicates that a change of direction of transmission is to take place. When TL is received, the TL trigger 320 will turn ON and the OFF side of trigger 320 will fall to its negative level producing a positive level output of OR circuit 324 to and AND circuit 325. Receipt of TL and the following D character will leave the "1" position of the register in the OFF condition, thus both inputs to AND circuit 325 will be positive producing through an inverter a positive DIRECTION CONTROL output 29.12. The DIRECTION CONTROL output 29.12 is utilized in further circuitry to be discussed for conditioning a receiving STR to send a reply.

An AND circuit 326 is provided for indicating the end of transmittal record (EOTR) 29.3 when RC A 1st 23.8 is generated after receipt of TL by an STR in RDC 32.5. This is an indication to a receiving STR that the immediately following character is to be the LRC character.

Receipt of the TEL special character immediately following receipt of CL will condition an AND circuit 327 when the ANALYZER cores of FIG. 13 are read inserting a bit in the "4" position **10*a*.6 of the register 54. Receipt of the TEL character will produce a negative output RC TEL 29.6. An AND circuit 328 will be conditioned providing an indication RC EOT 29.9 to indicate receipt of the end of transmission character. The character immediately following CL, which is coded in the 4 of 8 code to represent EOT, will produce a bit in the "X" position 10*b*.4 of the register 54**.

FIG. 29 also shows the transmit and receive memory means indicating transmission and receipt of odd and even records. The transmitting memory means include a trigger 330 and the receiving memory include a trigger 331.

The transmit memory means 330 produces a TR ODD output 29.4 when in the OFF condition and a TR EVEN output 29.5 when in the ON condition. The trigger 330 will be caused to change from an existing stable state to the opposite stable state at the end of RC B 8th cycle when a GOOD REPLY 30.3 has been received from the receiving STR.

The receiving memory means 331 produces a positive RC ODD output 29.1 when in the OFF condition indicating that the last acknowledgment was for an odd record and a positive RC EVEN output 29.2 when in the ON condition indicating that the last acknowledgment was for an even record. Trigger 331 is caused to change from an existing stable state to an opposite stable state upon the occurrence of the TR CYCLE PULSE 22.10 which occurs at the end of TR A 1st when a GOOD REPLY is being sent 33.3.

The TR ODD 29.4 and the TR EVEN 29.5 outputs are utilized to indicate the proper SOR character to be sent and the proper reply that should be received. The RC ODD condition 29.1 and the RC EVEN condition 29.2 indicate in a receiving STR the SOR character which should be received, the proper ACK character to be sent in reply and remembers the last ACK character sent. Neither of the triggers 330 nor 331 is caused to change stable states unless a good reply has been received or a good reply is sent respectively. In this manner, triggers 330 and 331 are utilized to insure that there will be no lost records or duplicate records.

The manner in which the TL, CL, Transmit Odd/Even and Receive Odd/Even outputs are utilized to detect receipt of a proper or improper reply and the receipt of a proper and improper SOR is shown in FIG. 30. An AND circuit 340 is provided with a series of inputs. These inputs are produced when an STR is in TR RUN condition 40.4, has not previously received a BAD REPLY 34.1, the ANALYZER cores of FIG. 13 have inserted a bit in the "N" position **10*b*.6 of register 54, the 4 of 8 transmittal code was recognized as a D character 20.2 at RC B, 8th cycle, 3 and 4-TIME, 29.14 and the previous D character received produced the CL indication 29.8. The negative output of AND circuit 340 is inverted and applied to a series of AND circuits 341–345. AND circuits 341–345** will indicate to a transmitting STR the reply received from a receiving STR.

Receipt of the ERROR code would have produced by way of the ANALYZER cores of FIG. 13 a bit in the "8" position of the register 54. AND circuit 341 will then be energized by the "8" position **10*a*.8 and will be sampled by the AND circuit 340 output producing a negative output indicating ERROR RCVD 30.1. An OR circuit 346 is provided with an input from the AND circuit 341. The negative output of AND circuit 341 applied to OR circuit 346 will produce a positive output which is further utilized to turn ON a BAD REPLY latch 30.2 The TR EVEN input 29.5 energizes AND circuit 342 and AND circuit 345. The TR EVEN indication 29.5 indicates that the expected reply is ACK 2. The ANALYZER cores of FIG. 13 will insert in the register 54, upon receipt of an ACK 4 of 8 character, a bit in the "R" position, 10*a*.10, for ACK 1 and a bit in the "O" position, 10*b*.2, for ACK 2. Insertion of a bit in the "R" position 10*a*.10 of the register 54 indicating ACK 1 when the TR EVEN input 29.5 is positive will energize AND circuit 342 producing a negative output applied to OR circuit 346 indicating a BAD REPLY 30.2. Insertion of a bit in the "O" position 10*b*.2 of the register 54 when the TR EVEN input 29.5 is positive will produce an output through AND circuit 345. The output of AND circuit 345 is applied to an OR circuit 347 producing an output 30.3 indicating a GOOD REPLY. The negative output of AND circuit 345 is utilized to turn ON a GOOD REPLY latch 30.4. Receipt of ACK 1 when the TR ODD input 29.4 is positive will produce an output from AND circuit 343 producing a negative output to the GOOD REPLY latch 30.4 and a positive output 30.3 indicating a GOOD REPLY. Receipt of ACK 2 when the TR ODD input 29.4 is positive will produce an output from AND circuit 344 causing OR circuit 346 to produce a positive output to the BAD REPLY latch 30.2**.

An AND circuit 350 is provided in FIG. 30 for producing a positive output through an inverter under certain conditions. Receipt of the leader code TL 29.11, will place a receiving STR out of RDC 32.4. A receiving STR will be conditioned to RC RUN 40.3.

At the time of receipt of TL the receiving STR will not be in a SEND REPLY condition 32.2. The BAD CHARACTER 36.1 has not been received and at RC B 8th cycle, AND circuit 350 will produce a negative output inverted to a positive level applied to a series of AND circuits 351–355.

Receipt of the INQUIRY control code after TL will have caused the ANALYZER cores of FIG. 13 to insert a bit in the "8" position of register 54. Receipt of INQUIRY at the time AND circuit 351 sampled by the output of AND circuit 350 will produce the negative output 30.5 indicating receipt of INQUIRY.

Receipt of SOR 1 after receipt of TL would have caused the ANALYZER cores of FIG. 13 to insert a bit in the "R" position of register 54. Receipt of SOR 2 after TL would have caused the ANALYZER cores to place a bit in the "O" position of register 54. With the RC EVEN input 29.2 at a positive level indicating that a receiving STR has acknowledged for an even record and is expecting receipt of SOR 1, and SOR 1 is received, AND circuit 352 will produce a negative output to an OR circuit 356 which will produce a positive output indicating RC GOOD SOR 30.6. With the RC EVEN input 29.2 at a positive level indicating acknowledgement for an even record and the expected receipt of SOR 1, and SOR 2 is actually received by the receiving STR, AND circuit 354 will be conditioned and will produce an output which is negative to the LOST RECORD latch 30.7.

With RC ODD input 29.1 at the positive level indicating acknowledgement of an odd record and the expected receipt of SOR 2, AND circuits 353 and 355 will be conditioned. If SOR 1 is received after receipt of TL, AND circuit 353 will produce a negative output 30.7 to the LOST RECORD LATCH. If the expected SOR 2 character is received after receipt of TL, AND circuit 355 will produce a negative output to OR circuit 356 which will produce a positive output indicating RC GOOD SOR 30.6.

The manner in which the RC ODD output 29.1, RC EVEN 29.2, TR ODD 29.4 and TR EVEN 29.5 outputs are utilized by an STR to cause transmission of the proper SOR or ACK character may be seen in connection with FIG. 28. The proper SOR character to be transmitted will be generated from the EMITTER cores of FIG. 13 dependent upon the single bit entered into the register 54. When an odd record is to be transmitted, TR ODD 29.4 will be positive and condition AND circuit 299. If a reply has been received from the receiving STR, whether good or bad or ERROR, the REPLY IN input 34.2 will be positive conditioning both AND circuits 299 and 301. Upon the generation of TR A 1st; AND circuit 304 will produce an inverted output to sample gates 299 and 301. At this time, AND circuit 299 will produce a negative output to OR circuit 288 which in turn produces a positive pulse 28.6 to the "R" position of register 54. At TR A 1st cycle, 4-TIME the single bit in register position "R" of register 54 will enter the required information into the EMITTER cores of FIG. 13. At TR B 1st cycle, 2-TIME, the EMITTER will be read and the proper 4 of 8 code representing SOR 1 will be entered into the register 54 for transmission. In a like manner, if TR EVEN input 29.5 has been positive, AND circuit 301 would have produced a negative output to OR circuit 290 producing output 28.9 inserting a single bit in the "O" position of register 54 which when read into and out of the EMITTER, would have produced the 4 of 8 code for SOR 2.

If NO REPLY 34.3 has been received from a receiving STR, AND circuit 296 would have been conditioned and would have produced an output to OR circuit 307 which would insert, by output 28.5, a single bit in the "8" position of the register 54. The EMITTER cores in this case would produce the 4 of 8 character representing the character INQUIRY.

The receiving STR when called upon to reply for receipt of a record will insert a proper single bit in the register 54 to condition the receiving STR EMITTER cores for generating the proper ACK signal. The proper ACK character to be sent is indicated after switching the RC ODD/EVEN trigger 331 when the indication is that a GOOD REPLY is to be sent 33.3. If there has been no RC ERROR 39.2, AND circuits 298 and 300 will be conditioned. At the proper time the receiving STR will be SENDING A REPLY 33.2 which will sample AND circuits 297, 298, and 300. If the RC ODD input 29.1 is positive indicating that ACK 1 should be transmitted, AND circuit 298 will produce an output 28.6 through OR circuit 288 inserting a single bit in the "R" position of register 54. This single bit will produce from the EMITTER cores of FIG. 13 the 4 of 8 character representing ACK 1 to be transmitted to the transmitting STR. If the RC EVEN input 29.2 has been positive, ACK 2 would have been transmitted in the same manner. If the receiving STR has detected an error in the received record or the LRC characters do not check, the RC ERROR input 39.1 will be positive. In this case, the RC ERROR input 39.2 will be at a negative level blocking transmission of either ACK 1 or ACK 2 from AND circuits 298 and 300 respectively. The RC ERROR input 39.1 being positive will produce from AND circuit 297 at the time of SENDING A REPLY 33.2 an output 28.5 through OR circuit 307 to the "8" position of register 54. The EMITTER cores of FIG. 13 in the receiving STR will therefore generate the 4 of 8 character representing the ERROR signal to be transmitted to the transmitting STR.

It is apparent from the previous discussion that the TR ODD/EVEN trigger 330 and RC ODD/EVEN trigger 331 of FIG. 29 are operative to detect receipt of the proper ACK signal in the case of a transmitting STR or the receipt of a proper SOR signal from a transmitting STR. The triggers 330 and 331 are further effective for indicating to a transmitting STR the proper SOR character to be transmitted and indicates to a receiving STR the last proper ACK character transmitted.

FIG. 31 shows the means by which the direction of transmission between distant STR units is controlled. The direction control consists of a send control trigger 360 and a change of direction trigger 361. The send control trigger 360 must be ON for an STR to transmit. Assume an STR, which is to receive data, has been receiving the IDLE codes from the STR which is to transmit data. The receipt by an STR that is to receive data of the TL-INQUIRY sequence of control characters calls on a receiving STR to indicate if it is ready to accept data. The means for indicating readiness is to transmit ACK 2 in reply. The send control trigger 360 of a receiving STR will be OFF. Receipt of the TL character will cause the DIRECTION CONTROL line 29.12 to go positive. An AND circuit 362 is conditioned by the DIRECTION CONTROL signal 29.12 in addition to the OFF condition of the change of direction trigger 361. The ANALYZE PULSE 29.13 which turned ON the TL trigger 320 of FIG. 29, will have no effect at gate 363 as the output of AND circuit 362 will not be conditioned at this time. The negative input RC GOOD SOR 30.6 will be at a positive level as the SOR signal is not being received. (Receipt of TL followed by SOR does not require a receiving STR to send a reply.) The immediately following ANALYZE PULSE 29.13, after DIRECTION CONTROL 29.12 has gone positive, will produce a positive output through an OR circuit 364 to turn ON the send control trigger 360. The inverted output of an OR circuit 365 produces a negative SEND REQUEST output 31.3 when an STR is required to send a reply. The negative SEND REQUEST output 31.3 is applied to the reset input of the receive line trigger 180 of FIG. 17. When the send control trigger 360 was turned ON, one input to OR circuit 365 went to a negative level producing, as an inverted output, the negative output SEND REQUEST 31.3 which prevents the receive line trigger 180 from accepting any data incoming off the line.

The send control trigger 360 can only be turned OFF after the change of direction trigger 361 has been turned ON. The change of direction trigger 361 is turned on by a TR CYCLE PULSE 22.10 at the end of TR A 1st 22.6 after the receiving STR has turned ON its SCL trigger 260 producing the STL or SCL input 27.1. When the change of direction trigger is turned ON, the next following TR CYCLE PULSE 22.10, which occurs at the time of transmitting the ACK character, will produce an output from a gate circuit 366 turning OFF the send control trigger 360.

The ON side of trigger 360 and the negative SDC input 21.1 are applied to an OR circuit 367. When the send control trigger 360 is turned OFF the output of OR circuit 367 will go positive allowing the next following TR CYCLE PULSE 22.10 to produce an output from a gate circuit 368 turning OFF the change of direction trigger 361.

During IDLE period when neither STR is in a SDC 21.1 the change of direction trigger 361 will not be held in the OFF condition. When an STR sends TL followed by SOR placing it in a send data condition, the change of direction trigger 361 is held in the OFF condition.

A single-shot 370 is provided in FIG. 31 which is effective to cause a transmitting STR to transmit the INQUIRY control character after having waited six seconds for a reply character from the receiving STR. The single-shot 370 is designed in such a manner that the input must be positive for at least three seconds before the single-shot will fire. The output of the single-shot is normally at a negative level and when it is switched will go to a positive level. When a transmitting STR has completed a record and has transmitted TL followed by the LRC character, it will have gone out of SDC bringing positive the input 21.1 to OR circuit 367 and will remove the reset to trigger 361. The transmitting STR send control trigger 360 will be turned OFF by the TR CYCLE PULSE 22.10 after trigger 361 has been turned ON. OR circuit 367 will still be producing a positive output which will not condition single-shot 370. If the receiving STR is not going to send a reply, it will be sending IDLE signals followed by END-OF-IDLE. This signal will cause the send control trigger 360 to be turned ON. Both inputs to OR circuit 367 will be positive conditioning single-shot 370 through inverter 371. After three seconds, single-shot 370 will switch producing a positive INQUIRY SS output 31.1. This output is utilized at FIG. 27 to turn ON the STL trigger 261 initiating the two-character sequence for INQUIRY. INQUIRY is transmitted as previously discussed concerning FIG. 28. If at any time during the three seconds, a reply is received and the transmitting STR goes back to a send data condition, the positive level to the single-shot will be removed before it has fired.

The single-shot 370 is also utilized during IDLE periods when no data is to be transmitted and the STR is not in a SCD 21.1. A particular STR which is sending IDLE signals will have its send control trigger 360 in the ON condition thus conditioning OR circuit 367 which will apply through the inverter 371 a positive level to the single-shot 370. After sending IDLE signals for three seconds the single-shot 370 will fire producing a negative IDLE SS output 31.2 effective at OR circuit 266 of FIG. 27 to initiate the transmission of CL. During IDLE periods receipt of CL indicates to the STR receiving the IDLE signals that this is the end of the IDLE periods and that a change of direction of transmission of IDLE signals is to take place. Receipt of CL during the IDLE periods will cause the send control trigger 360 of the STR receiving IDLES to turn ON. Thus the STR which was initially receiving IDLE signals will now be capable of transmitting IDLE signals. In the same manner as previously discussed, the single-shot 370 will fire after a period of three seconds and the end of IDLE signal CL will be transmitted back to the STR originally sending IDLE. This procedure alternates as long as no data is to be sent.

A single-shot 375 is provided in FIG. 31 which operates in the same manner as single-shot 370 in that it requires a positive level for at least three seconds before it fires. The single-shot 375 is effective through a gate circuit 376 to turn ON the send control trigger 360 of an STR receiving data. The inverted output of an OR circuit 377 produces the positive level to the single-shot 375. An STR which has not received a D character 21.1, or is not in a RDC 32.4 by receiving a SOR character, or has not been requested to SEND A REPLY 31.3 will produce the positive level through the inverted output of OR circuit 377. If, after the elapse of three seconds, an STR which is to receive a record has not received a D code or has not gone into a RDC 32.4 by other means and has not had a SEND REQUEST 31.3, the single-shot 375 will fire producing a positive level at gate 376. This three second SS output 31.5 will be effective to turn ON the SEND CONTROL trigger 360 bringing both input to OR circuit 367 positive to condition single-shot 370. With the SEND CONTROL trigger 360 ON, the STR will send IDLE signals for lack of other information to send. After three seconds single-shot 370 will switch initiating the END-OF-IDLE sequence. The single-shot 375 is effective to sound an alarm through use of the three second SS output 31.6 indicating a possible line failure or complete shut-down of the STR which should be transmitting a record.

FIG. 32 shows the means by which an STR is placed in the receive data condition (RDC) and the means by which a receiving STR initiates the sending of a reply. An RDC trigger 380 is provided for generating the RDC output 32.5 and a negative RDC output 32.4. A receiving STR will be placed in the receive data condition by turning ON the RDC trigger 380 through a gate circuit 381 which will produce a positive output upon the occurrence of the ANALYZE PULSE 29.13 and the receipt of a RC GOOD SOR 30.6. The receiving STR will be taken out of receive data condition by turning OFF trigger 380 through an OR circuit 382 having inputs from a gate 383 and a gate 384. The RDC trigger 380 will be turned OFF through OR circuit 382 by gate circuit 383 upon the occurrence of a RR pulse 3.3 when there has been a RC ERROR 39.1. The RC ERROR input 39.1 will be generated whenever there is a drive failure of the receiving translator, an error made by the output device, receipt of a bad character or failure of the LRC characters to check. The RDC trigger 380 will also be turned OFF upon the occurrence of the TR CYCLE PULSE 22.10 at gate 384 when the receiving STR is SENDING A GOOD REPLY 33.3.

A send reply trigger 385 is turned ON by a RR pulse 3.3 being applied to a conditioned gate 386. Gate 386 will be conditioned whenever any of the inputs to an OR circuit 387 go negative. The output of OR circuit 387 will go positive whenever INQUIRY 30.5 is received calling for a reply or the receiving STR receives EOTR 29.3 or the receiving STR is in RDC and a RC ERROR 39.1 is made which is applied to an AND circuit 388. The send reply trigger 385 is turned OFF by the application of a positive pulse from a gate 389 when the receiving STR is SENDING A REPLY 33.2 and the TURN SEND REPLY OFF 33.1 goes positive.

The inverted output of an AND circuit 390 generates a positive output RC DATA CHARACTER 32.1. This output 32.1 will be generated when a receiving STR is not sending a reply and is in receive data condition, there is no LRC CYCLE 35.1 and RC 8th cycle 23.2 is generated. This RC DATA CHARACTER output 32.1 is effective to make a call to the output device to take a character.

FIG. 33 shows the means by which a receiving STR indicates that it is SENDING A REPLY 33.2 and that it is SENDING A GOOD REPLY 33.3. The send reply trigger 385 of FIG. 32 will be turned ON whenever INQUIRY 30.5 is received, EOTR 29.3 or there has been a RC ERROR 39.1. When SEND REPLY 32.3 is generated SEND ACK 27.9 will be generated and applied to an AND circuit 391 and an AND circuit 392. If there was no LOST RECORD 38.2, then at TR A 1st cycle, 2 and 3-TIME, with the SCL trigger 260 turned ON, 28.0, AND circuit 391 will produce a negative output 33.1 and a positive output through inverter circuit 393 indicating that it is SENDING A REPLY 33.2. If the receive data condition (RDC) trigger 380 has not been turned OFF by RC ERROR 39.1 applied to gate 383, RDC input 32.5 will be at a positive level at the time the GATE STL and SCL input 27.11 is generated. AND circuit 392 will provide a negative output inverted by an inverter 394 producing a positive output indicating that the STR is SENDING A GOOD REPLY 33.3.

The SENDING GOOD REPLY output 33.3 is applied to gate 384 of FIG. 32 so that the next TR CYCLE PULSE 22.10 will turn OFF the receive data condition trigger 380. The send reply trigger 385 will be turned OFF by the output of gate 389. The SENDING REPLY signal 33.2 will be at a positive level at gate 389. The TURN SEND REPLY OFF input 33.1 will be at a negative level, however when AND circuit 391 is de-conditioned, the TURN SEND REPLY OFF input 33.1 will start a positive transition. The positive transition of TURN SEND REPLY OFF 33.1 in conjunction with the SENDING REPLY level 33.2 will cause an output of gate circuit 389 to turn the send reply trigger 385 OFF.

The SENDING GOOD REPLY output 33.3 as mentioned previously in connection with FIG. 29 is utilized to change the stable state of the RC ODD/EVEN trigger 331 to indicate the last record acknowledged for.

The means by which a transmitting STR recognizes the type of reply it has received is shown in FIG. 34. A latch 395 will indicate when a GOOD REPLY 34.4 has been received, and a latch 396 will indicate when a BAD REPLY 34.0 has been received by a transmitting STR. The OFF side of each of the latches 395 and 396 is applied to an OR circuit 397. If neither latch 395 or 396 is turned ON, OR circuit 397 will produce a negative output inverted by an inverter 398 producing a positive output indicating NO REPLY 34.3. If either latch 395 or 396 is turned ON, the output of OR circuit 397 will go positive producing a positive output indicating REPLY IN 34.2.

A good reply producing ACK EVEN 30.4 or ACK ODD 30.4 will produce a negative output through OR circuit 399 to turn ON latch 395 indicating a GOOD REPLY 34.4 and REPLY IN 34.2. If there has been a BAD REPLY 30.2, a negative pulse will be applied to latch 396 producing the BAD REPLY output 34.0.

An AND circuit 400 is provided to produce a negative output to the OFF side of latch 395 and latch 396. When the transmitting STR, which is not sending ACK 27.10, is put back into SDC 21.2 after the gate STL and SCL input 27.11 at AND circuit 265 has been produced allowing the STL trigger 216 of FIG. 27 to come on, which in turn ultimately causes the latch 215 of FIG. 21 to turn ON, AND circuit 400 will produce a negative output. This negative output is inverted and applied to an AND circuit 417. At 2-TIME of TR A 1st cycle, AND circuit 417 will produce a negative output to the input device as an INPUT CALL 34.5 calling for another character from the input device.

The BAD REPLY output 34.0 is applied to the input device for causing the input device to back space to the beginning of the last transmitted record to attempt a retransmission. The GOOD REPLY output 34.4 is applied to the input device to indicate that a good reply has been received and that the next following record may be transmitted.

Before discussing the manner in which the LRC characters are received by a receiving STR and a LRC cycle generated (FIG. 35), the manner in which the LRC character is accumulated by the receiving STR will be discussed. Reference should be made to FIG. 15 and FIG. 26. In normal operation at RC A, 8th cycle, 2-TIME, the 8th bit of a received character will be inserted in the "N" position of the register 54. At 4-TIME the 4 of 8 character will be read and entered into the RC SHIFT cores of FIG. 13 in addition to being read into the RC TRANSLATOR. The 4 of 8 character is entered into the RC SHIFT cores by a drive 401 of FIG. 15. During RC B 8th cycle the translator output will be inserted in the register and the translated code sent to the output device. All LRC operations on a particular character are accomplished at RC A 1st cycle of the next succeeding character. It will be noted that only at RC B 1st cycle is the first bit of a character entered into the "N" position of the register. At all other times the bits are inserted in the "N" position of the register during RC A cycles.

At receive A 1st cycle, 1-TIME the register 54 is reset. The previous 4 of 8 character was inserted in the RC SHIFT cores and is read out into the register 54 at RC A 1st cycle 2-TIME. It must be remembered that the 1 position shift core produces an output to the "CR" position of register 54. In this manner the LRC character is accumulated but is displaced by 1 bit position. The RC SHIFT cores are read at 2-TIME of every RC A cycle which produces the READ RC SHIFT pulse 15.4 from a driver 402. The RC LRC cores are then read at RC A 1st cycle 3-TIME and added without carries to the existing character in the register. This is accomplished by the READ RC LRC pulse 15.6 produced by a driver 403. Driver 403 will be read every RC A 1st cycle whenever an STR is in receive data condition (RDC) 32.5 and the RC DATA input 36.6 is at a negative level. In this case, an OR circuit 404 will be producing a positive output level to an AND circuit 405 which will produce a negative level to the driver 403 every RC A 1st cycle 23.8. At 4-TIME of an RC A 1st cycle 23.8 when an STR is to RC DATA 36.7, an AND circuit 406 will be energized causing the accumulated LRC character in the register 54 to be entered into the RC LRC cores through a driver 407 which produces ENTER RC LRC pulse 15.7. At RC B 1st cycle, 1-TIME the register is reset and acceptance of the first bit of the next succeeding character will take place.

FIG. 35 shows the means by which a receiving STR accepts and acts upon the LRC character transmitted by the transmitting STR at the end of each record. Receipt of TL during a receive data condition indicates end of transmittal record and that the next character to follow will be an LRC character. The negative signal RC EOTR signal 29.3 is applied to turn ON a latch 408. At the end of RC B 1st cycle 23.10, which occurs with the RR pulse 3.3, a gate circuit 409 will produce a positive pulse to a trigger 410 to produce the positive LRC CYCLE 35.2 as latch 410 turns ON, the OFF side going negative will turn OFF latch 408 through OR circuit 416. The bits of the LRC character are accepted and shifted into the register 54 as in the case of a data character. At RC A 8th cycle of an LRC cycle the 8th and last bit of the LRC character will be inserted in the register 54. At RC A, 8th cycle. 4-TIME the entire 8 bit LRC character will be entered into the RC SHIFT cores of FIG. 13 by driver 401 of FIG. 15. At RC B 8th cycle, 1-TIME the register 54 will be reset. At RC B, 8th cycle, 2-TIME the ANALYZE cores and the translator cores will not be read because the negative input LRC cycle 35.1 will be applied to AND circuit 411 and 412 of FIG. 15 blocking the operation of drivers 413 and 414 respectively.

At RC A, 1st cycle, 1-TIME of an LRC cycle the register 54 will be reset. At RC A, 1st cycle, 2-TIME the RC SHIFT cores which contain the received LRC character will be read as in the case of every other RC A cycle. Reading from the RC SHIFT cores will displace all the bits of the received LRC character one bit position. At RC A, 1st cycle, 3-TIME of an LRC cycle the accumulated LRC character in the RC LRC cores will be read into the register 54. It will be remembered that as each 4 of 8 character was received by the receiver and the LRC bits accumulated, the LRC character was shifted one bit position coinciding with the shift caused by the RC SHIFT cores which contained the received LRC character. If the accumulated LRC character and the received LRC character from the transmitting STR coincide, all of the positions of the register 54 will be set to the OFF condition. At RC A, 1st cycle, 4-TIME of an LRC cycle the check of the condition of the register positions will be made. When all of the positions of the register are OFF a negative indication will be produced indicating an LRC check 19.3 (See FIG. 19.)

After the LRC check, the RC B, 1st cycle 23.10 will be generated conditioning a gate 415 which will produce a pulse upon the occurrence of the RR pulse 3.3 which brings an end to RC B 1st cycle. The positive output of gate 415 will turn OFF the LRC trigger 410.

If during receipt of a record, the receiving STR detects an error in a character or makes a translation error, the RDC trigger 380 of FIG. 32 will be turned OFF. The RDC input 32.5 applied to OR circuit 416 will go negative and will prevent latch 408 from turning ON to initiate an LRC cycle.

FIG. 36 shows the means by which a receiving STR recognizes the receipt of a bad character. An AND circuit 420 will be conditioned at 3 and 4-TIME 3.5 when the receiving STR is to RC a DATA CHARACTER 32.1. The RC DATA CHARACTER 32.1 input is produced every RC B 8th cycle 23.2 when an STR is in RDC. (See FIG. 32.) The output of an OR circuit 421 will indicate the error condition to AND circuit 420 for generating the negative output BAD CHARACTER 36.2. When the STR is to receive a data character and had previously received CL 29.8 and the following character did not produce an "N" **10*b*.5 from the ANALYZER cores of FIG. 13, an AND circuit 422 will produce a negative output to OR circuit 421 bringing up the third input to AND circuit 420**.

Another error condition is produced by an AND circuit 423. If the receiving STR had not received a CL character 29.7 but did receive a D character 20.2, which produced from the ANALYSER cores of FIG. 13 a bit in the "N" position 10b.6 of the register 54, AND circuit 423 will produce a negative output which will bring up the third input to AND circuit 420 through the OR circuit 421.

Another error indication will be produced through AND circuit 420 if at the time of sampling AND circuit 420 the receive translator had failed to produce a translated character causing the "CR" input 10b.8 to remain at a negative level.

The only time AND circuit 420 will indicate a BAD CHARACTER 36.2 is when the RC DATA CHARACTER input 32.1 is positive. In FIG. 32 AND circuit 390 produces the RC DATA CHARACTER signal 32.1. AND circuit 390 will not be energized during an LRC CYCLE 35.1 so that the LRC character does not produce the BAD CHARACTER output 36.2. Receipt of TL when in RDC will turn OFF trigger 385 deconditioning AND circuit 390. Receipt of TL in RDC indicates EOTR and is not a BAD CHARACTER. The RDC trigger 380 will be turned OFF if there is RC ERROR 39.1 or the STR SENDS GOOD REPLY 33.3. This deconditions AND circuit 390 so that receipt of TL or SOR will not indicate a BAD CHARACTER.

Whenever an STR is not to receive a data character, the BAD CHARACTER output 36.2 will not be produced, but the output ACCEPT CHARACTER 36.1 will be effective. This output is applied as one conditioning input to AND circuit 350 in FIG. 30 which conditions the logic to identify a character following TL as SOR 1, SOR 2 or INQUIRY.

An AND circuit 424 is provided for indicating at the proper time during the RC DATA CHARACTER condition 32.1 the proper functioning of the drive lines. If the drive lines to the TRANSLATORS or ANALYZER have not functioned properly, a bit will have been placed in the "G" position 10b.10 of register 54. In this case, AND circuit 424 will produce a negative output indicating a DRIVE FAILURE 36.3.

An AND circuit 425 is provided for producing a negative output indicating TIME TO CHECK LRC 36.4. The time check LRC (see FIG. 26) is at RC A 1st cycle, 23.8, 4-TIME. Four-TIME is generated at AND circuit 425 by the coincidence of the input 3 and 4-TIME 3.5 and 1 and 4-TIME 3.1.

An AND circuit 426 is provided for producing a negative output to the output device indicating RC DATA CALL 36.5. The RC DATA CALL output 36.5 indicates to the output device that it should accept a translated character. AND circuit 426 will produce this negative output when an STR is to RC a DATA CHARACTER 32.1 at RC B, 8th cycle, 2 and 3-TIME 3.2 without having received a D character 20.1. Receipt of a D character 20.1 will prevent an output call to the output device.

The negative output RC DATA 36.6 and positive RC DATA output 36.7 are generated by a latch 427. The latch 427 is turned ON upon the generation of the negative RC DATA CALL output 36.5. The latch 427 is turned OFF at the start of RC B, 1st cycle 23.9 or when the RDC trigger 380 of FIG. 32 has been turned OFF. The RDC trigger 380 is turned OFF when a bad character is received. The positive and negative RC DATA outputs are effective in FIG. 15 to permit or prevent the accumulation of the LRC character.

In full-duplex operations utilizing 4 wires it is possible for four input-output devices to be working into and out of two STR units. At any one time a single STR may be transmitting a record and receiving a record. The manner in which transmit and receive cycles are interleaved is shown in FIGS. 22–24.

All of the circuits previously discussed function in the same manner. Means must be provided in either STR for breaking into the normal transmission of record data to use transmit cycles for the purpose of transmitting reply information in the form of ACK or ERROR characters.

In FIG. 34, an INPUT CALL 34.5 is made to the input device callaing for the next data character. This call is made at 2-TIME of every TR A, 1st cycle through the action of AND circuit 400. The STR will be in SDC 21. 2 when GATE STL and SCL 27.11 is produced. Under normal conditions the SEND ACK input 27.10 will be at a positive level. A normal INPUT CALL can be prevented by bringing the SEND ACK input 27.10 to a negative level. The SEND ACK input 27.10 is produced at AND circuit 267 in FIG. 27. AND circuit 267 will produce the negative level when an STR is called upon to SEND A REPLY 32.3. SEND REPLY 32.3 is generated from trigger 385 in FIG. 32 when INQUIRY 30.5 is received or end of record is indicated by RC EOTR 29.3. The trigger 385 will also turn ON when the receiving section of the STR produces RC ERROR 39.1. Through these last-mentioned means, therefore, a particular STR can interrupt normal data transmission to formulate reply information.

FIG. 37 shows a latch 430 which is turned ON under certain error conditions recognized in an STR in SDC 21.2 applied to an AND circuit 432. AND circuit 432 will produce a negative output through OR circuit 431 when the output of an OR circuit 433 goes positive. The inputs to OR circuit 433 are normally positive. The SET INPUT CHECK input 28.1 will go negative when an STR in SDC recognizes a translator error or drive line failure. (See AND circuit 309 of FIG. 28.)

If an STR in RUN condition 40.6 should accidentally be placed out of RUN, latch 430 will be turned ON.

In full-duplex operation where records are being sent in both directions, a particular STR may be in SDC 21.2. The other STR may detect an error in a received character or have a translator failure. In this case, the other STR will immediately reply with the ERROR control character as there is no need for waiting for the end-of-record indication. When ERROR RCVD 30.1 is produced at the STR in SDC, AND circuit 432 will turn ON latch 430. Latch 430 will be turned ON when an input device indicates at OR circuit 431 that it is unable to read a character.

The output 37.2 of latch 430 indicating INPUT CHECK is effective to cause the input device to backspace to the beginning of the erroneous record. The negative INPUT CHECK output 37.1 is effective at FIG. 21 to turn OFF latch 215 to take the STR out of SDC, preventing an INPUT CALL 34.5 to the input device. When a particular STR is in RDC and making RC DATA CALLS 36.5 to an output device and suddenly receives the CL-ERROR combination as a reply to the transmitting section, RC DATA CALLS 36.5 will not be produced at AND circuit 426 of FIG. 36 as a D code 20.1 will have been recognized.

Latch 430 is turned OFF when the COD input 31.4 is produced. The COD trigger 361 in FIG. 31 will be turned ON when CL is sent as the negative input when in SDC 21.1 will have been removed.

FIG. 38 shows the means by which an audbile alarm is caused to be sounded under certain conditions. Whenever a lost record is detected in a receiving STR a latch 435 will be turned ON producing a negative output 38.2 indicating a LOST RECORD. An OR circuit 436 is provided for generating the ALARM signal 38.1 when any of the inputs go to a negative level.

When the end of transmission character is received producing RC EOT 29.9 a latch 437 will be turned ON producing an alarm indicating end of transmission which brings a halt to all transmission and may have any prearranged meaning.

Upon receipt of the TEL signal 29.6 a latch 438 will be turned ON producing an alarm indicating that telephone communication is desired.

An alarm will also be sounded when the output of a counter 439 has counted three particular types of errors. Certain types of errors will cause both the receiving and transmitting STR units to attempt a re-transmission of an entire record. Three erroneous attempts at transmitting one particular record will cause the ALARM output 38.1 to be sounded.

All of the alarm generating means of FIG. 38 are reset by a push button control.

In FIG. 39 an OR circuit 440 is provided with six normally positive inputs. If any of the inputs to OR circuit 440 go negative, an output ERROR COUNT 39.3 will be produced which is utilized in the error counter 439 of FIG. 38. An AND circuit 441 will cause an ERROR COUNT 39.3 each time an INPUT CHECK 37.2 is generated in the transmitting STR when it recognizes that it has made an error.

A latch 442 is provided with an OR input and will be turned ON each time there is a receiver DRIVE FAILURE 36.3. The other OR input to latch 442 is provided from an AND circuit 443. AND circuit 443 will be conditioned by an STR in RDC 32.5. If the receiving STR should go out of RUN condition 40.6 or the output device should make an error in accepting a data character from the STR, an OR circuit 444 will produce a positive level to AND circuit 443 turning ON latch 442. The ADAPTER ERROR produced by AND circuit 443 also produces an ERROR COUNT 39.3 from OR circuit 440. Each receiver DRIVE FAILURE 36.3 also produces an ERROR COUNT 39.3.

A latch 445 is provided with an OR type input to turn the latch ON. The latch will be turned ON each time a BAD CHARACTER 36.2 is received. The BAD CHARACTER input 36.2 will also cause an ERROR COUNT 39.3. The other OR input to turn ON latch 445 is provided from an AND circuit 446. AND circuit 446 will produce a negative output during an LRC CYCLE 35.2 when it is time to CHECK LRC 36.4 and the LRC CHECK 19.3 indicates an error. AND circuit 446 will not produce an output if there is no LRC ERROR 19.3. An LRC error also will produce an ERROR COUNT 39.3.

The remaining input to OR circuit 440 is an input produced each time INQUIRY 30.5 is received from a transmitting STR.

Whenever latch 442 or latch 445 is turned ON under an error condition, an OR circuit 447 will produce a positive output indicating a RC ERROR 39.1 and a negative output indicating RC ERROR 39.2. The negative output indicating RC ERROR 39.2 is utilized by the output device to cause back spacing and erasing of an erroneously received record. Whenever the negative output indicating RC ERROR 39.2 is generated the receiving output device will immediately back space to the beginning of the erroneously received record. FIG. 37 showing the input check latch 430 was shown to be the means by which an input device was caused to be back spaced each time the input check latch 430 was turned ON. Two conditions might prevail to cause back spacing. When a transmitting STR recognizes that it has detected an error, it will immediately back space and the receiving STR will immediately recognize a RC ERROR 39.2 and immediately back space allowing re-transmission to commence almost immediately. In the case in which the transmitting STR has not made an error, or has not recognized an error, it will proceed to finish transmitting an entire record. The receiving STR, however, if it should receive a bad character, will immediately back space. In this case some time may elapse from the time the receiving STR causes a back space to the time that the transmitting STR will back space to cause retransmission. The transmitting STR will not back space until it receives the ERROR character or bad reply from the receiving STR. The BAD REPLY output 34.0 is utilized to cause the input device to back space.

In FIG. 40 a latch 450 or a latch 451 will be turned ON whenever the TEL or the end of transmission (EOT) push buttons are depressed respectively. Latch 450 will cause the TEL special character 40.2 to be transmitted. Latch 451 will cause the EOT character 40.1 to be transmitted. The latches 450 and 451 will be turned OFF by a reset push button controlled by the operator.

A latch 452 is provided to be turned ON by the output of an AND circuit 453 or will be turned OFF by an AND circuit 454. If an STR is to be a transmitter the operator will switch a toggle bringing positive the SEND line turning latch 452 ON. If an STR is to be a receiving STR, the toggle will be switched to RECEIVE turning latch 452 OFF.

Transmission will commence when a latch 455 is turned ON indicating the RUN condition 40.6 The latch 455 will be turned ON when an AND circuit 456 has been fully conditioned. AND circuit 456 will be conditioned when the START push button is depressed and the STR units have achieved CHARACTER PHASE 6.3. The manner of achieving character phase will be discussed immediately following. The other input to AND circuit 465 is provided from the inverted output of an AND circuit 457. AND circuit 457 will produce a negative output when the input or output device indicates it is READY and the demodulation equipment is ready. The latch 455 will be turned OFF by a STOP push button when the ALARM signal 38.1 is generated.

When the latch 455 turns ON to produce the RUN condition 40.6, latch 452 will be placed in the proper stable state dependent upon whether the RECEIVE or SEND line is positive. An AND circuit 458 is provided to produce a positive output indicating a TR RUN condition 40.4 and AND circuit 459 is provided for producing positive output indicating a RC RUN condition 40.3. AND circuit 458 is conditioned by the ON side, or the send side, of latch 452 and AND circuit 459 is conditioned by the OFF side, or the receive sidefi of latch 452. When the RUN condition 40.6 is produced, AND circuits 458 and 459 will produce the proper outputs.

The manner in which initial synchronization takes place when each STR is originally turned ON is shown in a series of figures which include FIGS. 4, 6, 20, 23, and 28. At the instant each STR is turned ON it will start sending IDLE signals. Each STR will send IDLE signals for a period of three seconds at which time it will switch to recieve status to accept IDLE signals. Upon the completion of sending IDLE signals for three seconds the end-of-IDLE signals which include CL followed by IDLE will be sent. An STR which recognizes the end-of-IDLE signal will immediately change directions and start sending IDLE signals instead of waiting for the completion of the three-second period. The manner in which each STR attempts to recognize IDLE codes and more specifically the end-of-IDLE codes will now be discussed.

The manner in which an STR which is receiving IDLE signals recognizes that its register 54 contains an IDLE signal is shown in FIG. 6. In FIG. 6 a trigger 460 is included which is turned ON under certain conditions. When trigger 460 is turned ON an indication will be made that CHARACTER PHASE 6.3 has been achieved. Character phase means that the STR has recognized a D character during an 8th cycle and that the next bit received will in fact be the first bit of a character. During this initial period when there is no CHARACTER PHASE 6.4, each time a RC STROBE is generated to sample incoming bits the receiving STR is made to think that the bit received is the 8th bit of a character. This is accomplished by AND circuit 312 of FIG. 28 and the RC 1st trigger 242 of FIG. 23. A negative output from AND circuit 312 which is called RESET RC 1st 28.13 is generated when there is no CHARACTER PHASE 6.4 at 2 and 3-TIME 3.2 of a RC A cycle 23.11 and when there has been no D code 20.1 recognized. The negative output RESET RC 1st trigger 28.13 is applied to hold the RC 1st trigger 242 of FIG. 23 in the OFF condition. In this case each RC A cycle applied to AND circuit 248 will produce an output through inverter 249 which appears to the STR to be a RC A cycle not 1st 23.4. AND circuit 312 of FIG. 28 is further effective at OR circuit 289 to insert by its output 28.12 a tag in the "CR" position of register 54. AND circuit 250 of FIG. 23 will produce a negative output for every bit received, as each bit received appears to be the 8th bit of a character. AND circuit 250 will turn ON latch 243 which indicates a RC 8th cycle and will also produce the RC TAG TIME output 23.3.

As a result each bit received whether it is the first bit or any succeeding bit of an IDLE code will produce a RC TAG TIME 23.3. In FIG. 20 each RC TAG TIME 23.3 samples AND circuits 208 and 210 for indicating through latch 209 that a D code 20.2 has been accumulated in the register. At some period during the initial phasing a bit received will actually be the 8th bit of an IDLE code and latch 209 will be turned ON.

In FIG. 6 the inverted output of an AND circuit 461 conditions a gate 462. Even though the STR has recognized an IDLE code the character phase trigger 460 will not be turned ON unless another condition is met. AND circuit 461 has three inputs which must be positive to condition gate 462. The D code 20.2 will have been recognized and RC 8th cycle 23.1 will be positive. Character phase will not be indicated unless a RC STORE 4.1 is occurring at least after the center of receive bits. The manner of determining this is accomplished through the MARK input to AND circuit 461 and the CHARACTER PHASE SAMPLE input 4.0 to gate 462. In FIG. 4 it will be seen that the CHARACTER PHASE SAMPLE 4.0 is generated 180° out of phase with the RC STROBE 4.1. It will also be apparent from an examination of the code for IDLE, that the first bit is a MARK condition and the last bit is a SPACE condition. If the RC STROBE 4.1 is occurring before the center of received bits, the CHARACTER PHASE SAMPLE pulse 4.0 will occur during the duration of the SPACE condition of the 8th bit of an IDLE code. In this case, gate 462 will not produce an output to indicate character phase. If the RC STROBE 4.1 is occurring after the center of received bits, the CHARACTER PHASE SAMPLE pulse 4.0 will occur during the period of the first bit of the following IDLE code. In this case AND circuit 461 will be producing an output to gate 462 at the time the CHARACTER PHASE SAMPLE pulse 4.0 occurs and the trigger 460 will be turned ON to indicate CHARACTER PHASE 6.3.

Not until character phase is achieved will the RC STROBE be advanced or retarded in the normal manner to achieve exact synchronism. In the embodiment shown, once character phase has been achieved the RC STROBE is caused to be advanced to bring its occurrence from after the center of the received bits to the center or received bits.

Before character phase is achieved, the ON side of trigger 460, which will be at a negative level, is applied to trigger 100 of FIG. 6 to hold trigger 100 in the OFF condition. During this period three consecutive RC STROBES will have caused triggers 101, 102 and 105 to be set to the ON condition. The ON condition of triggers 101, 102 and 105 will produce through AND circuit 108 a RETARD condition 6.1.

During the period when an STR is receiving IDLE signals, AND circuit 108 will be causing each RC STROBE to be retarded to insure that at some time the RC STROBE will be occurring after the center of received signals to satisfy the requirements previously discussed for turning ON trigger 460.

AND circuits 108 and 109 of FIG. 6 are rendered ineffective to cause changes in the RC STROBE whenever an STR is required to transmit which produces a negative input SEND REQ. 31.3. Corrections in synchronizing are prevented which might be based on transmitted signals fed back to the receiving section.

An OR circuit 463 is provided for allowing corrections to be made even though an STR might be taken out of RDC. During normal RDC the negative input RDC 32.4 will cause OR circuit 463 to produce a positive output. OR circuit 463 will also provide a positive output to AND circuits 108 and 109 as long as trigger 460 is not producing the positive output showing CHARACTER PHASE 6.3. When a character has been received which was erroneous or a translator error has been made the STR will go out of RDC. The inputs to OR circuit 464 will indicate there was no D code 20.1, the STR is not in RDC 32.4, and there was CHARACTER PHASE 6.3. In order to continue synchronization based on the remaining characters of a record after being taken out of RDC, an AND circuit 464 is provided for producing a negative output to OR circuit 463. The error condition will call upon the STR to SEND REPLY 32.3, but SEND CONTROL 31.6 will not be produced until EOTR is received. The inputs to AND circuit 464 will be positive producing the negative output. As soon as the STR is called upon to reply the negative input SEND REQ. 31.3 will be produced and no further corrections will be made.

The character phase trigger 460 may be turned OFF by a gate 465. During normal transmission, after a receiving STR has transmitted its reply, expecting receipt within three seconds of a start of record signal, AND circuit 464 will be producing a positive output as the SEND REPLY input 32.3 will be at a negative level. If the receiving STR does not receive signals from a transmitting STR within three seconds, the single-shot 375 of FIG. 31 will switch producing the 3 SEC SS input as a positive level at gate 465. The next succeeding RR pulse 3.3 will turn OFF trigger 460. At this time the receiving STR will commence sending IDLE signals. After any breakdowns have been repaired or transmission is to start again, character phase will have to be achieved in the same manner as previously discussed.

There has been shown in the previous discussion a Synchronous Transmitter-Receiver capable of rapid and accurate handling of data in the form of binary bits for transmission over a transmission medium. With a minimum of components, wherein certain areas of the STR are used for both transmitting and receiving data, the overall cost of such a system has been greatly reduced.

Means have been shown within the STR capable of insuring that records are accurately sent and that no records will be completely lost or duplicated. A plurality of error conditions recognized in the STR will not cause an immediate halt to operations. An attempt at transmitting a record is not stopped upon the occurrence of a single error but every opportunity is given for completing a record before bringing a halt to operations. Certain intermittent errors caused by noise and other disturbances on the line are not allowed to increase the down time of the machine as the machine will attempt a retransmission which in all probability will result in a proper transmission.

Means for synchronizing a receiving unit with the received bits has been shown which does not require the transmission of time consuming and inefficient synchronizing bits. Synchronization has been shown to be maintained by utilizing only data bits transmitted between the units. The synchronizing means shown is capable of maintaining synchronism although the signals transmitted may be distorted or caused to jitter on the line. Corrections in the synchronization are not made on each deviation from the standard, but are only made when the receiving STR recognizes a consecutive number of the same type of deviation.

While the invention has been particularly shown and described with reference to a preferred embodiment thereof, it will be understood by those skilled in the art that various changes in form and details may be made therein without departing from the spirit and scope of the invention.

We claim:

1. A system for transmitting records of coded digital data characters between input-output devices by multi-bit, time-position coded signals comprising: means at a record transmitting station for preceeding each transmitted data record with record identifying characters and for ending each record with an end of record character, memory means at a record receiving station responsive to receipt of a correct one of said record identifying characters for conditioning said record receiving station to receive said record data, means at the record receiving station responsive to said receiving memory means and said end of record character for generating reply characters to said record transmitting station indicative of the accuracy of said record, and memory means at the record transmitting station responsive to said reply characters for indicating the proper record identifying character to be transmitted preceeding the record to be transmitted.

2. A system is accordance with claim 1 wherein said record identifying means includes means responsive to said record transmitting station memory means for generating a first character preceeding the first and all odd numbered records, and for generating a second identifying character preceeding the second and all even numbered records.

3. A system in accordance with claim 2 wherein said record transmitting station memory means includes means for indicating the reply character expected.

4. A system in accordance with claim 3 wherein said record transmitting station memory means includes means responsive to said expected reply character for initiating the transmission of the next record, and means responsive to other than said expected reply character for initiating the re-transmission of the last record transmited.

5. A system in accordance with claim 4 including means responsive to receipt of said expected reply character for changing said transmitting station memory means to initiate the generation of the next record identifying character and the indication of the next expected reply character.

6. A system in accordance with claim 1 wherein said receiving station reply character generating means includes means responsive to said record receiving station memory means for generating a first reply character indicating correct receipt of the first record and all odd numbered records, means for generating a second reply character indicating correct receipt of the second record and all even numbered records, and means for generating a third reply character indicating incorrect receipt of an entire record.

7. A system in accordance with claim 6 wherein said record receiving station memory means includes means for indicating the record identifying character expected.

8. A system in accordance with claim 7 including means conditioned by said memory means and receipt of said expected record identifying character for causing said receiving station to accept data characters, and means conditioned by said memory means and receipt of an unexpected record identifying character for preventing acceptance of data characters and indicating an error.

9. A system in accordance with claim 8 wherein said record receiving station memory means is effective to indicate the last correctly received record for which a reply character was generated.

10. A system in accordance with claim 9 including means responsive to receipt of the expected record identifying character, and correct receipt of an entire record for changing said receiving station memory means to initiate the generation of the proper reply character, indicate the last record correctly received and the next expected record identifying character.

11. A system for transmitting records of coded digital data characters between input-output devices at distant stations by multi-bit, time-position coded signals through digital subsets and a transmission medium comprising: means at a record transmitting station for transmitting at the start of records, record identifying characters for distinguishing the start of adjacent records, means at a record receiving station for returning reply characters to said record transmitting station for distinguishing the correct receipt of adjacent records, receiver memory means at said record receiving station for indicating the next record identifying character to be received, said receiver memory means operative to condition the proper reply character means and responsive to the return of a proper reply character to change the indication of the next record identifying character expected and the last reply character returned, and record transmitter memory means of said record transmitting station for indicating the next reply character to be received, said transmitter memory means operative to condition the proper record identifying character means and responsive to the receipt of a proper reply character to change the indication of the next reply character expected and the next record identifying character to be transmitted.

12. A system for transmitting records of coded digital data characters between input-output devices at distant stations by multi-bit, time-position coded signals through digital subsets and a transmission medium comprising: register means at transmitting and receiving stations for temporarily storing a multi-bit character, code translating means at each of said stations, timing means at each of said stations, said timing and translating means effective at said transmitting station to convert a character entered into said register in an input code to a multi-bit time position transmittal code, bit rate generating means controlled by said timing means for serially shifting said transmittal code out of said register for transmission to said receiving station, bit rate sampling means controlled by said received multi-bit signal operative at said receiving station for shifting the received multi-bit character signal into said register for conversion to an output code character by said receiving station translating means and timing means, means at each of said stations for forming a multi-bit character representative of the bits transmitted by said transmitting station and received by said receiving station, control means at each of said stations for generating and analyzing multi-bit control characters, said transmitting control means operative to generate and transmit record identifying characters preceeding each record and to generate an end of record character followed by said transmitted bit representative character, said receiving control means operative to return one of a plurality of control characters to said transmitting station in response to said record identifying character signals and said transmitted bit representative character indicative of the accuracy of a comparison of said transmitted bit representative character and said received bit representative character and the accuracy of the received record identifying signal, said transmitting control means further responsive to receipt of one of said return control characters for initiating the transmission of the next record and responsive to receipt of another one of said return control characters for retransmitting the last record.

13. A system in accordance with claim 12 including means for counting the number of retransmissions of a particular record, and means responsive to a predetermined count of said counting means for halting operations and sounding an alarm.

14. A system for transmitting and receiving records of coded digital data characters between input-output devices at each of distant stations by multi-bit, time-position coded signals through digital subsets and a transmission medium comprising: cycle control means for producing a plurality of control signals, register means including a plurality of bi-stable devices capable of assuming one of two stable states indicative of a data bit, transmit translator means responsive to said control means and said register means for converting a character in an input code placed in said register to a transmittal code in said register, said translator operative to set the last bi-stable device of said register to a predetermined one stable state, means responsive to said control means and a predetermined stable state of the first of said bi-stable devices for transmitting a data bit over said transmission medium, temporary transmit storage means conneced to said register for storing all but the data bit in said first bi-stable device, said transmit storage device responsive to said control means for sequentially shifting each of the remaining bits of a character to be transmitted to the next preceding bi-stable device before transmission from said first bi-stable device, means responsive to a received bit signal and said control means for inserting said received bit in the next to the last of said bi-stable devices, means including said control means for causing the third from the last of said bi-stable devices to assume a predetermined one stable state when the first bit of a character is received, said control means operative to cause insertion of a received bit after a transmittal code has been placed in said temporary transmit storage means, temporary receive storage means connected to said register responsive to said control means and said bi-stable devices for storing bits received by said register, said receive storage means responsive to said control means for sequentially shifting each received bit to the next preceding bi-stable device before receipt of the next bit, said receive storage means further operative to shift the bit originally placed in said third from the last bi-stable device through said register and back to the last of said bi-stable devices, receiver translator means connected to said register including means responsive to the last of said bi-stable devices assuming said predetermined one stable state and said control means for translating the received code to an output code for presentation to an output device through said register, and means responsive to said predetermined one stable state of the second of said bi-stable devices and the other stable state of all but the first of the other of said bi-stable devices for indicating that a transmittal character has been completely shifted through said register for transmission, said means further operative to call for another input character from said input device.

References Cited by the Examiner

UNITED STATES PATENTS

| | | | |
|---|---|---|---|
| 2,974,312 | 3/61 | Ridler | 340—174.1 |
| 3,007,145 | 10/61 | Murphy | 340—174.1 |
| 3,017,610 | 1/62 | Auerbach et al. | 340—172.5 |
| 3,056,110 | 9/62 | Cypser et al. | 340—172.5 |
| 3,105,228 | 9/63 | Elliott | 340—174.1 |

MALCOLM A. MORRISON, *Primary Examiner.*

IRVING L. SRAGOW, *Examiner.*